United States Patent

England

[15] 3,702,462

[45] Nov. 7, 1972

[54] COMPUTER INPUT-OUTPUT SYSTEM

[72] Inventor: Alfred W. England, Reseda, Calif.

[73] Assignee: Delaware SDS, Inc., El Segundo, Calif.

[22] Filed: Oct. 26, 1967

[21] Appl. No.: 678,235

[52] U.S. Cl. ....................340/172.5

[51] Int. Cl. ....................G06f 3/00

[58] Field of Search ....................340/172.5; 235/157

[56] References Cited

UNITED STATES PATENTS

| | | | |
|---|---|---|---|
| 3,200,380 | 8/1965 | MacDonald et al. | 340/172.5 |
| 3,210,733 | 10/1965 | Terzian et al. | 340/172.5 |
| 3,239,819 | 3/1966 | Masters | 340/172.5 |
| 3,247,488 | 4/1966 | Welsh et al. | 340/172.5 |
| 3,274,561 | 9/1966 | Hallman et al. | 340/172.5 |
| 3,283,308 | 11/1966 | Klein et al. | 340/172.5 |
| 3,303,476 | 2/1967 | Moyer et al. | 340/172.5 |
| 3,377,619 | 4/1968 | Marsh et al. | 340/172.5 |
| 3,406,380 | 10/1968 | Bradley et al. | 340/172.5 |
| 3,408,632 | 10/1968 | Hauck | 340/172.5 |
| 3,411,143 | 11/1968 | Beausoleil et al. | 340/172.5 |
| 3,475,729 | 10/1969 | Porcelli et al. | 340/172.5 |
| 3,483,522 | 12/1969 | Figueroa et al. | 340/172.5 |
| 3,409,880 | 11/1968 | Galler et al. | 340/172.5 |

*Primary Examiner*—Paul J. Henon
*Assistant Examiner*—Sydney R. Chirlin
*Attorney*—Smyth, Roston & Pavitt

[57] ABSTRACT

A computer system for digital computers is disclosed in which peripheral devices cooperate with "hardware" input-output processors (IOP) independent from the central processor (CPU) of the computer for handling the transfer of data between peripheral devices and memory which is also accessible to the CPU. Signal communication runs through special transmission facilities which include separate communication paths for the IOPs and CPU to memory, separate communication paths for control and data signals, and separate communication paths for determination of priority of operations among several IOPs and the CPU at memory, or between several IOPs at the IOP or between several devices at the device. The devices are controlled by device controllers which include subcontrollers which together with a portion of the IOPs provides a communication interface configuration between devices and IOPs.

36 Claims, 26 Drawing Figures

INVENTOR:
Alfred W. England

By Smyth, Roston & Pavitt
ATTORNEYS

PATENTED NOV 7 1972

3,702,462

SHEET 14 OF 16

| TABLE OF ADDRESS TRANSFORMATIONS | | | |
|---|---|---|---|
| Address, as Presented by the Source | Transformed Address | Block No. | Block Location |
| 0000...000 | 0000...000 | 0 | 0...000 |
| 0000...001 | 0010...000 | 1 | 0...000 |
| 0000...010 | 0000...010 | 0 | 0...010 |
| 0000...011 | 0010...010 | 1 | 0...010 |
| 0000...100 | 0000...100 | 0 | 0...100 |
| 0000...101 | 0010...100 | 1 | 0...100 |
| 0000...110 | 0000...110 | 0 | 0...110 |
| 0000...111 | 0010...110 | 1 | 0...110 |

COMPUTER INPUT-OUTPUT SYSTEM

The present invention relates to a general purpose stored program digital computer system, and more particularly to an input-output system for such a computer system.

In data processing today the central processing unit of a digital computer system generally has a very fast data rate and instruction operation rate in comparison to the data transfer rate of most input-output devices. Since historically the central processing unit has controlled the operations of input-output equipment such as card readers, magnetic tapes, high speed printers and various types of real time analog or digital input-output devices, generally this direct control of input-output operations by central processing units has caused the central processing unit to slow down its operation to wait for the input-output equipment to complete its operations. Today central processors operate in multiprogram environments where they must switch between programs rapidly. In this environment it is desirable to have rapid input-output transfers, e.g., exchanging programs between a rapid access disc file and a core memory, and to avoid tying up the central processing unit during the input-output transfers. Also, today many computers operate in real time environments and sometimes in simultaneous real time multiprogram environments. In this case the computer must acquire data as it becomes available from a real time source or must acquire information calling for action by the computer on a real time source. Environments of this type require rapid real time response. Preferably with systems of the type generally used with today's technology, this rapid real time response should be achieved while interrupting the central processing unit as little as possible. Another aspect which must be considered in the design of present day computer systems is that since the applications of computer systems are expanding so rapidly, the computer and the input-output system must be designed to accommodate tomorrow's input-output devices as well as handling a multitude of present day input-output devices. This requires an input-output system which will work with new devices without requiring hardware or programming changes to the present computer systems. Preferably, such an expandable input-output system should not lose any of its efficiency or real time response by the addition of newly developed devices. In real time environments where extremely rapid data acquisition rates are involved, bandwidth considerations become important in order to achieve the maximum data throughput rates in the input-output system. Therefore, it becomes extremely important that the input-output system bandwidth is shared among devices and other system units on the basis of their need and priority, and that the bandwidth of the whole system is not limited by the lack of bandwidth capability in one portion of the system.

Prior art input-output systems fall short of obtaining the goals set forth above in that in addition to other deficiencies they generally tie up the central processing unit to some extent during input-output operations and do not have adequate real time response or means for expanding the system to include new devices without a loss in efficiency.

Accordingly, one object of the present invention is to reduce the inhibition of central processing unit operations or the involvement of central processing unit operations to a minimum during input-output processing while maintaining a full range of input-output processing capabilities. Another object is to increase the real time response of the computer system while decreasing the central processing unit involvement in such response. Still another object of the present invention is to insure that devices and especially the highest priority devices are able to maintain input-output operations at their maximum data rate without central processing unit intervention.

Accordingly, it is another object to facilitate input-output expansion and adaptation of new devices without hardware or program modifications. Another object of the invention is to make utilization of the input-output system throughput bandwidth more efficient while maintaining real time response for high priority devices. Still another object of the present invention is to facilitate the handling of highly time dependent input-output requests and interrupts without central processing unit intervention while allowing the central processing unit to handle less time dependent interrupts at its convenience. Another object is to increase bandwidth and to increase the segmentation of systems which require multiple access. Another object is to provide localization of such priority adjacent the multiple access points of such systems.

It is an object of the present invention to relieve the arithmetic and control unit of the computer, now more frequently called the central processor (CPU), from handling the transfer of data from peripheral devices to the main computer memory or vice versa. The central processor will thus be free to execute programs without involvement in such transfer except to start it, stop it, or test its progress.

The structure described herein minimizes central processing unit involvement or inhibition during operations by the use of one or more input-output processors having their own individual busses and memory access ports to the same memory locations accessed by the central processing unit and their own arithmetic, flag, condition code, data register, data decoder register, timing generator, and in some cases fast access memory storage capabilities so as to allow them to process input-output operations in the same memories used by the central processing unit on an asynchronous basis. This structure increases real time response while decreasing central processing unit involvement by the use of a system which allows all devices to make (i) highly time dependent requests to the input-output processor while having the input-output processor respond to the requests on the basis of the highest priority device request at the time the input-output processor responds and (ii) less time dependent events and devices making interrupt requests to the central processing unit for events which can be handled at the central processing unit's convenience.

A standard interface is provided by which each device can control the input-output processing capability of the input-output processor according to its needs and priority and the input-output processor can intervene to assume control whenever necessary. A service cycle encompassing a limited order or data transfer for each device is provided to insure real time response by insuring that the highest priority device has access to the input-output processor processing control when necessary. Trunk tail busses with special module connectors are used on all control, data and priority busses between the various input-output processor units and memory, the central processing unit and memory, the central processing unit and the input-output processors, and the input-output processors and the device controllers operated by the input-output processors. A central processing unit interrupt response system is provided for input-output device to central processing unit interrupt requests which responds to the highest priority device interrupt pending at the time the central processing unit responds to the interrupt request regardless of the order in which the interrupt requests were raised prior to the interrupt response by the central processing unit.

System bandwidth is increased by the use of segmentation and multiple access on structures such as memory which are to be time-shared together with priority determination localization adjacent the multiple access points for such structures. Conflicts and consequently the need for time-sharing are decreased in this manner.

In the system described herein the transfer between memory and devices is controlled by one or several hardware input-output processors, having access to memory independently from the CPU, preferably through separate memory ports, for the transfer of full words between memory and an IOP.

Each IOP services several peripheral devices through device controllers. There are at least as many different device controllers as there are different types of peripheral devices. Similar devices can be controlled through a common device controller. Subcontrollers in the device controllers provide similar interfaces between the device controller-device combinations and the IOP, so that the IOP can communicate with all peripheral devices serviced by it through similar sets of signals.

Data are usually transferred between devices, device controllers and IOP to the byte level (8 bits) but the system is adaptable to any format of transfer. There are four bytes to a word, but this is basically arbitrary. Data and control signals are exchanged between subcontrollers and IOP through a bus system to which all subcontrollers serviced by an IOP are connected in parallel. Communication between IOP and a particular subcontroller-device controller is, for example, preceded by address code identification, so that the communication is then restricted to the device-subcontroller having that code. Alternatively, in case of control signals unaccompanied by a device and subcontroller address code, the communication is automatically restricted to the device controller having highest priority among those seeking communication with the IOP and in accordance with a wired-in priority rank established among all device controllers. The device controller-IOP communications are initiated by a dialog which, on part of the device controllers, can be completed only by one in accordance with the priority determination system. This overlaps direct addressing, but is instrumental in error detection.

A novel bus system and priority determination system is further instrumental in achieving these objectives.

A minimum computer system requires at least one IOP, but several IOP's can be used, either if the number of device controllers and devices exceeds the maximum number of device controllers which can be handled by a single IOP or to make use of the fact that two types of IOP's are available, multiplexor IOP and selector IOP. The multiplexor IOP can service more than one of its devices through time sharing and restriction of the period of uninterrupted service for a particular device. The selector IOP services only one device-device controller at a time and completes that service before turning to the next device. Service for several devices is sequenced in accordance with priority rank of the device controllers. The selector IOP will be used for those peripheral devices which have a very high data rate making multiplexing impractical and even impossible.

The several input-output processors of the system are connected in parallel along a cable bus from the central processing unit. A priority ranking system is additionally established among the several IOP's for particular use in interrupt situations. The entire I/O system has a single interrupt channel to the CPU, which can be raised by any of the devices of the I/O system. When the CPU responds to such an interrupt by honoring the interrupt request in general, some time may have elapsed. That acknowledging signal will then be routed to the IOP having highest relative priority among those IOP's through which an interrupt was raised and to the device having highest relative priority among those devices having an interrupt pending at the time the CPU attempts to honor the indiscriminate interrupt call it received. That device will then identify itself as having raised the interrupt, even though it may not be the first one in time to do so.

The priority determination connection among the several IOP's is, in general, instrumental in IOP selection for the communications between the I/O system and the CPU which are not accompanied by IOP addressing signals. On the other hand, the priority determination system is instrumental in causing the IOP system as a whole to reply always to addressing attempts by the CPU even if in the negative. The inter-device controller priority determination system has the analogous feature.

The IOP's each have a private fast access memory which has storage "cells" respectively associated with the device controllers. A storage "cell" serves as a combination of operating registers when the IOP services the particular device controllers. These registers include program counter, updatable data address register, flag and status registers, and registers to determine the duration of a transfer sequence. The other storage cells are analogously constructed and serve as memory at that time, until service shifts to their respectively associated device controllers. Since more than one IOP (they operate asynchronously to each other, to the CPU and to the memory) may seek communication with the memory, errors, possibly resulting from overlapping communication requests, have to be eliminated. Memory port priority and decision gating is instrumental for obtaining this objective.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIG. 1 illustrates schematically the layout of the I/O system, CPU and memory in accordance with the invention;

FIGS. 1*a* and 1*b* illustrate modifications of the general layout;

FIG. 2 illustrates somewhat schematically the bus system used among several units of the system shown in FIG. 1;

FIGS. 3, 3*a*, 3*b*, 3*c*, 3*d*, 4 and 4*a* illustrate details in various views of connector used in the bus system;

FIG. 5 illustrates a block diagram of a part of the CPU, the CPU-IOP interface, and the IOP—IOP priority determination system;

FIG. 5*a* illustrates a modification of the IOP-IOP priority system for the IOP of lowest priority;

FIG. 5*b* illustrates schematically the CPU instruction word format as particularly employed for I/O instructions;

FIG. 5*c* illustrates schematically the format of a compound word used for transmission of particular information between CPU and IOP via memory;

Figure 8:
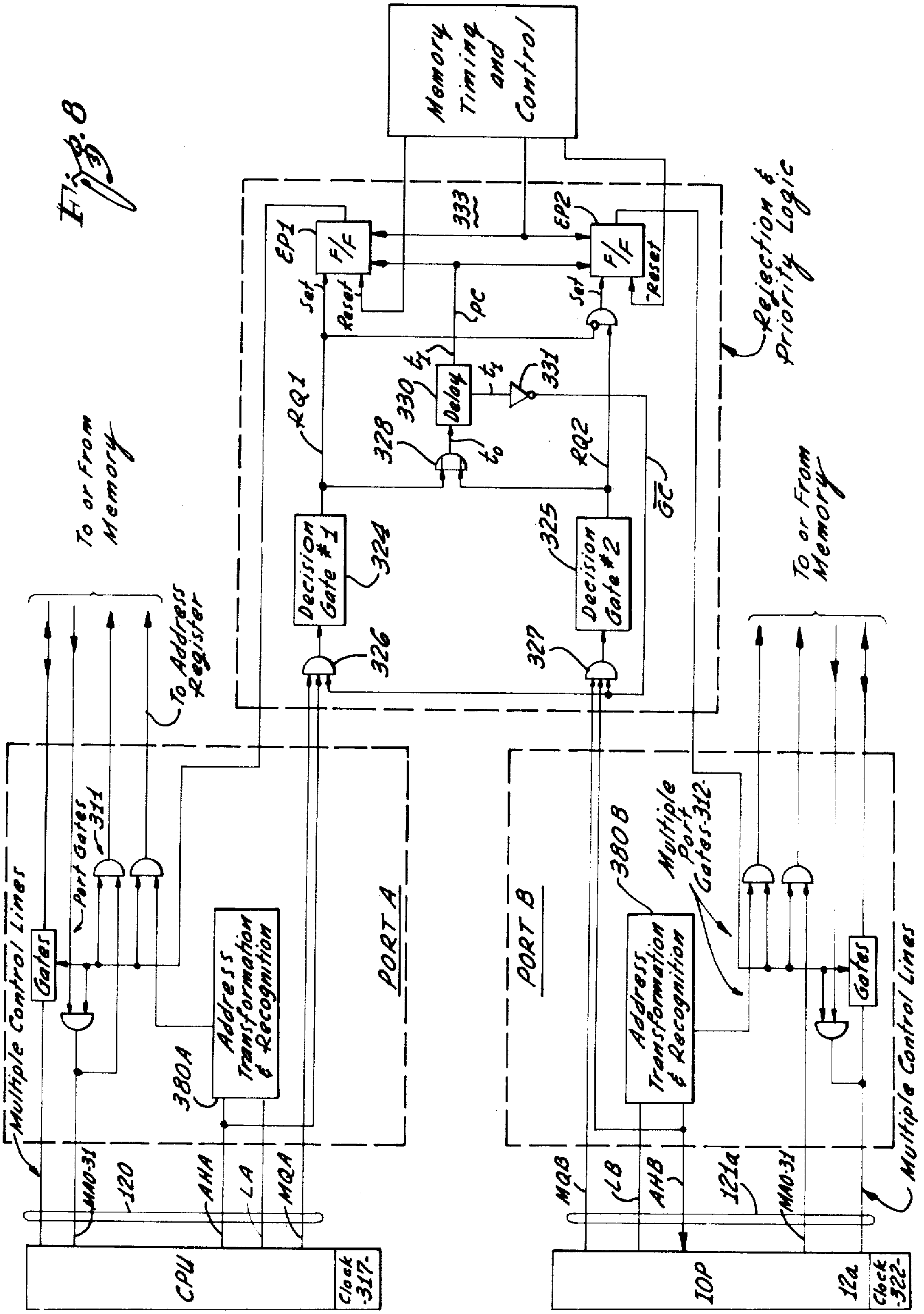
FIG. 8 is a schematic block diagram of a portion of a digital computer in accordance with the present invention and including a memory, two units having access to the memory, and a priority logic system including two decision gates.
Figures 8A, 8B:
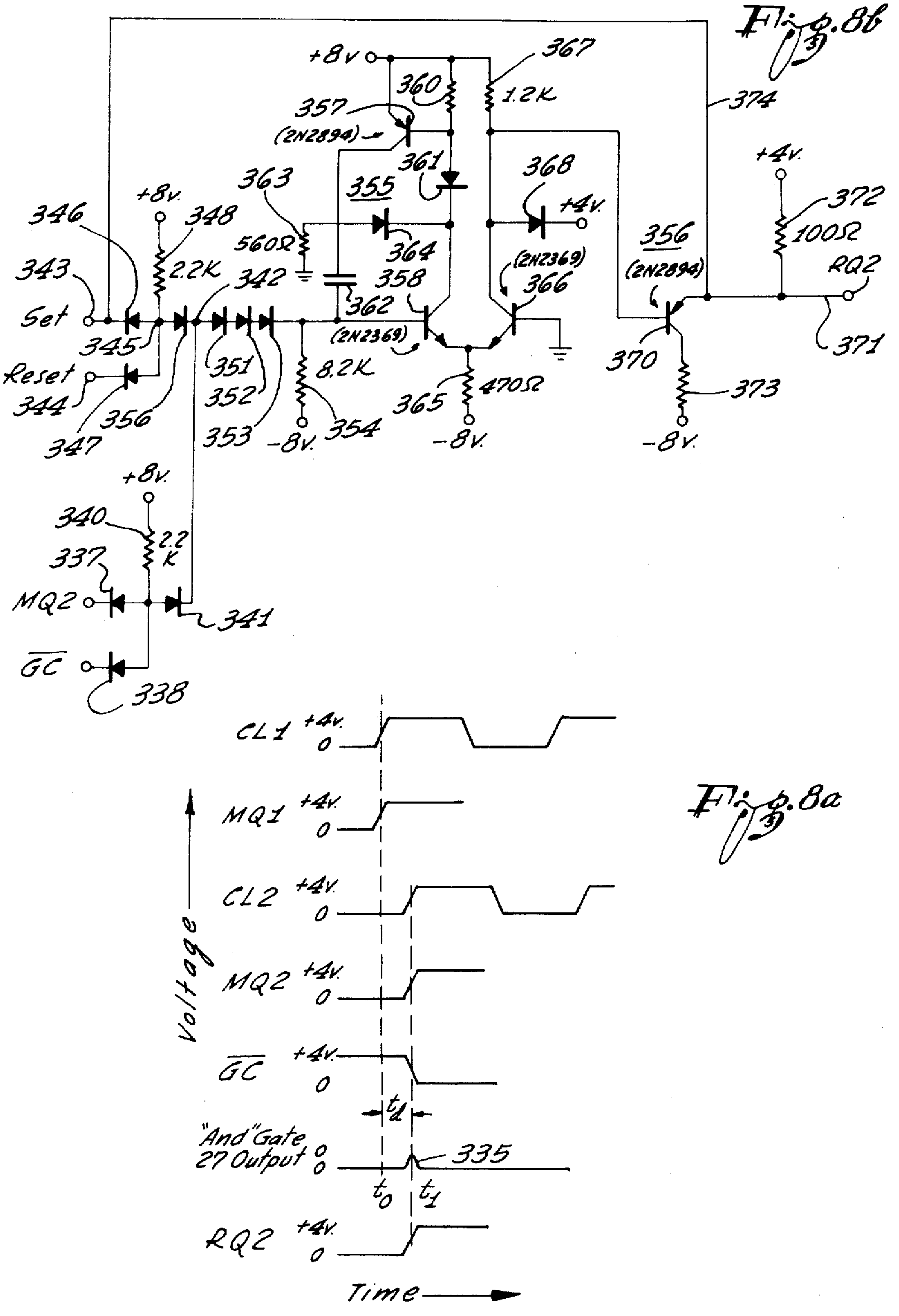
Figure 8C:
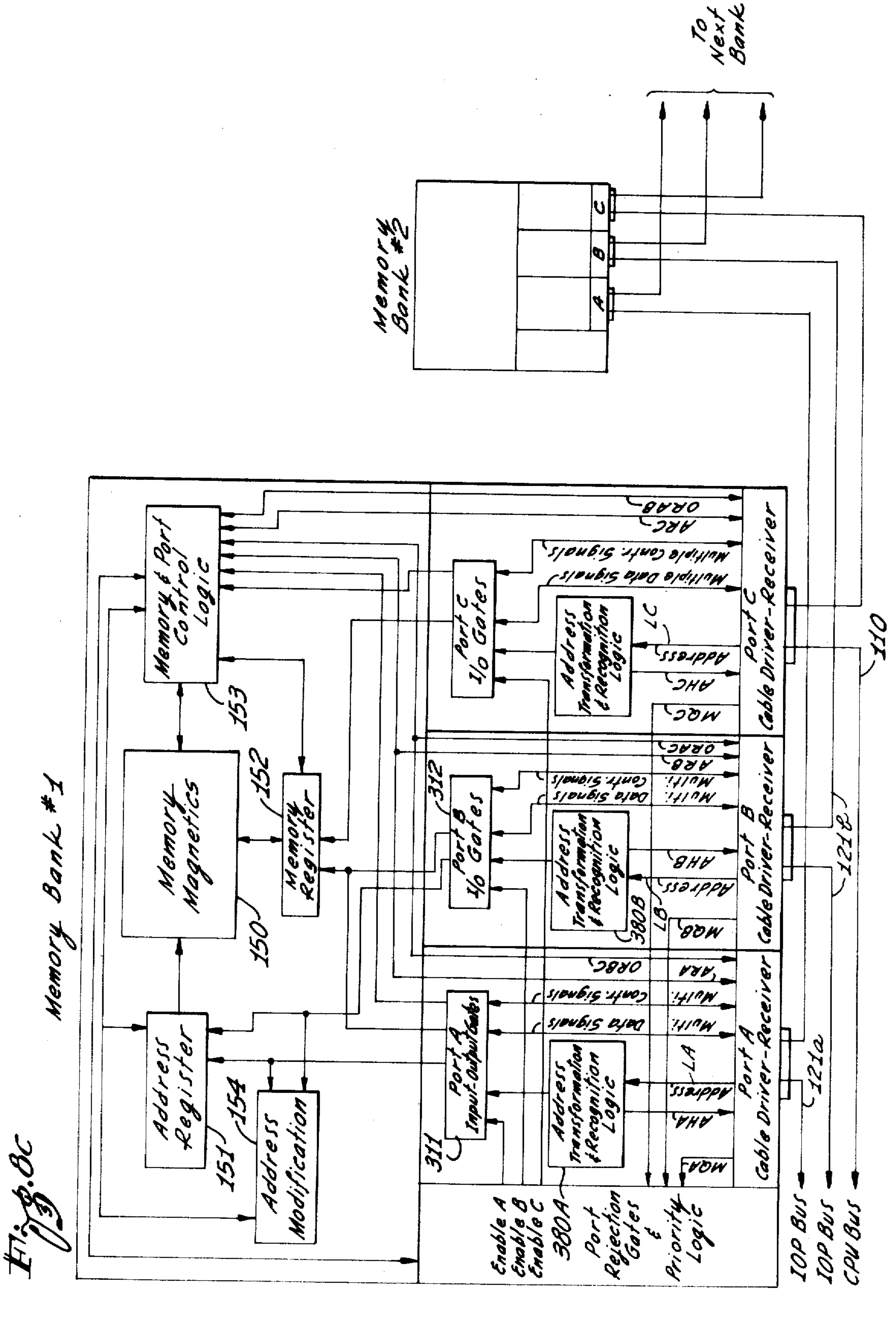
Figures 9, 10:
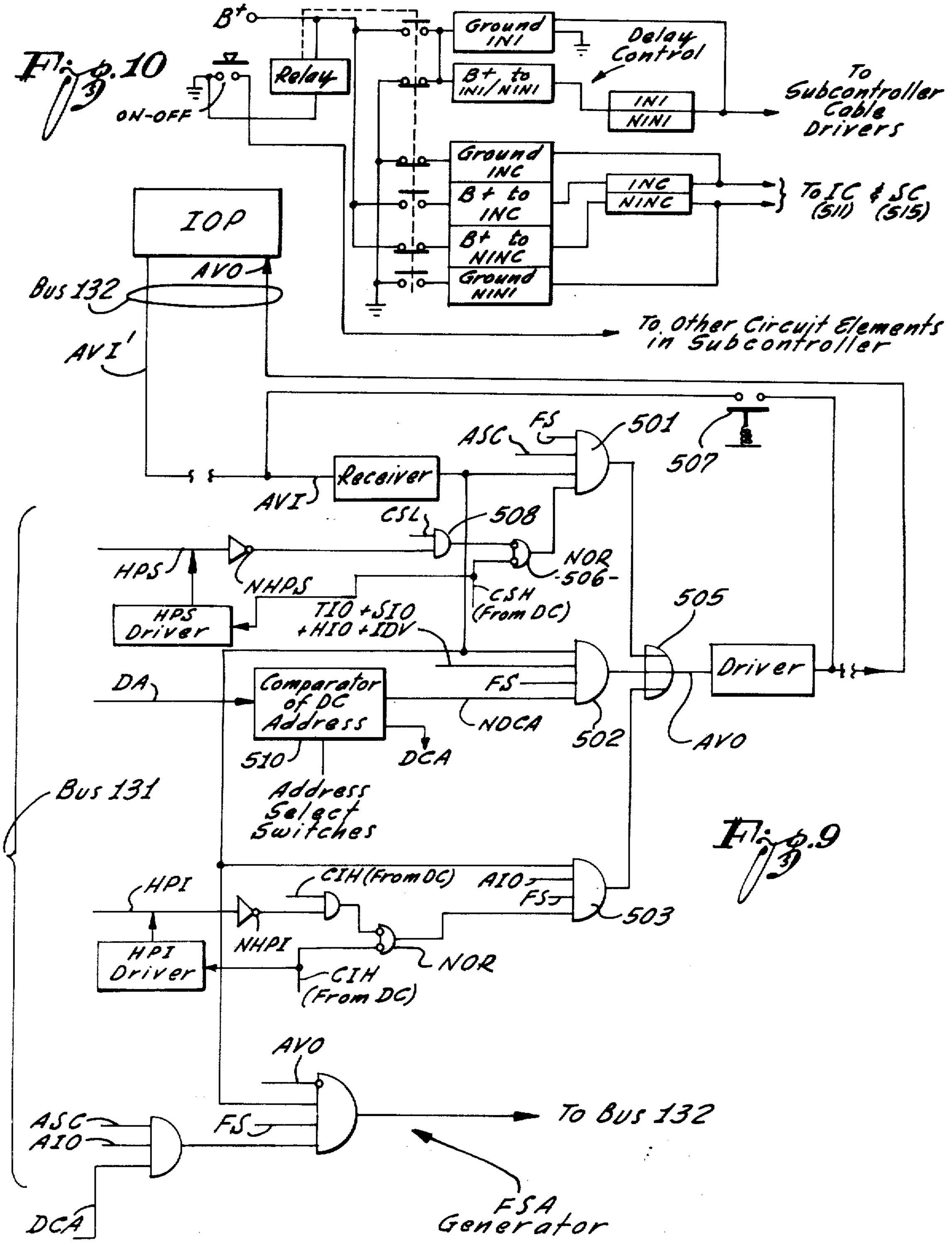
Figure 11:
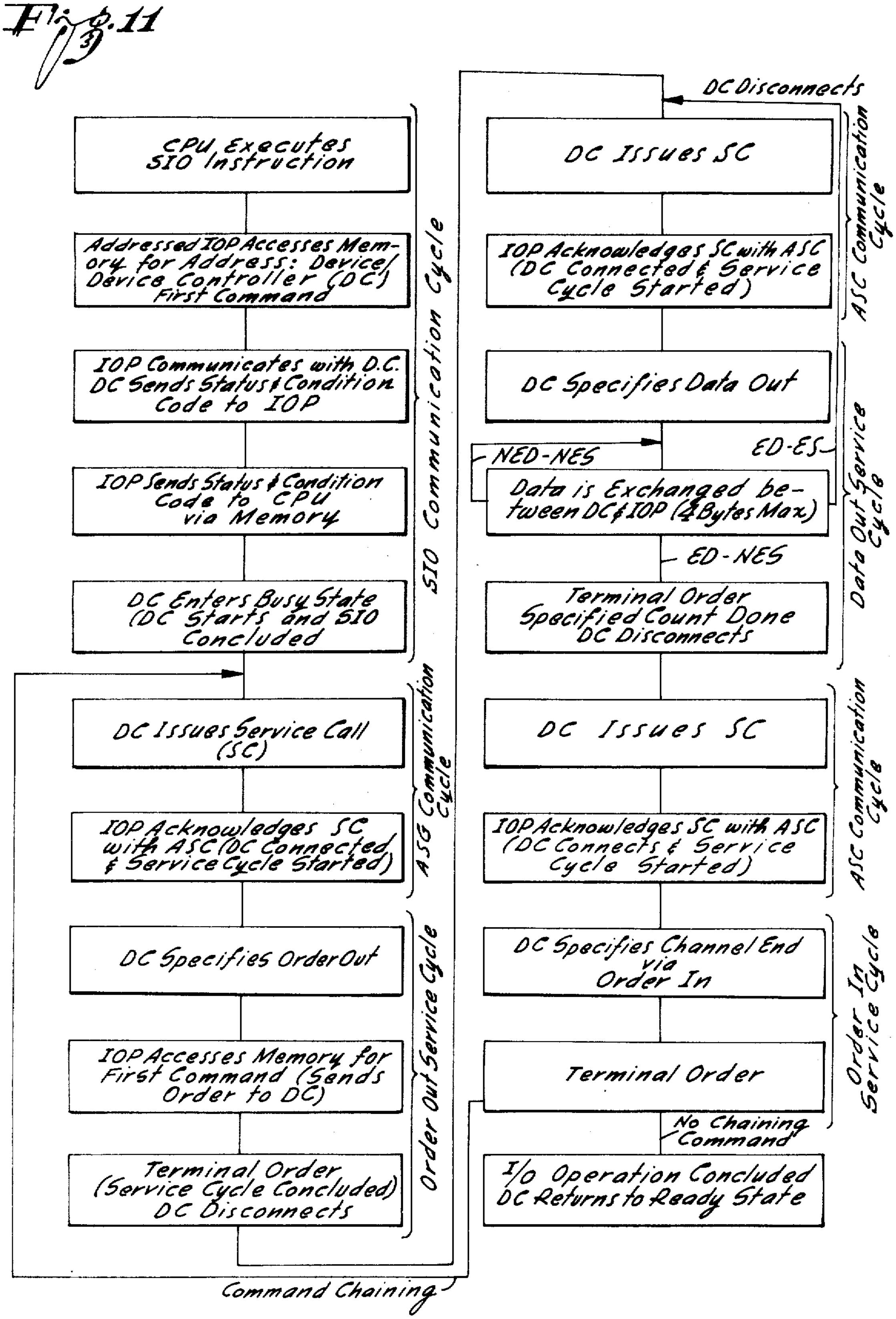
Figure 12:
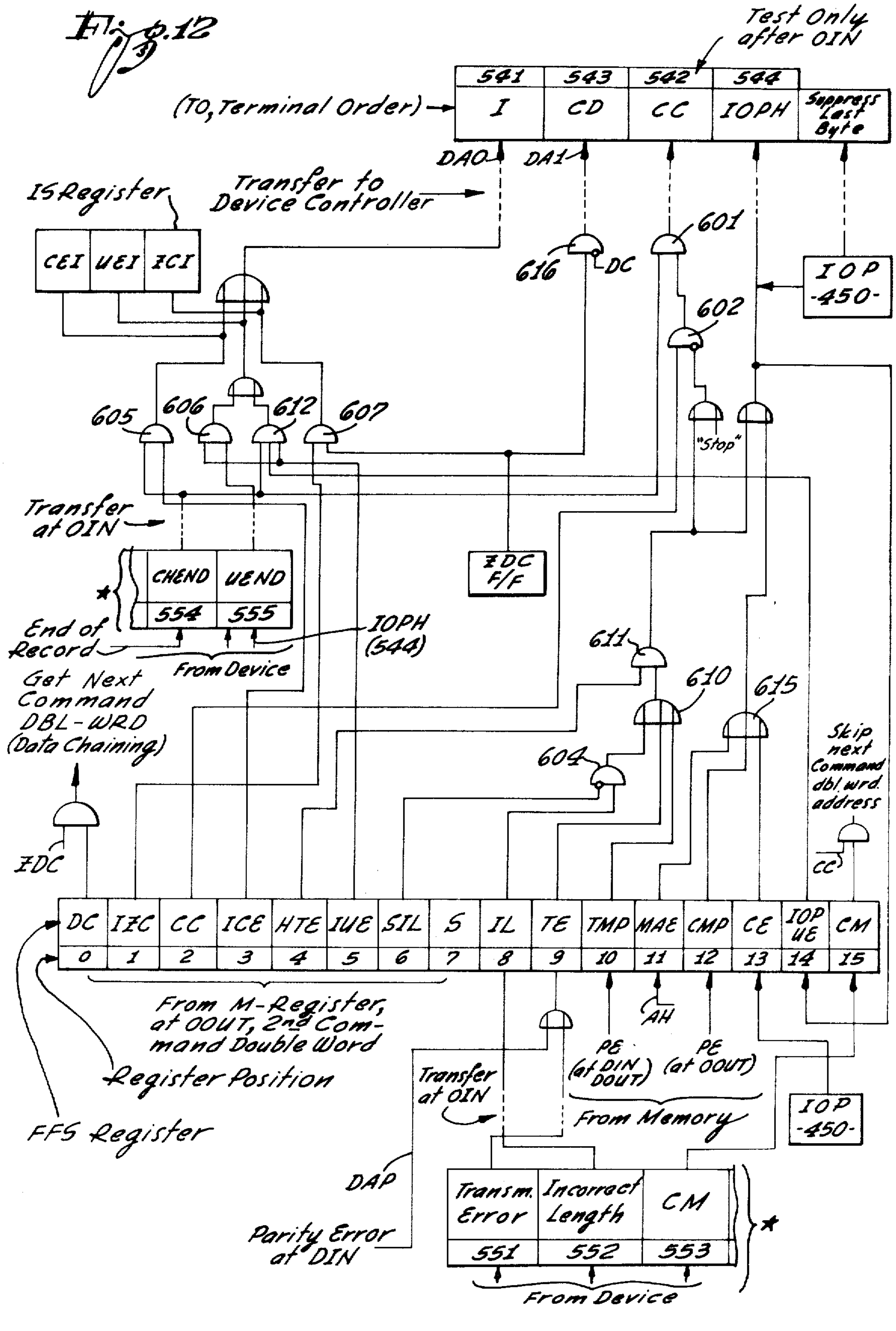
Figure 13:
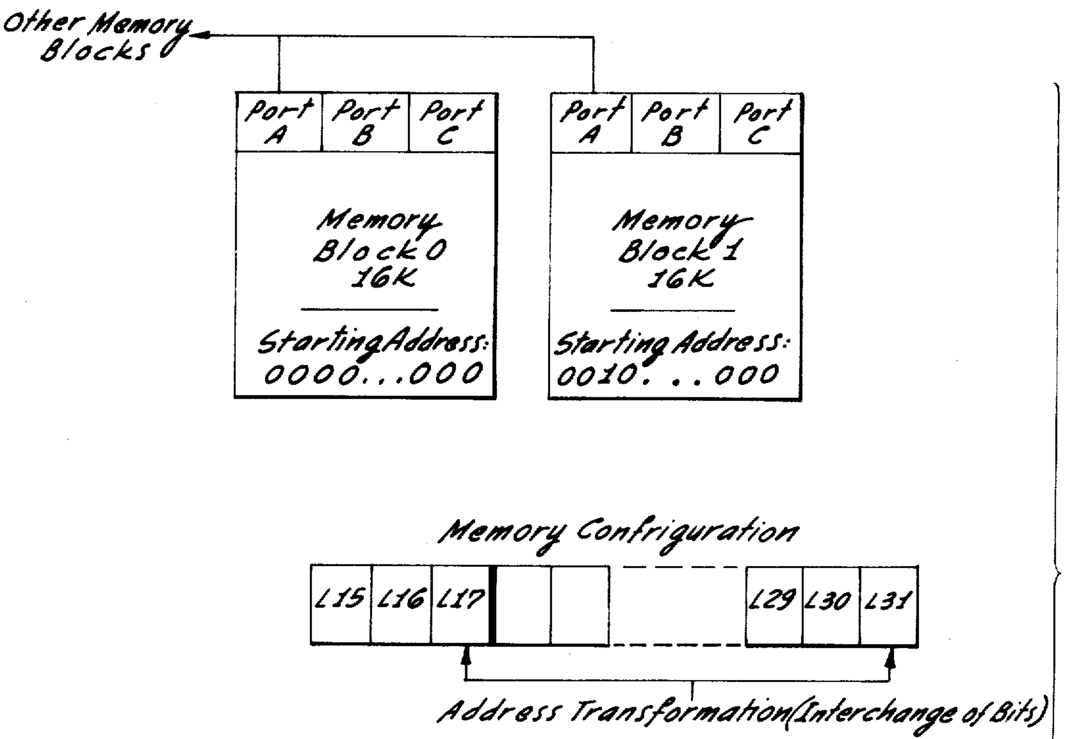

FIG. 8*a* is a chart of voltage waves occurring in the system of FIG. 8 and plotted as a function of time to illustrate the problem which the decision gate of the invention solves;

FIG. 8*b* is a circuit diagram of one of the decision gates of the invention including its input AND gate and a latch;

FIG. 8*c* is a block diagram of a memory bank with three ports;

FIG. 9 is a logic and block diagram illustrating the circuit in a subcontroller for establishing interdevice priority ranking;

FIG. 10 is a block and circuit diagram for the disconnect-connect logic of the subcontrollers;

FIG. 11 illustrates a flow chart for a typical sequence of I/O operations, this system should be used as a guide for the description particularly as beginning in the chapter on SIO operations;

FIG. 12 illustrates schematically the flow of certain status and order information independence upon flags as between an IOP and a device controller; and FIG. 13 is a conversion table illustrating the address conversion in a memory port.

GENERAL LAYOUT

Figure 1:
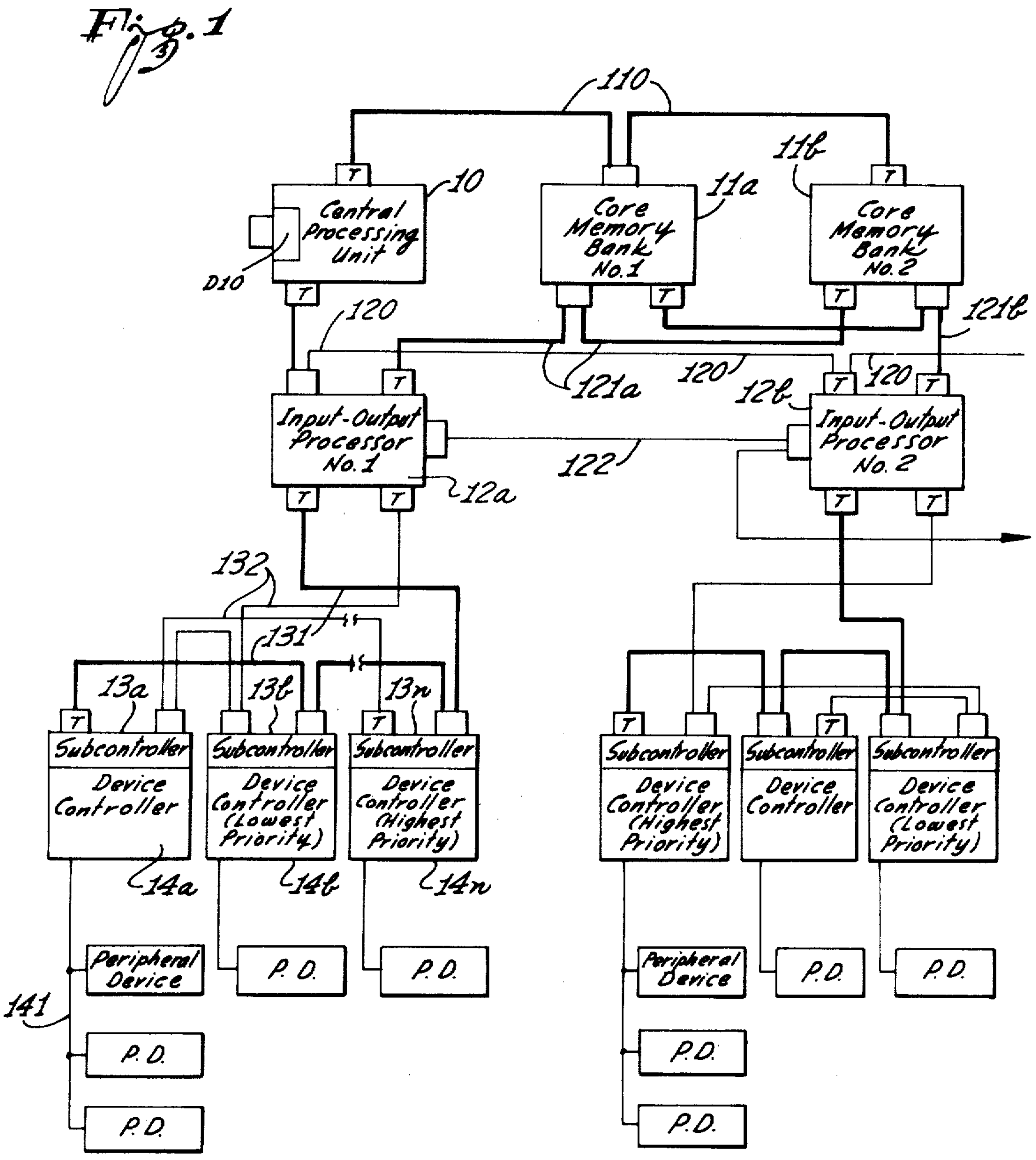

In FIG. 1 there is illustrated the general layout of the input-output system in relation to the computer, incorporating the features of the present invention. The main calculator and processor is the central processing unit (CPU for short) 10 cooperating with a plurality of core memory banks, such as 11a, 11b; there may be additional memory units connected to the system. The central processing unit communicates with the several memory banks via a trunk tail cable or bus system 110 comprising, for example, six cables, 14 wires each, and including particularly a 32 bit data bus for the transfer of information to the word-level between memory and CPU; a word being composed of 32 bits. Bus 110 includes also wires for the transmission of addressing signals to the memory banks and for the control signals needed for a CPU memory dialog.

The trunk tail bus 110 beginning at the central processing to then leads from core memory bank to core memory bank. Each of these memory banks taps all of the wires of the cables, as explained more fully with reference to FIG. 2, 3 and 4, by means of particular interface modules pertaining to a particular port in each of the ES banks permitting direct data communication between the central processing unit and any of the memory banks via this bus 110. The CPU will feed addressing signals to all of these memory banks, but only one thereof will have the location defined by the address, and that bank will enter into data communication with the CPU. The other banks are free to communicate with other parts of the system, for example, the I/O system, as soon as it is clear that they do not hold the location requested by the CPU.

The input-output system now comprises a plurality of input-output processors, two of which are being shown and being denoted as input-output processors # 1 and # 2, each characterized further by reference characters 12*a* and 12*b*. The central processing unit 10 is now linked to the several input-output processors through a trunk tail control cable or bus 120 leading from the central processing unit 10 to the physically closest input-output processor, in this case output processor 12*a*, and from there to the next one closest to the first one, for example, the input-output processor 12*b*, and from there to others, which are not shown. The bus 120 includes, as stated, control lines to which all of the input-output processors are connected in parallel. Details thereof will be explained below with reference to FIG. 5.

The input-output processor 12*a* has additionally a trunk tail bus 121*a* connection to a second port respectively in each of the core memory banks 11*a* and 11*b*. This second port permits access to the respective memory bank, provided the CPU has not made a request for access to the respective bank before the bank has begun to honor the request by the IOP 12*a*. Bus 121*a* includes wires for transmitting full words, 32 bits plus parity bit. Bus or cable 121*a* includes lines for memory addressing and for control signals to permit IOP core memory dialog, as they operate asynchronously. The cable 121*a* leads from the input-output processor 12*a* to the second priority port of the physically closest core memory bank which may be, in this case, 11*a*, but does not have to be. From there bus 120*a* continues to the second priority port of core memory bank 11*b*. The system, as shown, has only two memory banks so that there is termination of the cable 121a at the second memory bank. The interface connectors denoted with reference character T refer to terminating connector which will be explained more fully below with reference to FIG. 4.

The second input-output processor illustrated as 12*b* now has its own data and control bus 121b, leading from the input-output processor 2 to the core memory bank closest to it, which may be 11*b*, and from there to the next memory bank 11*a*. The connections in each core memory bank may lead to the same port as the connections from cable 121*a*, or to a third port of still lower priority. In case of a two memory bank system, as illustrated, there will be a terminator connector for bus 12*b* at the interface module of core memory bank 11*a*.

Aside from the control bus leading from the central processor 10 to all input-output processors in the order of respective closest physical position, another connection is provided between the IOP's. It is convenient, but not necessarily so, to stipulate that the input-output processor which is physically positioned closest to the central processing unit has always the highest priority of operation among other input-output processors. However, the priority of operation of the other input-output processors may be entirely different from the sequence of their connection along the trunk tail cable 120. Priority of operation means, means priority of operative connection to the CPU. The priorities of the several IOP's among each other can but do not have to be the same with regard to access to any memory bank.

A priority determination cable 122 leads from the input-output processor 12*a* to the input-output processor of the next lower priority. In the drawing it is assumed simply for reasons of simplifying illustration that this is the input-output processor 12*b* but that this is by no means necessarily so. The priority of an input-output processor as far as rank of operative connection to the CPU is concerned, is solely determined by the routing of the priority cable 122. It should be mentioned that a pair of priority signal wires from IOP 12*a* to CPU 10 are included in the wire 120; but the signal path is interrupted in the interface connector module of IOP 12*a* and not continued to the other IOP's via bus 120. This will become apparent from FIG. 5.

Each one of the input-output processors is provided to cooperate with a large plurality of peripheral devices. However, each input-output processor, for example, the input-output processor 12*a*, does not communicate with any of the devices directly but the connection leads to a plurality of subcontrollers 13*a*, 13*b*, –, 13*n* using the trunk tail connection principle. The subcontrollers pertain to device controllers 14*a*, 14*b*, –, 14*n*. The principal control lines and data transfer lines other than priority determination connections are included in a bus or cable 131, leading from the input-output processor 12*a* to the physically closest positioned subcontroller, which in this case may be subcontroller 13*n*. From there the cable 131 leads to the next subcontrollers physically closest to subcontroller 13*n*, until it leads from the subcontroller 13*b* to subcontroller 13*a*, to be terminated thereat. Thus, all subcontrollers share the same data and control lines included in cable 131. They distinguish among each other through addressing from the IOP, or by providing their own address codes to the IOP as an identification.

Entirely independent from the routing of cable 131 there is cable 132, leading from the input-output processor 12a to the subcontroller for the peripheral devices having lowest priority among all peripheral devices serviced by the input-output processor 12*a*. In this case it is assumed that this is the subcontroller 13*b*. From there the priority determination cable 132 leads to the subcontroller of second priority, assumed to be 13*a*, and so forth, until, for example, terminating in subcontroller 13*n* which may pertain to the peripheral device of highest priority.

The subcontrollers are all similar in design and provide a uniform type interface with the input-output processor. They provide the same type of control signals and data to and from the same bus, which is bus 131. The subcontrollers particularly include the logic for processing the priority determination and control signals in bus 132. A device controller has its respective principle function the control of one or more peripheral devices in accordance with signals which the device controller receives through its subcontroller. The device controllers will differ in accordance with requirements of the devices. It is, however, an important aspect that the device controllers have a similar interface to the subcontrollers.

In many instances each device controller will operate just one peripheral device because only one of the particular type of peripheral devices is needed in the system, for example, card reader, typewriter, line printer, etc. However, there are types of peripheral devices which are used in the plurality, such as magnetic tape or disk file units. They will respond to the same type of control signals and receive and provide data in the same manner, rate and format; their device controllers can therefore be similar. Since only one of the devices can operate at any time, it may well be suitable to connect all such similar peripheral devices to one device controller. The device controller must only distinguish among the devices and route the control and data signals accordingly. It is, for example, assumed that the device controller 14*a* operates four different peripheral devices, for example, magnetic tape units. These are all similarly constructed and, therefore, can be controlled in a common manner. The peripheral devices serviced by device controller 14*a* are connected to the device controller 14*a* on a trunk tail cable system 141. The device controller thus feeds the same control and data signals to all four devices, but raises them individually through addressing.

The connections for the input-output processor 12*b* may well be analogous to the one which is described with reference to input-output processor 12*a*, particularly as far as device subcontroller and device controller connections are concerned. Usually, a computer system of this type will include at least one multiplexing IOP, and one selector IOP. They distinguish in that the multiplexing IOP can service several devices simultaneously without letting either of them wait because the rate of data transfer within many peripheral devices and their capability of providing and/or accepting data is much slower than the transfer rate between device controller and core memory via the IOP. On the other hand, fast acting devices such as rapid access disk files, can be serviced better if permitted individually to complete an operation cycle comprised of an extensive data transfer. Such devices are then connected to a selector IOP.

THE TRUNK TAIL SYSTEM

Within the computer system, essentially all circuit connections in between individual circuit elements or integrated circuit units are made on a printed circuit card. These cards constitute individual modules and they are mounted in a chassis. Each chassis contains a particular number of such modules in parallel relationship. Several chassis are vertically stacked and constitute a cabinet. Direct wiring leads in the back of that chassis or chassis and generally in a plane or planes extending transverse to the extension of the individual modules. Usually the individual wires run in the proximity of a ground plate.

The chassis or several thereof constitute individual units, such as a device controller, an input-output processor, the central processor and the memory. These units are not interconnected through chassis backwiring but by the special cable system called trunk tail connection or cable. The elements of this type of connection will be described next. This connection includes wires for the transfer of signals which have to run from one unit to another one, whereby, however, the principal aspect of this trunk tail connection is that several units will be connected to the same wires, to receive the same signals.

Take representatively a particular control line which indiscriminately provides at times a specific control signal from the CPU to all input-output processors. Thus, the control signal is not set into a particular line leading from the central processor to just one input-output processor, but it is characteristic for the trunk tail system that, for example, the same signal is passed into and through one line from the central processing unit to all of the input-output processors, or from an IOP to all the device controllers of services or from an IOP to all memory banks. The complementary aspect of that system is now the following: (a) The several units, such as the several IOP's (or device controllers) are additionally interconnected through a modified trunk tail system establishing a fixed priority sequence of possible responses to such a signal sent by the CPU (or IOP) to all of them. (b) The control signal is accompanied by an addressing code to which but one of the several units receiving these signals can respond, or there was previously an addressing operation so that a subsequent control signal can only be recognized by one of the units, even though all of the others receive it also.

For the inverse case, any unit such as a device controller can place signals on a common bus. Thus, they must be accompanied or must have been preceded by an address code with which the unit identifies itself, or if several device controllers provide the signal to the IOP (or IOP's to the CPU) the receiving unit recognizes that as coming from the one with the highest priority, in accordance with the prewired priority rank, regardless which unit actually sent it first. It follows that the subcontrollers, for example, should all have the same interface with the IOP for this kind of connection to work, except that the system permits individual subcontrollers to receive less signals than provided, or to block propagation of signals to other units.

The trunk tail bus is not a physically integral unit. Instead, all wires and connections within that bus lead, for example, from the input-output processor to the subcontroller of a device controller closest to the IOP. The subcontroller has a special interface module. Physically the wires actually end at that module. Connections to the wires made at the module continue therein through printed circuit etchings, and from there through intermodule wiring within the subcontroller chassis, to distribute the signals to the appropriate elements of the subcontroller or to gather signals from other modules within the subcontroller and device controller. On the other hand, the particular interface module to which that cable coming from the input-output processor is connected provides directly also output connection and a second cable now leads from there to the second subcontroller closest to the first one and into, as well as through the special interface module of the second subcontroller. The connection then runs to the third subcontroller and so forth, until in the last subcontroller there is a specific terminator at its interface module. One can see that each unit is wired to provide all signals it wants to issue for transmission to some other unit, or to receive signals it needs from another unit, and the external cable forming part of the trunk tail system is instrumental in this signal distribution.

Figure 3:
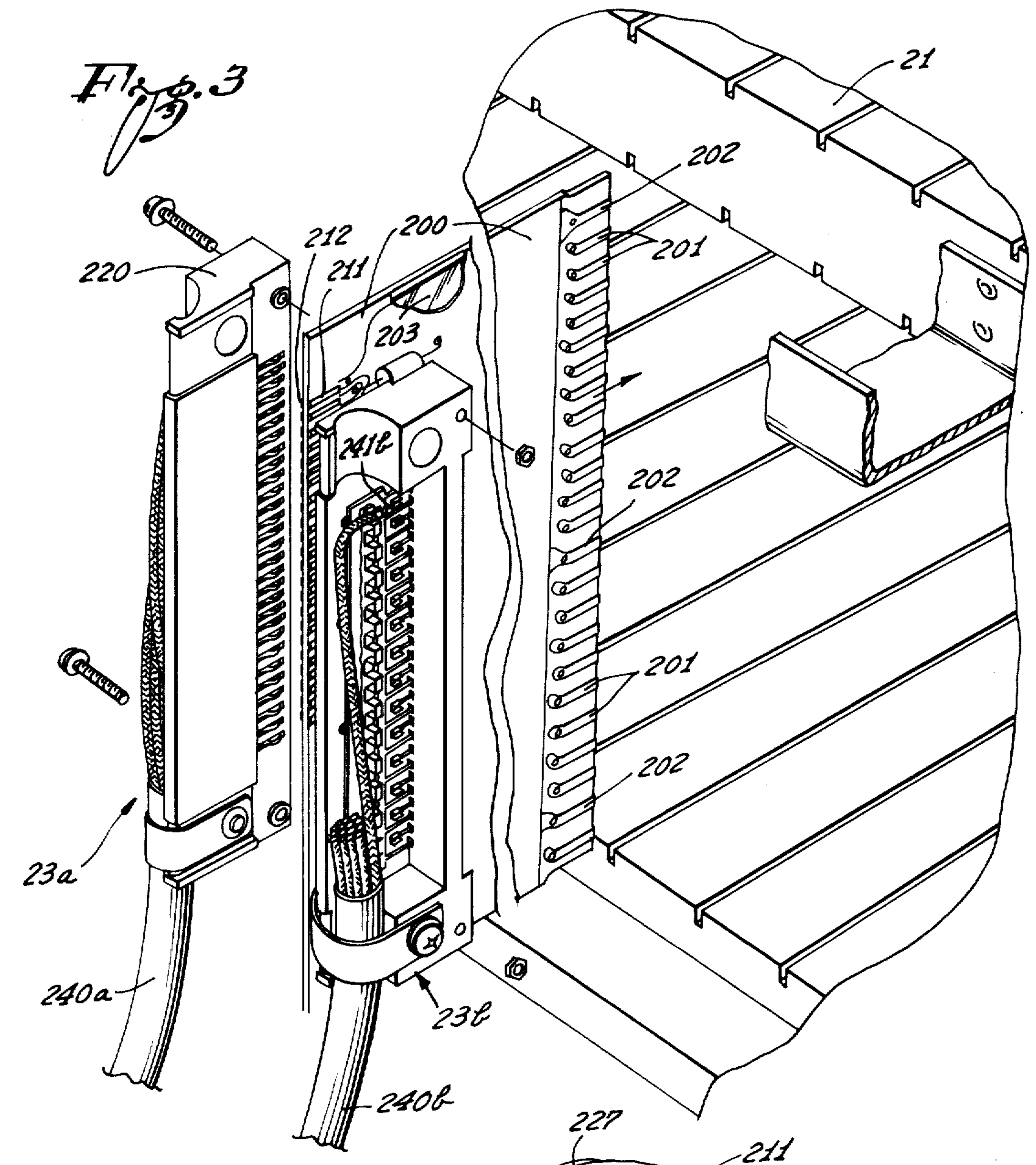

Turning now to FIG. 3, reference numeral 200 denotes a printed circuit interface module slipped in a chassis 21. There may be other interface modules in the chassis 21 and, of course, chassis 21 holds additional circuit modules pertaining to the unit of which module 200 is an interface module. The view is from the front, and in the back of the chassis runs the back wiring for providing to that interface module 200 signals for transmission to a unit external to the one to which the particular interface module pertains, or to receive from such external units signals which are then distributed by module 200 to other modules within the chassis 21 to which module 200 pertains.

The back end of module 200 has terminal etchings such as 201 which extend horizontally but in vertically stacked alignment along the rear end of the module, and they are connected to a plug system, not shown, for connection to the back wiring of the chassis 21 which leads to the other modules of the unit. Terminal etchings such as 202 connect, on one hand, to a ground plate etching 203 covering almost completely one side of the module 200; on the other hand, etchings 202 are connected to a ground plate along which runs the inter-module connection in the back of the chassis. (Shown in application Ser. No. 462,482, filed June 9, 1965 of common assignee.)

Figure 2:
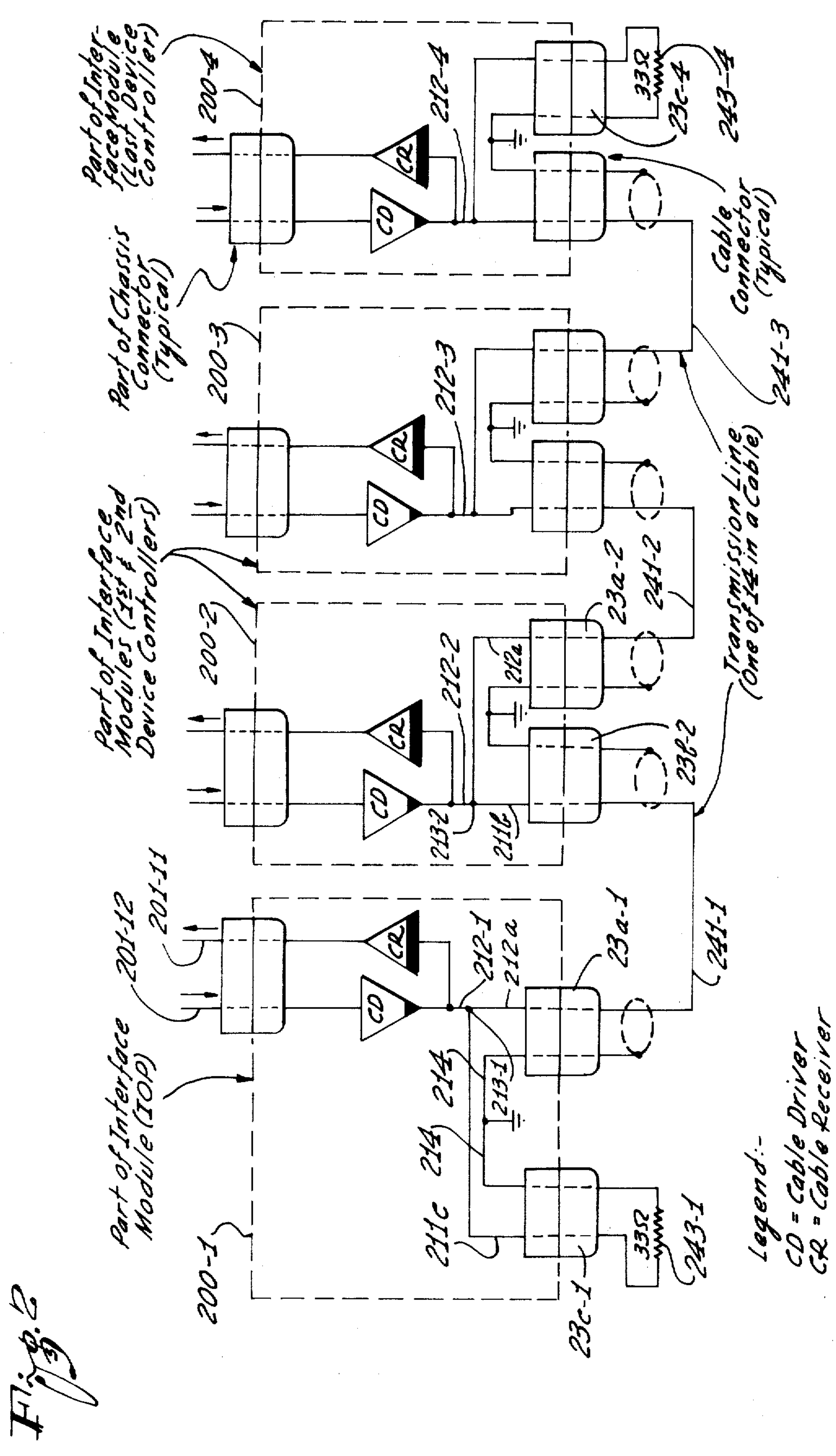

The individual terminal etching 201 leads through a printed circuit pattern on the module 200 to circuit elements comprising primarily so-called cable drivers and cable receivers described in the next chapter with reference to FIG. 2 and providing primarily amplification of signals as received or before being sent into the cable system.

In addition, one of the etchings 201 receives enable-disable signals if the unit is a subcontroller. These signals called INI and NINI will be described in a later chapter.

Figure 3A:
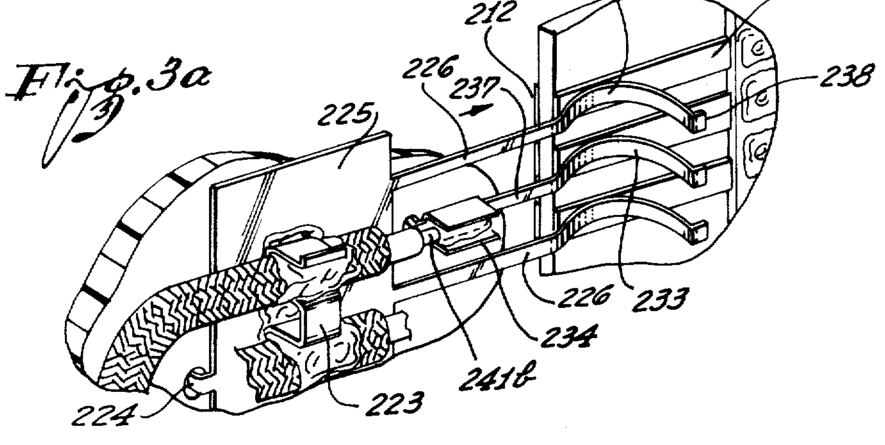
Figure 3B:
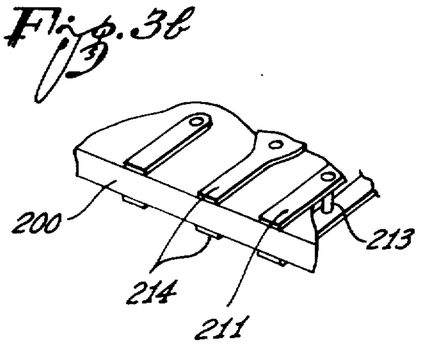

Each cable driver-receiver system on the printed circuit module 200 then leads to one of the terminal etchings such as 212 at the front end of the card and on the side thereof opposite to ground etching 203. For each of these etchings 212 there is a corresponding one on the opposite side of the card, denoted with reference number 211, but displaced from ground etching 203. Respective pairs of these terminal etchings 211 and 212 are electrically interconnected through a solder piece 213 in an aperture of the printed circuit board 200, if the trunk tail system is a regular one. (See FIG. 3b or 3d.) For the modified system the solder 213 is omitted and substituted by uninterrupted insulation through the card proper. In between each pair of these terminal etchings 211 and 212 there are corresponding aligned pairs of terminal etchings 214, likewise interconnected through a soldering point, but the etchings 214 in between etchings 211 all lead to the ground etching 203.

Turning now more specifically to FIG. 3, there are shown in somewhat exploded view two connectors 23a and 23b, each having an essentially similar configuration and can be denoted in general with reference numeral 23. They connect symmetrically in pairs along the front edge of printed circuit board 200 and to either side thereof. Each connector is comprised of an insulating support piece 220 in which are inserted individual contact elements 232. Each contact element 232 has a front end tongue 238 for support on a ledge 224 of support element 220. (See FIG. 3d. ) Next, each contact element has a crimped portion 233 for contact making with a terminal etching 211 or 212, depending on which side of the printed circuit module the particular connector is positioned. The contact piece 232, furthermore, has a portion 234 defining a short channel with U-shaped cross section for receiving, clamping and securing the contact piece to the end piece of a wire generally denoted 241. The wire, when pertaining to cable 240b, is more specifically denoted as 241b. (See FIG. 3a.) That wire end piece 241 will, therefore, partially be enveloped by the clamp 234 of contact element 232 and will be soldered thereto for permanent connection.

Each contact element 232 has a lug 239 with which it is received by a corresponding aperture in the connector support element 220. The contact element 232, in addition, has a flat portion 237 with which it rests on a flat portion 221 of the connector support element 220. As stated, the tongue 238 of a contact element 232 rests on the shoulder or ledge 224 in the support element 220 of the connector. In addition, the upper side of the flat portion 237 rests against a crossbar 222 integral with and pertaining to the support element 220. This way, the contact element 232 is positioned in element 220 so that the crimped portion 233 slightly projects beyond the surface of the support element 220 facing the printed circuit card 200. As the connector is secured to the printed circuit module 200, the crimped portion of the contact element 232 exerts pressure onto a terminal etching 211 or 212 of the card and is urged inwardly to provide firm electrical connections.

The wire 241 pertains, for example, to a cable 240a which is multiwire cable; in this case there are 14 wires in the cable. Thus, 14 of these wires lead to respectively 14 of such contact pieces 232 in connector 23a for making contact with 14 terminal etchings 212 on the printed circuit card 200. Analogously, 14 contacts 232 in connector 23b make contact with 14 etchings 212 respectively aligned with etchings 211 and possibly connected thereto respectively through solder points 213. A 14 wire cable 240b leads off connector 23b.

Figure 3C:
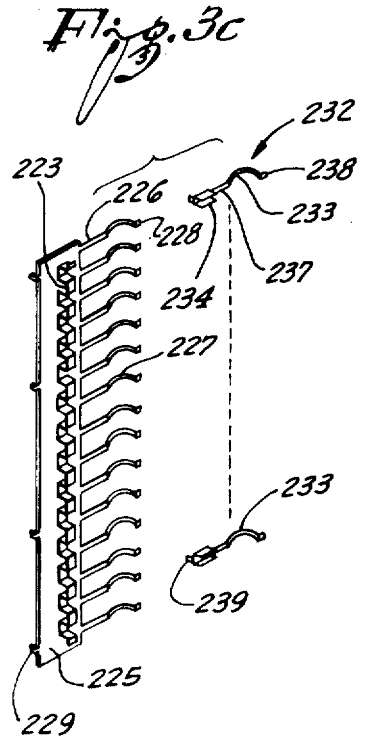
Figures 3D, 4A:
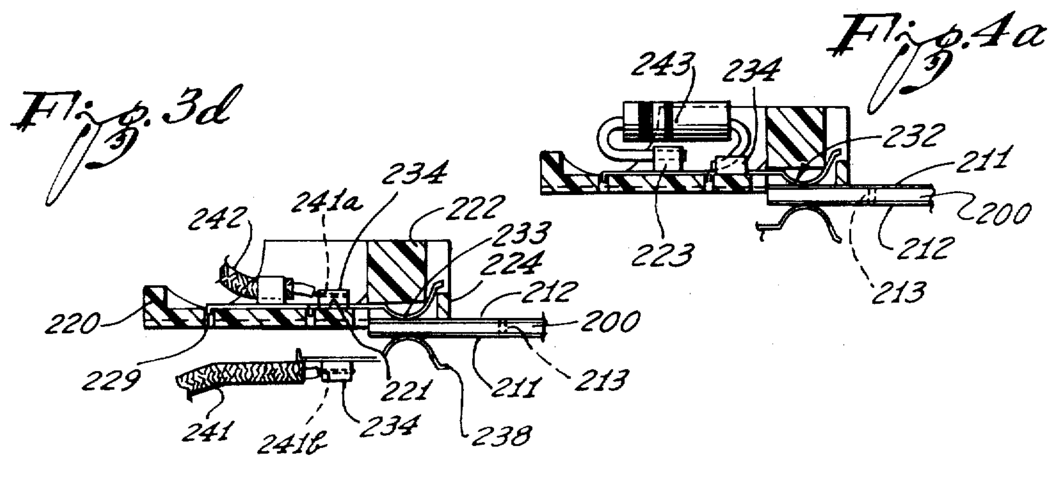

As particularly shown in FIG. 3d, wire 241a leads to a contact element 232 in connector 23a and that element 232 contacts an etching 212. That is the point of branching. One connection leads now through the printed circuit etching on the card into the interior of the module, the other runs through solder 213 to etching 211 contacting an element 232 of the other connector 23b, which is similarly constructed and therefore, has a like plurality (14) of such contact pieces 232. The two connectors 23a and 23b are symmetrically positioned and secured to each other and to the printed circuit card 200 by means of screws.

Each one of the wires, such as 241, in general, is shielded in a conventional manner with the shielding being denoted with a reference numeral 242. As a wire with shielding is placed so that its end 241a can make contact with the clamp 234 of a contact element 232 the shielding 242 rests in between a corrugation of a contact plate 225. This contact plate 225 has 14 such corrugations 223 and is positioned on the insulated support element 220 of a connector 23. This plate 225 has a plurality of contact piece extensions 226 having crimped portions 227 analogous to the crimped portion 233 of an individual contact piece 232. These contact pieces 226 extend regularly and in parallel from the contact plate 225. As this plate 225 is mounted to the connector support 220 the several contact pieces 226 thereof become individually positioned in between the contact pieces 232 stuck into the same support element 220; all of the crimped portions of contact elements 226 and 232 are then aligned as can be seen best in FIG. 3a.

The contact plate 225 has also lugs 229 received in corresponding apertures of the support plate 220. The contact elements 226 projecting from the contact plate 225 are similar shaped to the contact pieces 232 and they have also front end tongues 228 with which they rest on the same insulated shoulder 224 on which rest the tongues 226 of the contact element 232. The position of contacts 232, as well as of contacts 226, in support element 220, is such that limited elastic deformation is permitted, because the respective straight portions 226 and 236 are on one side resting against crossbar 222 of element 220, and on the other hand they rest on the flat inner surface 221 of support element 220. Therefore, the crimped portion 227 when making contact with the terminal etchings 214 of the printed circuit board have similar position and project beyond the support plate 220 to likewise exert contact pressure on the printed circuit board in the same manner as the crimped portions 233 do of the contact pieces 232. The contact pieces 226 all have necessarily a common potential and they make contact with the terminal etchings 214 on the printed circuit board 200 which have ground potential.

One can, therefore, see that any signal in a wire such as 241 is guided from the shielded cable into the printed circuit board in the vicinity of conductors having ground potential. As one can see from the 15 contact prongs of plate 225 in FIG. 3c, each signal-contact element 232 is flanked by two grounded prongs 226, and analogously, each terminal etching 211 or 212 is flanked by two ground potential terminal etchings 214. The printed circuit board has a ground plate etching 203 over its entire extension running thus always in the vicinity of any signal etching pattern on the other side.

The through connection 211-213-212 likewise is always in the vicinity of grounded conductors. Thus, the entire signal path has true *h-f* transmission characteristics.

Figure 4:
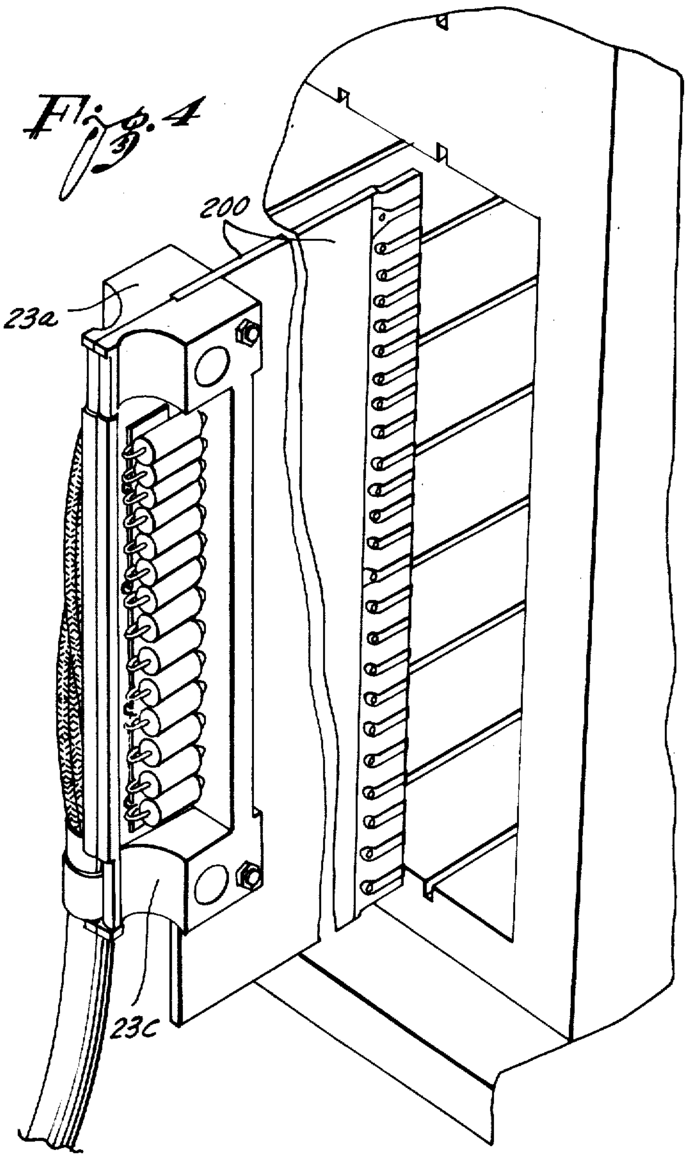

As one can see best from FIG. 4 the system is extremely easily adaptable for system extension. If at any chassis no further connections are to be made from that chassis and particularly from the interface module, such as 200 thereof, to another unit, one will still use the same type of connector pair 23, and the one also denoted with reference numeral 23*a* in FIG. 4 is of exactly the same type as the one in FIG. 3, but the one shown and denoted with reference numeral 23*c* is similar in principle to the other connectors except that no cable wire leads from it. Each of the clamp portions 234 of the respective individual contact pieces 232 is connected to one terminal of a resistor 243, while the other terminal of the resistor is connected and secured to the grounded, corrugated contact plate 225. 14 such resistors thus terminate the particular transmission line having 14 of these wires within the one cable. It should be mentioned that termination units 230 can be used on either side of a board 200, and each cable system has two such terminators as will be seen best in the next chapter.

If the system is to be extended and another unit is to be connected to the same wires, one simply exchanges the connector 23*c* with the resistors for one like 23*b* connected to a cable, provides a similar cable connection to a similar interface module and connecting system in this additional unit to be connected to the line, and places the terminal connector 23*c* on the interface module of that additional unit. This simple mode of extension is one of the principal advantages of the trunk tail system.

PHYSICAL TRANSMISSION LINE CONNECTION

FIG. 2 illustrates representatively how a particular connecting wire constituting a part of a trunk tail cable and for a particular signal can be run to several interface modules. Reference numeral 23 C-1 denotes the portion of a terminal connector of the type 23*c* (FIG. 4) connecting a terminal etching 211c of interface module 200-1 to a terminal resistor 243-1. This resistor connects also to the ground connector plate (225) for the particular connector 23 C-1. Two contact fingers (227 FIG. 3, et seq.) of that ground connector plate (225) make contact with a pair of particular terminal etchings 214 flanking etching 211*c* on one side of module plate 200-1 and leading to the ground plate (203) of the module. A terminal etching 212*a* opposite to etching 211-*c* on the other side of the particular printed circuit module card is connected to terminal etching 211*c* through solder 213-1 and leads, on the other hand, through a contact element 232 in a second connector element of the type 23*a*–1 to a wire 241-1. A pair of terminal etchings 214 registering with the first one make contact with prongs from contact plate (225) of the connector element 23*a*–1 which, in turn, connects to the shield of wire 241-1.

Reference numeral 212-1 shows the equivalent circuit of the electrically interconnected terminal etchings which thus leads from that particular contact-making pair of terminal etchings 212*a*–211*c* to a pair of cable driver (CD) - cable received (CR) connected thusly to the wire 241-1 as well as to terminal resistor 243-1 and from there to ground. The module 200-1 may, for example, be the (or one of several) interface module pertaining to an input-output processor. The signal received through wire 241 by the cable receiver CR is passed through back-connection 201-11 to the remainder of the unit, or a signal enters the module through back connection, passes cable driver CD and from there through connector 23a-1 into wire 241-1. Cable driver and cable receiver, wire 241-1 may, for example, be a part of the transmission cable 131 (FIG. 1) having 14 lines and leading from an IOP to a first interface module 200-2 pertaining, for example, to a subcontroller. There is then an analogous pair 23*a*–2 and 23*b*–2 of connectors. One of the contact elements 232 of connector 23*b*–2 is connected in the manner as aforedescribed to line 241-1 and connects to a terminal etching 211*b* which, in turn, connects through a solder point 213-2 to a registering etching 212a. Another contact element of the type 232 in the connector 23*a*–2 contacting etching 212*a* provides signal transmission to the line 241-2. Therefore, the signal, for example, passed by the cable driver of module 200-1 into the line 241-1 runs into module 200-2 and out again into the line 241-2. One can see the continuing propagation path for such a signal until encountering another terminal connector 23*c*–4 in a fourth module 200-4, which may be the interface module of the last one of four subcontrollers connected to that particular IOP. There is then a resistor 243-4 which terminates that particular line and connects it to ground. Hence, resistors 243-1 and 243-4 provide a common return path for that signal as set into lines 241-1, 241-2 and 241-3 by the illustrated cable driver in module 200-1.

In each one of the modules, 200-2, 200-3 and 200-4, there is one particular etching, such as 212-2, 212-3, 212-4, which respectively leads from a pair of registering etchings 211–212 contacting a pair of contact elements of the type 232 through a printed circuit path on the respective module 200-2, 200-3 or 200-4 to a respective cable receiver which appropriately boosts the signal it receives and sends it into respective other modules pertaining to the respective unit. In other words, the cable receiver CR on card 200-2 receives the signal from wire 241-1, or a contact element 232, and a pair of terminal etchings 211 and 212 on card 200-2. Receiver CR on module 200-2 then sends the signal it receives from wire 241-1 into other modules of the first subcontroller and the device controller pertaining thereto. The same signal reaches the cable receivers on the other interface modules and is processed analogously. The system is illustrated to show that each transmission wire may in each module cooperate with a pair of cable driver-cable receiver; however, if the signals propagate only in one direction, then there may only be receivers or drivers, depending on the function of the particular unit in relation to that transmission line.

MEMORY ACCESS SYSTEM

The system in accordance with the present invention includes one or more central processing units and one or more input-output processors sharing the same memory and therefore being capable of addressing the same locations in that memory. Some of the input-output processors have multiple devices attached to them, each of which accesses the same memory on a timeshared basis with the other device attached to its IOP and on a higher level timeshared basis with devices attached to other IOPS. Some devices may have their own separate or even integral IOPs and thus timeshare the memory with other devices only on the higher memory access level. It should be noted that in the system disclosed herein, the IOPs generally have their own buses to memory and hence do not timeshare these buses except in extreme cases where the IOP is not capable of using all of the bus bandwidth because it has slow devices connected to it. Since in general the devices attached to a multiplexing IOP do not have sufficient data rates to use up the device to IOP bus bandwidth, these devices generally timeshare the bus as well as the IOP hardware.

It is apparent that in a system of the type described herein, where multiple buses with adequate bandwidth are used, the limiting factor on real time response becomes memory access and especially conflicting demands made by different units on the same memory. In the present state of the art, memory magnetics are generally constructed so that they cannot be interrupted in the middle of a memory cycle without risking the loss of data and only one access can be made during a single memory cycle. The present invention discloses a structure which increases system bandwidth and real time response by moving the memory access and the conflicts, if any, as close as is economically practicable to a single memory location in the magnetic structure and resolves the conflicts as close to that location as is economically practicable. Of course, at the present time it is not economically practicable to build a structure which moves this access and resolution down to the level of a single location, but it is possible to subdivide the memory into a large number of memory banks, each of which is built around a small magnetic structure. Each of these memory banks has its own access capability to the magnetic storage and each has its own conflict resolving capability in the form of priority determination logic which timeshares the memory among the requesting units to that bank according to a priority system. It should be noted that the fact that the memory is divided into separately accessible portions increases the bandwidth of the system by reducing the possibility of conflict. The priority determination system at each separately accessible memory bank increases bandwidth by eliminating any intermediate cabling or timesharing hardware which might impose bandwidth limitations.

Referring now to FIG. 8c, there is illustrated schematically a memory divided into multiple banks. Each memory bank has several access ports. Three ports are shown in FIG. 8c for each memory bank, but obviously there can be greater or less ports than three. Each port can be further subdivided into multiple ports. The ports serve several purposes. The first purpose is to provide a connection point for the trunk tail bus cabling used to connect each IOP and CPU to each memory bank. As shown in FIG. 8c, the cabling from a particular IOP (121*a* or 121*b*) from the CPU cable 120 will be trunk-tailed from memory bank to memory bank and will connect to the same port at each memory bank e.g. port A or B, or C as shown in FIG. 8c.

Another purpose of a multiple port system at each memory bank is to provide a priority determination between conflicting memory requests at each memory bank. As was pointed out above, making a priority determination as close as possible to the memory location to be accessed increases the system bandwidth since the only portion of the system in conflict for the same system hardware are those at the access to a single memory bank.

In addition to priority determination, each port provides address recognition, address transformation to permit interleaving of memory banks and a logical path for communication of information in and out of memory.

Referring to FIG. 8c, it can be seen that a typical memory bank includes memory magnetics 150 (e.g. core stacks, decoders and driver and sensing logic etc), and address register 151, and M memory register 152 for the transfer of data to and from magnetics 150, a memory and port control section and a group of memory ports such as A, B and C, which access the foregoing.

Each port is connected to a trunk tail cable and connector by a cable-driver receiver module described in a prior chapter of which distributes the control, data and address signals appearing on that cable throughout the memory bank and the port to which the cable is connected by means of a backwiring in a motherboard to which the cable driver and other memory modules are connected. It should be noted that the majority of these signals feed into input-output gates in each port which are controlled by the port priority logic to prevent any of these signals from getting through the port into the memory bank until selected by the port priority logic.

There are, however, certain signals which feed directly to the port for processing therein. Among these are the address lines LA, LB and LC, any address appearing on the address lines is immediately compared by the port address recognition logic such as 380–A in port A to see if the address falls within the addressing structure of the memory bank to which the port is attached. Switches are provided for controlling this structure and in some cases to give a different addressing structure within the same memory bank to each port. If the address is recognized by the port, the address recognition logic returns the signal AHX to the unit which is connected to the port and which placed its address on the cable. The X designation in the signal is replaced by the letter of the port generating the signal e.g. AHA for port A, AHB, AHC etc in later discussions in this application.

Another signal which feeds directly into the port logic is the Memory request signal MQX which indicates that service is being requested from the memory bank which has recognized the address on the address lines. As is shown in FIG. 8 and will be described below in greater detail, this signal feeds directly into the port priority logic through an AND gate which must be enabled by a true AHX signal which blocks subsequent requests and through a rejection gate which insures that any noise pulses or other nonbinary signals created by the closing of the AND gate or other logic throughout the system on a signal which is asychronous to the gate closing are converted to binary signals. The port priority receives MQX signals for each of the ports and if these signals occur concurrently prior to the start of a memory cycle, it resolves the conflict in favor of the MQX signal from one of the ports so as to give that port access to memory. Concurrently in this case is defined to mean signals which appear at the priority logic during a predetermined period prior to the start of the next memory cycle after the one which commenced prior to such period and where such period is less than a complete memory cycle. In fact, for memory interleaving which will be discussed below, this period should be less than one half of a memory cycle.

Various priority systems could be devised for resolving conflicts between various ports. For real time systems where response is important, hardwired systems offer advantages. In one illustrative embodiment of the system the priority logic assigns priority on a hardwired basis in the following order A,B,C etc. with a port A having the highest priority, but with the logic favoring port C by giving it access to the priority logic without a time delay preceding this logic as is described below for ports A and B. As shown in FIG. 8c, port C has a separate access path to the memory bank. Generally the CPU is connected to this port.

Upon selection of a port by the port priority logic in response to a start signal from the memory control and an MQX signal, the priority logic enables the input-output gates connected with that port and the signals appearing at these gates are distributed throughout the main memory in the sequence required for the particular memory operation requested by the control signals. It should be noted that the address signals which appeared at the address recognition logic in the memory ports were also blocked from entering the memory bank by the input-output gates along with the data lines and the control signals. When these address signals enter the memory bank they are entered in the address register and the memory control logic generates the ARX (ARA, ARB, ARC, etc.) address release signal to the unit connected to the port which has just been enabled so that that unit can drop its address and memory request lines.

In order to increase memory speed and to reduce conflicts at memory banks which occur because one unit is tying up the memory bank with a large amount of sequential location transfer, an interleaving memory structure can be constructed. Such a structure forces a unit which is progressing sequentially through a group of addressed to access a different memory bank each time. When this structure is combined with a memory request generating structure in the unit which generates two separate memory request signals which overlap in time, the second of which is preceded in time by an address signal sequential to the address signal which preceded the first, interleaving can be achieved. In the event a time delay is not introduced as described under the description covering the rejection gate, an enabling signal SRAX must be received from the part by the requesting unit prior to generating the second memory request. In one embodiment Port C includes this feature.

In the illustrative embodiment described herein the interleaving function is accomplished by the use of transforming logic in each memory port in each memory bank which precedes the address recognition logic in its associated port, so that the address which is compared to the memory bank starting address associated with the particular port is the transformed address instead of the actual address. Address modification logic is then provided with the address register in the memory bank itself to restore the transformed address to its original address. As shown in FIG. 13, the most significant three bits of the address (L 15, L 16, L 17) are used for memory bank identification (for up to eight blocks). Additional bits should be used if more than eight memory banks are to be interleaved. Also more sophisticated versions of the system described may be used although the same general principles apply. To interleave two memory blocks, exchange the least significant bit (L 17) of these three bits with the least significant bit of the entire address (L 31). As shown in FIG. 13 under the heading "Block No.," the effect of this transformation is that the blocks are accessed alternately. A more complex interleave system can be built using these principles which will insure that no memory bank is accessed in succession by the same unit during a sequential processing of a group of addresses until all of the other banks have been accessed.

Figure 1A:
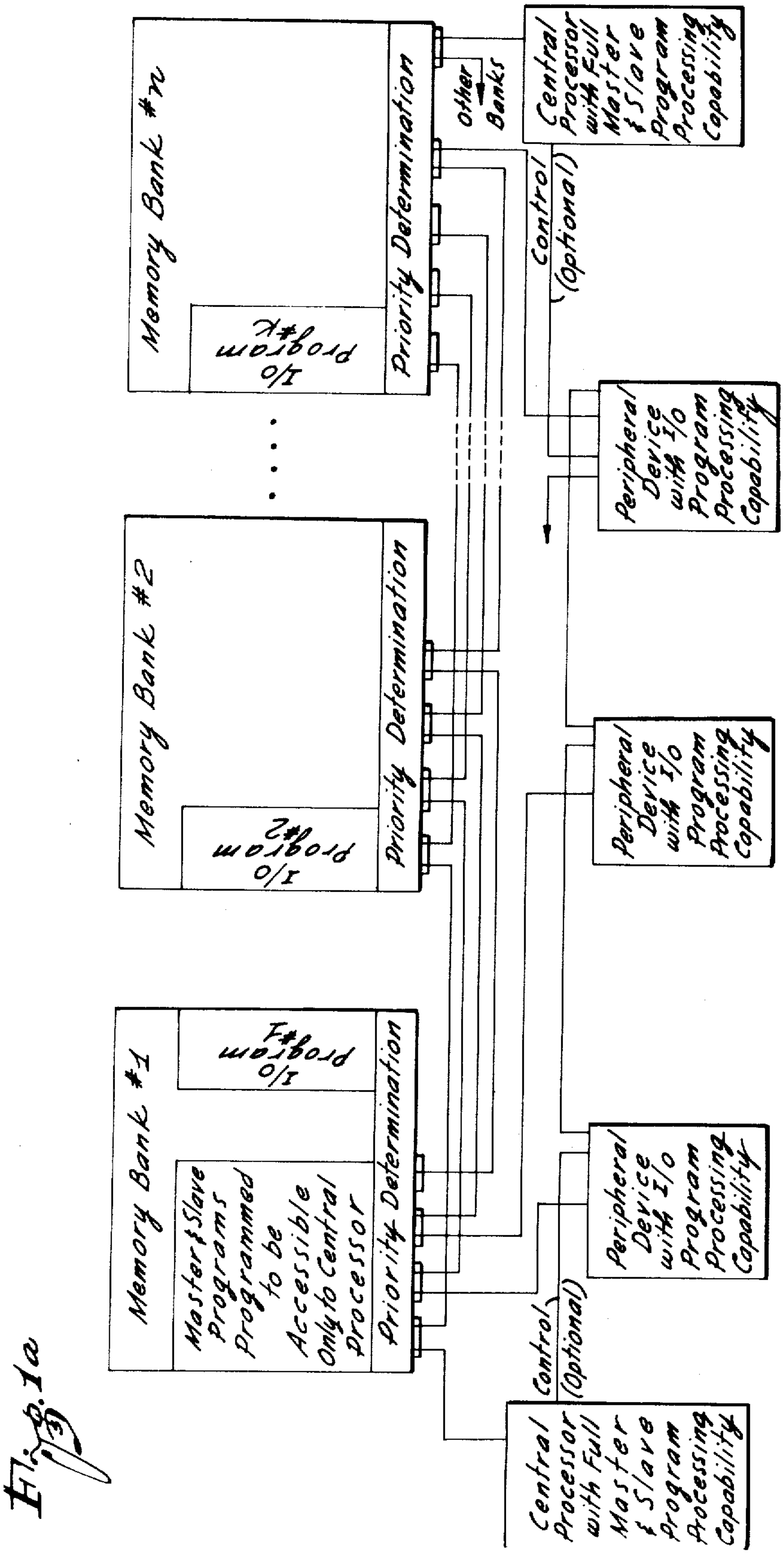

It can be seen from the foregoing discussion that by decreasing the size of the memory banks together with their associated ports, priority logic and interleaving structure to a size which contains the smallest number of storage locations greater than one which is practically and economically possible the greater bandwidth the system will have along with greater memory speed and a minimal possibility of conflicting requests. When a system of this type is combined with peripheral devices which have their own input-output capability, the real time responsiveness of the overall data processing system is greatly increased beyond anything possible at present. At the present time it appears that new memory techniques, integrated circuit techniques, large scale array techniques and "read-only-memory-techniques" can make such systems economically practicable in the near future. Once such limited input-output processing capability is built into peripheral devices, it is but a short step to increasing that capability to include full central processing capability in each peripheral device or group of peripheral devices, each of which is connected to each memory bank in a total memory which is fully addressable by each central processor and each processing peripheral device or group of peripheral devices as shown in FIG. 1A. In such a system the central processor would have full program processing capability. In a multiprogram environment this would include the ability to process a master control program and salve programs which could include the programs of individual users of the system. In such a system the central processor could control the processing peripheral devices as described in this application and as shown in FIG. 1A or could optionally control said processing peripheral devices by means of one or more special slave input-output master programs. In the latter event, each of the peripheral processing devices would require a capability for accessing a master control input-output program upon completion of their current jobs.

Figure 1B:
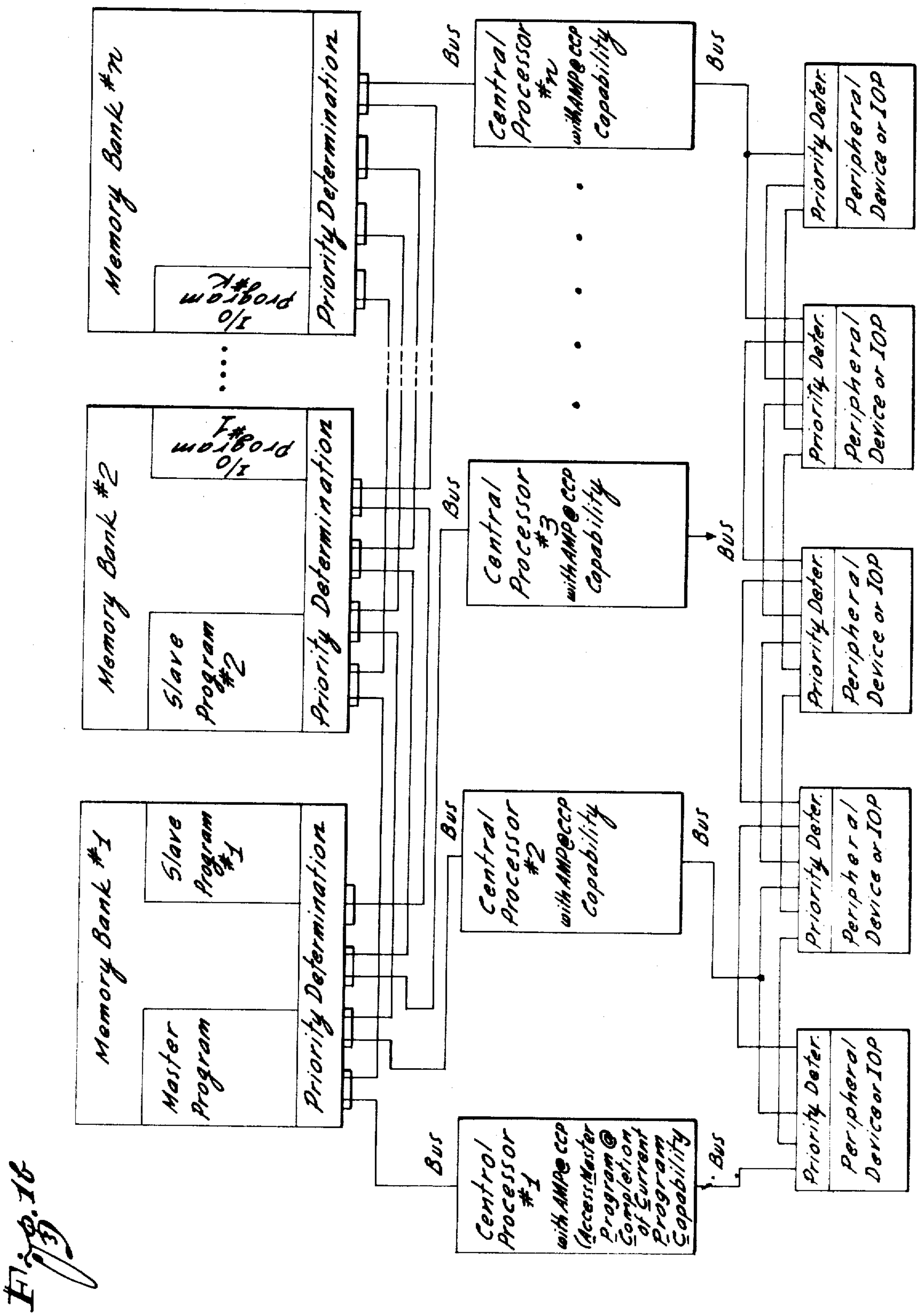

Another extremely fast real time response system suitable for multiprogramming based upon the principles demonstrated in this application and which can use a segmented multiple access memory system of the type described in FIG. 1A is the system as shown in FIG. 1B in which a group of central processing units simultaneously accessing the same memory banks as described above share the same peripheral devices also. Each central processing unit would have the full ability to access a master program and all salve programs and would include the ability to access a master program upon completion of its current program. In such a system each CPU could work on a slave program stored in memory the same way that the IOP works on the IOP program as described in this application and each CPU would be adapted to use principles described in this application in that it could request instructions from a master program stored in the memory when it is finished processing the current program. Thus, the memory would control the entire system through a master program accessible to a group of central processors instead of having a central processor control the system as shown in FIG. 1A. Each central processing unit would share a group of peripheral devices either through an IOP system as described in this application or by a priority system similar to the kinds described in this application located at each peripheral device or group of peripheral devices. With the band width supplied by the advance memory access system described above and the substantial absence of memory conflicts because of incremental memory design, it is possible for each CPU to process its own input-output while increasing the efficiency and real time response of the entire system over that possible by prior art techniques. Systems of the type shown in FIGS. 1A and 1B require further increases in hardware cost reduction through integrated circuit techniques or large scale array techniques in order to make such systems economically practicable.

If total memory is further subdivided into greater and greater numbers of memory banks with increasing numbers of ports, the cabling and connection at the access point becomes a problem. The cabling and connector system described in this application is an improvement over prior art techniques. However, time multiplexing techniques including microwave and laser techniques (Because of the very high multiplexing frequencies required) can be used as improved transmission techniques in place of the present cabling techniques as can integrated circuit and large scale array transmission line techniques. It is clear that the principles described in this application can be used to provide more efficient real time system architectures in commercially practical general purpose digital computer systems as soon as the micro-miniaturization technology proceeds far enough to make such techniques economically practicable.

It should be noted that the illustrative indications of program storage in the memory banks in FIGS. 1A and 1B are not intended to be limiting, but are intended for demonstrative purposes only. Almost any distribution of programs throughout the memory banks is possible using the principles of interleaving and mapping described herein and in related application. It is possible for any of the programs shown in those figures to be distributed throughout one or more banks of memory. It is further possible for any number of slave programs or input-output programs to be included in any memory bank up to the storage capacity of that memory bank.

MEMORY PORT INPUT

Referring now to FIG. 8, there is illustrated schematically and in block form a portion of a memory port. Thus, FIG. 8 shows a memory or memory portion 11a which may, for example, be a magnetic core memory or other fast access memory which is addressable in the conventional manner. The memory 11a is provided with a port A and port B. Each port, when enabled, permits access to the memory. Each one of two separate units is connected to one of the two ports. Thus, the CPU 10 may be connected by an address transmission bus 110 to port A, if the real time response of the I/O system is less significant than fast CPU operation.

The data may flow either way, as shown by the arrows from the CPU 10 to memory 11*a* or vice versa, while the memory address flows only to the memory 11*a*. The CPU 10 may have its own clock generator 317, producing clocking signals CL1.

Similarly, a peripheral device processor unit 12*a* may be directly connected to memory port B by a bus 121*a* which includes the addressing lines, LX, and data lines, MX, permitting data to flow either way and memory addresses to the memory port only. The peripheral device processor 12*a* may be controlled by its own clock generator 322, producing clocking signals CL2. Accordingly, since the various units are interconnected with each other and the memory 11*a* by cables of varying length, the two units 10 and 12*a* may be said to be asynchronous with respect to each other. The amount the units are out of phase with respect to each other will depend on the length of the cables and the repetition rate of the clock pulses of their respective clocks.

The peripheral device processor 12a with its clock generator 322 is also sometimes referred to as an input-output processor IOP. As stated, it serves the purpose to process data coming from peripheral devices such as punched cards, magnetic tapes and the like, into the memory 11*a* or arithmetic unit 10, or to control the flow of data from the computer or its units into peripheral output devices such as magnetic tape, card punches or the like.

It will be understood that more than the two units 10 and 12a may have access to the memory 11*a*. In that case more than the two memory ports 311 and 312 may be provided to control the flow of information from or to the memory 11*a*.

A first decision gate 324 is associated with the arithmetic unit 10 and a second decision gate 325 is associated with the peripheral device processor 12*a*. The two gates may be referred to as gates #1 and #2. The purpose of the decision gates is to control eventually ports 311 and 312 to enable one of them and disable the other in accordance with the priority of memory requests received from either unit 10 or 12*a*. To this end a logical AND gate 326 may receive a signal MQ1 from the CPU which is a memory request, that is, a request to either put data into the memory or receive data therefrom. Such an MQ signal is repeated until it is satisfied. This will initiate a memory cycle. Similarly an AND gate 327 receives a signal MQ2 from the processor 12*a*. The outputs of the AND gates 326 and 327 are fed into the respective decision gates #1 and #2. If no other memory request is present in the priority logic system at the time of the commencement of the next memory access cycle, the first signal to be received either MQ1 or MQ2 enables the appropriate memory port while the next signal, if any, is held until after the end of the first memory cycle.

Either one of the decision gates 324 or 325 will produce an output signal RQ1 or RQ2 in response to a proper memory request. The two output signals RQ1 and RQ2 are both passed through a logical OR gate 328 into a time-delay device 330, such as a delay line. This may be an inductive-capacitive network, an acoustic delay line, a magnetostrictive device or the like.

In any case, if either signal RQ1 or RQ2 arrives at delay line 330 at the time $t_0$, a signal GC, which may be termed the gate control signal, is developed at a later time $t_1$. The signal GC is fed through an inverter 331 to produce a logical inverse signal $\overline{GC}$ which is now applied to the two AND gates 326 and 327. It will readily be seen that if a false signal such as $\overline{GC}$ is applied to an AND gate, the AND gate is effectively disabled or blocked. It is well known that an AND gate will only have a true output when all of its inputs are true. Hence, by putting $\overline{GC}$ as an input to the AND gates 326 and 327, a new memory request such as MQ1 or MQ2 can no longer be passed. Thus, the two AND gates 326 and 327 are disabled and the two decision gates 324 and 325 have an output corresponding to the last input before gates 326 and 327 will close. Accordingly, any subsequent memory request cannot even reach the appropriate gate. In the meantime, the memory request last chosen by the priority logic is being processed. Eventually the appropriate port, such as port 311 or port 312, is opened to permit access to the memory 11*a*. At the end of the memory cycle the decision gates 324 and 325 are opened again. The time delay $t_d$ between the times $t_0$ and $t_1$ serves the purpose to allow enough time for the gates and other networks to settle into their new states.

The output signal of the decision gates #1 and #2, namely RQ1 and RQ2, is impressed on the priority logic gate 333. The priority logic gate 333 is controlled by another signal PC, or priority control, which is obtained at the time $t_2$ from the delay line 330. The presence of the signal PC will enable the priority logic gate 333 to generate an enable signal either EP1 or EP2 in response to a signal RQ1 or RQ2 into one of the two ports 311 or 312. This then will enable the desired port so that the proper unit can communicate with the memory 11*a*.

It will, of course, be understood that more than one memory unit 11a may be provided. Each additional memory unit should have its own ports. It will further be understood that more than one peripheral device processor such as 12*a* may be provided and that each memory may have more than two input ports.

Signal RW1 when true enables the set-side of a flip-flop EP1 in the priority logic 333 while it disables the set-side input for a second flip-flop EP2 thereby establishing the priority of port A over port B. The flip-flops EP1 and EP2 are instrumental in the generation of response signals, such as signal ARX signaling to the respective source for the memory request signal MQ, that it can drop its address and MQX lines because the address has entered the address register of the memory bank.

The signal EP1 or EP2 respectively gate the address lines into the memory; for example, EP2 will cause address lines LB from the IOP to control the addressing circuit within the memory bank, provided flip-flop EP2 could be set as the CPU did not make a memory request prior to time $t_1$.

It should be noted that the address lines LB pass through an address recognition unit 380-B (switches and coincidence gates) in the memory port which determine whether or not the particular address called for by the IOP is actually in that particular memory bank. A similar test is independently performed at another port on the address lines leading from the CPU to the memory bank (not shown separately). This test is performed entirely independently from the actual memory accessing operation, and precedes the issuance of a memory request signal MQ by the respective unit (CPU or IOP). Should the test be negative, an address-here signal AHB is not transmitted to enable the AND gate 326 to allow the memory request MQ by the unit cannot even enter the port, as symbolically denoted with AHX input for gate 327 of port B. On the port A side for the CPU, there is a similar arrangement. An IOP or the APU will issue a memory request only after receiving an address-here signal AHB, to be issued by the memory bank having that address location.

The operation of the system illustrated in FIG. 8 and the problem which is to be solved by the decision gate of the invention will be further explained by reference to FIG. 8*a*.

In FIG. 8*a* the various signals referred to hereinabove are plotted as a function of time. It should be noted that by convention a zero voltage level represents a binary zero and a +4 volt level represents a binary one. Thus, FIG. 8*a* shows CL1 and CL2, that is, the two clocks associated respectively with the CPU and the peripheral device processor 12*a*. It is also shown that CL2 rises at a later time than does CL1. In other words, the two clocks are not in synchronism.

The memory request MQ1 occurs in synchronism with its clock CL1 as shown. It determines the beginning of the time interval $t_0$ as shown in connection with the AND gate 327 output.

Accordingly a predetermined time later at the time $t_1$ the gate control signal GC occurs and becomes false at the time $t_1$. This is, of course, the inverted signal which is obtained from the inverter 331 and applied to the two AND gates 326 and 327. Hence at the time $t_1$ both gates 324 and 325 are closed.

It will now be assumed that the time delay $t_d$, which is the time delay between the arrival of the signal RQ1 or MQ1 (time $t_o$) and the arrival of the signal GC or $\overline{GC}$ (time $t_1$) is substantially coincident with the time delay between the leading edges of the two clocks CL1 and CL2. In that case it may happen that a memory request MQ2 from the peripheral device processor 12*a* arrives substantially at the instant when the AND gate 327 of the decision gate 325 is about to close. In other words, two signals may arrive simultaneously at the AND gate 327, that is, signals MQ2 and GC, which go in opposite directions at substantially the same instant. As a result an output signal 335 is obtained from AND gate 327. It will readily be seen that the signal 335 is an incomplete or indeterminate signal in that its voltage amplitude is substantially less than 4 volts, which is the standard true signal. Also its time duration is less than that of a clock period, hence making signal 335 also a non-logic signal.

The decision gate, such as 324 or 325, in accordance with the present invention is constructed to produce a decisive output signal even if an indeterminate (or non-logic) input signal such as 335 is impressed on the gate. Thus, even in spite of this indeterminate signal the decision gate 325 will produce an output signal RQ2 which will rise from zero to one, that is, from 0v to +4v as shown in FIG. 8a.

One of these decision gates, viz., the decision gate # 2 of FIG. 8, with its AND gate 327 is shown in FIG. 8*b* to which reference is now made.

The circuit of FIG. 8b includes an AND gate having a diode 337 on which the signal MQ2 is impressed and another diode 338 on which the signal $\overline{GC}$ is impressed. The two anodes of the two diodes 337 and 338 are connected together and through resistor 340 to a voltage source indicated at +8v which may, for example, be a battery. The two diodes 337 and 338 operate in the manner of an AND gate. In other words, unless both input signals MQ2 and $\overline{GC}$ are high or true, that is, unless MQ2 is true and GC is false, one or the other of the two diodes will conduct. Therefore, if at least one of the two input signals is false, the voltage at the junction point of diodes 337 and 338 and resistor 440 will be low or false. On the other hand, if both input signals are high, that is, if MQ2 is true and GC is false, the junction point of the two diodes will approach +4v, which is the level of the high or true input signals. The junction point of diodes 337 and 338 and of resistor 340 is connected to another junction point 342 by a diode 341 poled to conduct current from the battery to the junction point and which may be considered to be part of an OR gate, as will be subsequently explained.

The decision gate proper has a set input 343 and a reset input terminal 344 as shown. Both input terminals are connected to another junction point 345 by a pair of diodes 346 and 347. The two diodes 346 and 347 with the resistor 348 connected between their junction point and another voltage source +8v may be considered to form another AND gate.

There is further provided a diode 350 between junction points 345 and 342 poled to conduct between the positive voltage +8v and a negative voltage −8v connected thereto through three diodes 351, 352 and 353 in series and a resistor 354. Diode 350 may be considered the other or second input of the OR gate formed by diodes 341, 350. The three diodes 351 to 353 form a noise rejection circuit for rejecting noise pulses below a certain voltage threshold level. Thus assuming a voltage drop of 0.7v across each diode 351 to 353, they will form a voltage threshold of 2.1v to reject all pulses having a voltage amplitude less than that.

The decision gate proper may be considered to have two portions, a regenerative amplifier 355 and a buffer or output amplifier 356.

The regenerative amplifier 355 includes two transistors 357 and 358. The two transistors are of opposite conductivity type. Thus, transistor 357 may of the p-n-p type and transistor 358 an n-p-n transistor. Both transistors 357 and 358 are connected to provide positive feedback or regeneration. In other words, the collector of one transistor is connected to the base of the other and vice versa. The reason for this is that in a common emitter configuration a junction transistor exhibits a high current gain. Therefore, the current loop gain of two transistors coupled together in this manner is the square of the current gain of one and may be on the order of 2,000.

Thus, the emitter of p-n-p transistor 357 is connected to another positive voltage source =8v to which its base is connected by a resistor 360. Further, the base of p-n-p transistor 357 is connected to the collector of n-p-n transistor 358 by a diode 361. The base of n-p-n transistor 358 is connected to the collector of p-n-p transistor 357 by a charge-storage capacitor 362. Also, the base of transistor 358 is connected to the junction between diode 353 and resistor 354. Furthermore, the collector of transistor 357 is connected to ground through a resistor 363 and also by a voltage bypass diode 364 to the collector of transistor 358. The emitter of n-p-n transistor 358 is connected to a negative voltage source indicated at -8v through a resistor 65.

Another n-p-n transistor 66 forms part of the buffer amplifier 56 and has its emitter connected to that of transistor 358, while its base is grounded. Its collector is connected to the voltage source +8v by resistor 367. Furthermore, the collector of n-p-n transistor 366 is connected to a positive voltage source +4v by a diode 368 which serves as a clamping diode. In other words, the diode 368 will not permit the voltage of the collector of transistor 366 to rise above +4v but will permit it to go negative with respect to the +4 source. The n-p-n transistor 366 together with the p-n-p transistor 370 forms the buffer amplifier 356. The base of the p-n-p transistor 370 is connected through resistor 367 to the positive voltage source +8v. Its emitter forms the output terminal 371 on which the output signal RQ2 appears. It is connected to a positive voltage source +4v through a resistor 372. The collector of the p-n-p transistor 370 is connected to a negative voltage source −8v through a resistor 373.

There may also be provided a feedback connection 374 between the output terminal 71 and the set input 343 as shown. This forms the latch of the gate and serves in lieu of a set signal. Once the output or buffer amplifier has been triggered into its high state which is a +4v level, a latching signal is propagated through the feedback lead 374 into the input terminal 343. This will maintain the decision gate in its high state until it is reset by a suitable negative-going signal on the reset terminal 344 as will be presently explained.

The operation of the circuit of FIG. 8*b* will now be described. Assuming initially that there are no signals present on the various input terminals. This means that for each of the two AND gates 337, 338 and 346 and 347, at least one of the signals must be low, that is, zero volts. For example, the reset signal on input terminal 44 may be assumed to be low to render diode 347 conductive. Similarly the gate memory request signal MQ2 may be low rendering diode 338 con-ductive. There are five diodes in series with any of the input terminals. However, two of the diodes, such as diodes 347 and 350 or 337 and 341, are oppositely poled and hence the voltage drops thereacross cancel. Therefore, the voltage drops across only three of the diodes should be taken into consideration. These tend to render the base of n-p-n transistor 358 negative to a voltage of, say, −2.1v, corresponding to a voltage drop of 0.7v across each diode.

The emitters of transistors 358 and 366 are tied together. Hence, neither one can be more negative than the voltage drop across one diode, that is, the voltage drop between the base and emitter of transistor 366. Accordingly the two emitters of transistors 358 and 366 are now fixed at −0.7v. Accordingly the current across resistor 365 must be about 15.5 ma which will produce a voltage drop of approximately 7.3v. Since the base of n-p-n transistor 358 is a −2.1v as just explained, and its emitter is only −0.7v, transistor 358 is cut off.

The emitter of p-n-p transistor 357 is fixed at +8v. On the other hand its base is tied to the emitter through resistor 360. Since n-p-n transistor 358 is cut off, no current can flow through resistor 360. Accordingly, since both its emitter and base are at the same voltage, p-n-p transistor 357 is also cut off. As a result, the collector of transistor 357 is at ground potential, Accordingly, as long as the n-p-n transistor 358 is cut off there can be no current flow through diode 361, nor will there be any current flow through diode 364.

At the same time, however, n-p-n transistor 366 will be conductive. Its base is fixed at ground potential while its collector is close to ground potential. On the other hand, the emitter potential will be negative. Thus, by way of example it may be assumed that a current of 6.5 ma flows through resistor 367 causing a voltage drop of about 8v. Therefore, the voltage of the collector of n-p-n transistor 366 will be close to ground and the transistor 366 will be saturated.

In order to provide a current flow of 15.5 ma through resistor 365, we may assume a current flow of 6.5 ma through resistor 367, of 2 ma through the base of transistor 370 which is also conductive, and of 7 ma through the base of transistor 366. These three currents of 2, 7 and 6.5 ma jointly make up the current of 15.5 ma through resistor 365.

At the same time the output transistor 370 will also be rendered conductive. The voltage of the base of p-n-p transistor 370 is also approximately ground, and that of its collector must be negative, say, −2v. This corresponds to a voltage drop of 6v across resistor 373 due to a current of 60 ma.

It should also be realized that diode 368 is nonconductive because its cathode is more positive than its anode. In view of the current flow through p-n-p transistor 370 there will also be a corresponding current flow through resistor 372 and feedback connection 374. As a result, the voltage of the emitter of transistor 370 will be approximately at ground potential, as will be the set input 343 by virtue of the feedback connection 374.

Thus, the output signal RQ2 at the output terminal 371 is in the low or false state, that is, it is of the order of zero volts.

The decision gate will remain in this steady state condition until a positive going input signal MQ2 appears at the input of diode 337, while the input to diode 338 is assumed to remain positive. In other words, if GC is false, $\overline{GC}$ must be true and high as shown in FIG. 8a.

Accordingly, if MQ2 becomes true or +4v, both diodes 337 and 338 will now be barely conductive. Consequently the junction point of diodes 337 and 341 tends to approach, say, +4.7v. This will render diode 341 and diodes 351 through 353 conductive. A voltage on the order of +2v will appear at the base of n-p-n transistor 358 due to the voltage drops across four diodes 341 and 351-353. This is assuming again that there is a 0.7v drop across each of the four diodes 341 and 351 through 353. This positive going voltage appearing at the base of transistor 358 tends to render the transistor 358 conductive. At the same time, the p-n-p transistor 357 will also become conductive. A current loop is now formed which may be traced as follows: current flows through the collector of n-p-n transistor 358, its base, capacitor 362, the collector of p-n-p transistor 357, its base, and diode 361 back to the collector of transistor 368. As stated before, the current gain in this current loop may be on the order of 2,000 or even more, which is simply the square of the current gain of one of the transistors in the common emitter configuration.

The capacitor 362 serves as a charge storage device. In other words, the capacitor 362 allows regeneration to persist for a limited time determined by the time constant of the capacitor 362 and resistor 363, which may be on the order of 40 nanoseconds. Hence capacitor 362 may be considered a pulse stretcher. After this period the transistor 357 reverts to its former state where it was cut off, unless there is by that time sufficient regeneration for the current gain to persist.

The two diodes 361 and 364 serve as an anti-saturation device. In other words, they prevent saturation of transistor 357 in a conventional manner by bypassing a portion of the current.

Generally the current builds up rather rapidly in this loop in a matter of nanoseconds until eventually the current flow from the emitter of n-p-n transistor 358 and through resistor 65 increases sufficiently to raise the emitter potential to above ground potential. This would require a total current of about 17 ma through resistor 65, of which about 15 ma is furnished by the transistor 66 as long as it is conducting. Preferably, the transistors 57 and 58 are of a type which permits fast switching.

Generally in order to cause the two transistors 357 and 358 to regenerate it is necessary to make transistor 357 pass enough current so that its base potential falls to, say, 7.3v. This means that a current of 0.7 ma must pass through resistor 360, causing a voltage drop of 0.7 v. This current of 0.7 ma must also pass through transistor 358. This is the first one of the two current threshold levels of the regenerative amplifier.

This current flow also represents a loop again of 1. As soon as the current of 0.7 ma through resistor 360 is exceeded, the loop again increases beyond 1 and regeneration is assured.

It should also be pointed out that the current of 0.7 ma is now diverted from the current which flows through the base of transistor 366. The reason is that the larger current flow through transistor 358 will tend to raise the voltage of the two emitters of transistors 358 and 366, which then tends to reduce the current flow through the base of transistor 366 accordingly. At that time the transistor 366 is in saturation, that is, it carries as much current as it can. The reason for this is that the ratio of its collector current to the new base current is greater than beta, where beta is defined as the ratio of a small change in collector current to the resulting change in base current, the collector voltage being constant. At this instant the collector current is 7 - 0.7 ma, or 6.3 ma. The transistor 366 will only move out of the saturation region when the ratio of its collector current to the base current equals beta. By that time, most of the 7 ma base current of transistor 366 has been diverted by transistor 358. This forms the second current threshold level.

Assuming that the emitter of n-p-n transistor 358 becomes either zero or even positive, this will immediately cut off n-p-n transistor 366, since its base is tied to ground, while its emitter now rises to a positive voltage. When n-p-n transistor 366 ceases to conduct, the voltage of the base of transistor 370 will immediately rise toward +4v, being clamped at this value by diode 368. This in turn will cut off p-n-p transistor 370 because its base is at a potential higher than that of its emitter which is at ground potential and cannot rise above +4v.

Since p-n-p transistor 370 is now rendered nonconductive, the voltage at its emitter will rise to that of the voltage source +4v and the signal RQ2 at the output terminal 371 will rise to a positive or true value. This positive voltage of the order of -4v also appears at diode 346 due to the feedback connection 374, thus maintaining the circuit in this condition until it is subsequently reset.

The circuit may be reset, that is, the latch may be removed by applying a negative going signal to the reset terminal 344. This in turn will reduce the voltage of the base of n-p-n transistor 358 below ground level and cut off the transistor so that the circuit again reverts to the original or steady state condition previously described.

It will be noted that the p-n-p transistor 370 forming part of the buffer amplifier is either fully conductive or not. If it is conductive, the output signal is false, or on the order of zero volts. If the transistor 370 is cut off, the output signal will be on the order of +4v, that is, it will be true. This result is obtained regardless of the size of the input signal MQ2 and whether it is of the normal amplitude or small.

If an incomplete input signal such as shown at 335 in FIG. **8*a* is applied to the junction point 342, it may require the regenerative amplifier 355 a somewhat longer period of time than the normal time with a complete input signal to regenerate to an extent that it carries enough current to cut off the transistor 366 and consequently the transistor 370. As long as the incomplete input signal 335 which appears at junction point 342 has enough voltage amplitude to overcome the threshold value of the noise rejection circuit formed by diodes 351 - 353, it will trigger the transistor 358 by applying a positive going signal to its base. The storage capacitor 362 tends to hold such an input pulse for a certain period of time. Thus, the capacitor 362 may be considered a pulse stretcher, which facilitates triggering of the transistor 358**.

The critical point is at a loop gain of one which may correspond to an input current on the order of 2 microamperes. Unless the regenerative amplifier rapidly moves into a region of higher loop gain, the circuit may remain at least for a certain length of time in an indeterminate state with a current gain of one. Nevertheless, the output signal will be either at a low or at a high voltage level and will not assume an indeterminate value such as the signal shown at 335 in FIG. **8*a***.

In order to insure that the regenerative current loop will actually regenerate in response to even an incomplete input signal, it is desirable to have an amplifier with high gain and fast regeneration. Thus, the gain should be high enough so that the current only has to traverse the current loop a very few times. In addition, the current should be able to flow around this current loop as fast as possible. This is determined essentially by the gain-bandwidth product of the loop, which may be on the order of 500 megacycles. This means that at 500 megacycles the gain will be one.

It will thus be seen that the decision circuit of FIG. 8b will reject noise pulses appearing at the junction point 342 having an amplitude below approximately 2.1v, by virtue of the diodes 351 to 353. Subsequently the output circuit will not be triggered unless and until the total current contributed by both transistor 358 and 366 through resistor 365 will approach, say, on the order of 17 ma or more to render the emitters of transistors 358 and 366 approximately zero or positive. Such a current will then finally change the state of the two transistors 366 and 370, forming together the output or buffer amplifier. In other words, enough current must flow through transistor 358 to turn off transistor 366 and subsequently transistor 370.

Hence, the decision gate will always render a decision by developing either a low or a high output voltage level. In the worst case, it will remain in its low state when the incomplete input signal has too low an amplitude, or else it may require more time to change states than is available.

It should be noted that a reset signal will appear at the input terminal 344 at the end of a normal memory cycle. Since this is conventional and not part of the present invention, no further explanation is deemed to be required.

There has thus been disclosed a digital computer having several ports for its memory, each port being accessible by a different unit, such as the CPU or a device processor.

There has thus been disclosed a digital computer having several ports for its memory, each port being accessible by a different unit, such as the CPU or a device processor. The ports are enabled or disabled by a priority logic system, including a decision gate for each unit. The decision gates in turn are disabled some predetermined time after the arrival of the first memory request. The decision gates are so arranged as to have either a high or a low voltage output level, even if its input signal is at an indeterminate or lower than normal level. This may happen if the gate controlling a decision gate is about to close at the very instant another memory request arrives from the unit connected thereto. The decision gate itself has a plurality of successive current threshold levels whereby it will reject noise pulses as well as requiring successively higher currents to make the output buffer amplifier change its state. Preferably the gate is of the latch type, in which case it may be reset at the end of a memory cycle.

THE CENTRAL PROCESSING UNIT (CPU) & THE CPU-IOP INTERFACE

Figures 5, 5A, 5B:
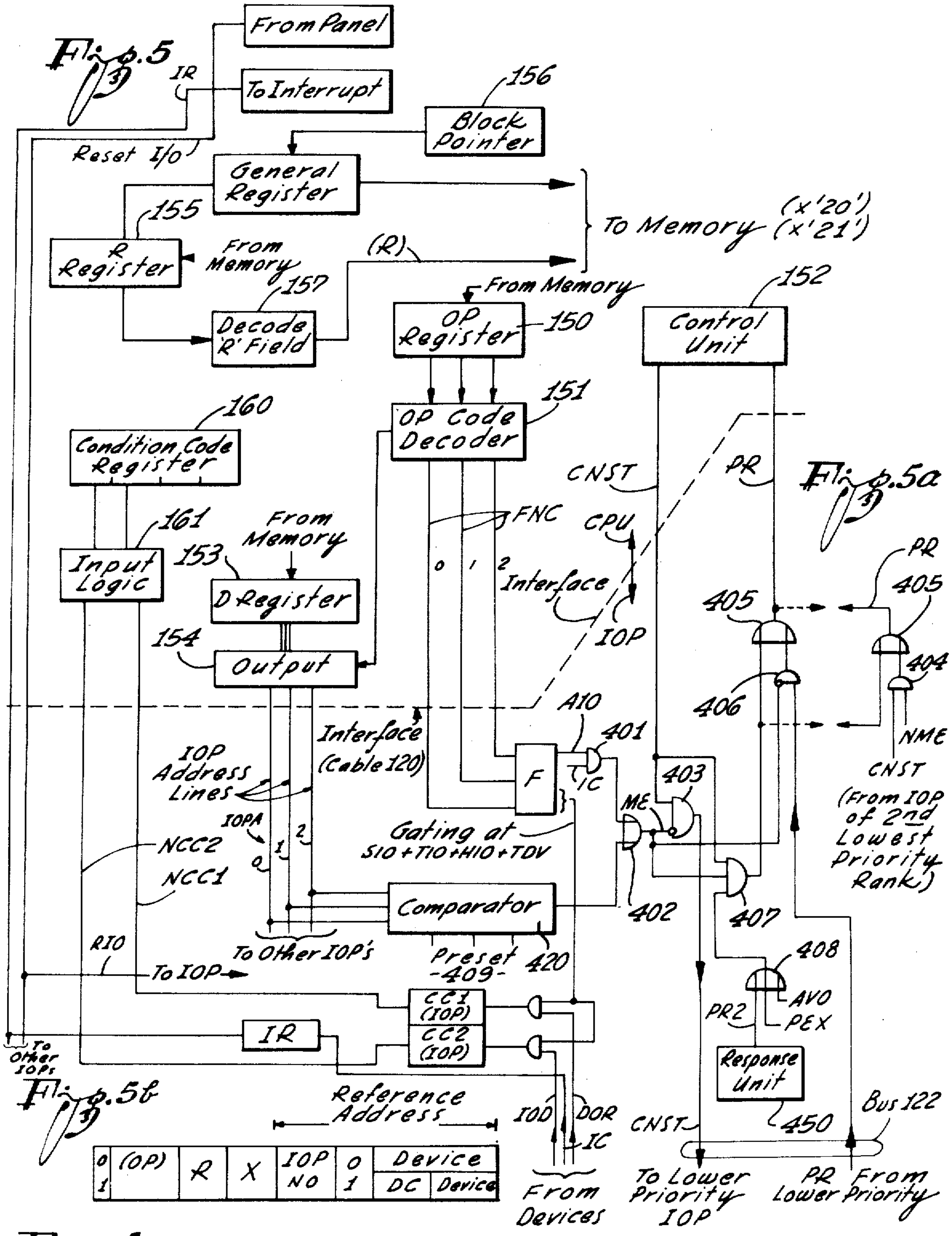

The central processing unit of the computer to which the input-output system as described pertains is described in many details in a patent application, Ser. No. 572,835, filed Aug. 16, 1966 of common assignee. The disclosure of this patent application is incorporated, by reference, herewith. The CPU, however, is illustrated in FIG. 5 and will be described as far as needed for conveniently explaining the operation of system in accordance with the present invention. The terminology employed herein will be very similar to the terminology used in said application.

The computer is presumed to execute instructions presented to the CPU as instruction words, having a format as shown in FIG. 5*b*. The instruction word includes in descending order of bit positions: (1) an indirect address bit; (2) an operate or OP code; (3) an R field; (4) an X field; and (5) a reference address field. The CPU includes an operate code register 150 or OP register which receives the operate code of an instruction word when withdrawn from memory during program execution. The operate code is decoded by OP decoder 151. If the operate code is one of the five input-output instructions to be described below, a specific three bit code will be set by decoder 151 into the three function lines FNC0, FNC1 and FNC2. That three bit code identifies the particular I/O instruction. Lines FNC lead to all IOP's. Alternatively, the Op codes could be selected such that three bits can be used directly to drive the function indicator lines FNC. In addition, the operate code decoder of the CPU operates a control unit 152 which in case one of these input-output instructions has been detected provides a control strobe signal CNST through the CPU-IOP interface to the peripheral devices and particularly to all of the IOP's.

At times, this control unit 152 will receive from the peripheral system "proceed" signal PR which when thus received, signals to the CPU that one of the input-output devices has performed its part in the execution of the I/O instruction, and that continuing the execution of the instruction is now up to the CPU. Thus, in case a signal PR is received the CPU decouples from the input-output system by releasing CNST for the remainder of that instruction. The lines for signals FNC, CNST and PR and others will, in the following, be designated by the symbols of the signals they transmit. Those lines illustrated in FIG. 5 and passing through the IOP/CPU interface are part of the trunk tail cable 120 system (FIG. 1).

A register 153 in the CPU, called a D register, receives the reference address field of the instruction word from memory. For instructions other than I/O instructions, the reference address defines a core memory address. For I/O instructions that field is interpreted differently. Under control of the operate code decoder 151, and in case of certain input-output instructions, the output logic 154 for the D register will pass three bits of that address field into a three line bus called IOP addressing lines IOPA0 to IOPA2 and being part of the trunk tail cable 120 leading to all IOP's. These three lines interconnect the output logic 154 with address code comparators in each of the IOP's. Comparator 420 is illustrated in FIG. 5 as pertaining to one IOP and it receives a three bit code identifying one of, at most, eight possible IOP's. Concurrently, the comparators in the other IOP's receive the same code.

The remainder of the reference address field of an I/O instruction word includes bits defining a device address. These bits are not transmitted to the IOP's via interface bus 120.

As developed in greater detail in the above-identified application, Ser. No. 572,835, the CPU has a private memory portion, also called general registers. These serve in blocks as CPU extensions, one block at a time, while the remaining blocks serve as temporary storage or fast access memory. The particular block serving as CPU extension is referred to as current block. The current block is selected among the several blocks of the general registers by a so-called block pointer register 156. Each block has 16 registers and each register within a block is thus identifiable by a four bit code. Within the instruction format employed throughout the computer, certain bit positions define the so-called R field (FIG. 5*b*) which contains a code interpreted as within block address code. These bits are set into an R register 155 during certain phases of executing an instruction; the R register causes addressing of one of the 16 so-called fast access memory locations, such as registers, in the current block, then serving as CPU extension. The general operation of this register addressing is explained in the above-identified application. Thus, one of the 16 registers or fast access memory locations of the current block as defined by the block pointer can be addressed directly through the code held in R field register 155 and receiving the corresponding r field bits from each instruction word.

It is of significance for the present invention that the R field code when odd identifies one general register of the current block while an even R field code defines two thereof namely, the one directly identified by the R field code and the next one, interpreting the addressing code as number. The one or two general registers thus identified will receive certain data communication from an input-output processor whereby that communication does not run directly through interface connection lines of bus 120. Instead, two memory locations within the core memory are set aside for the purpose of that communication. An IOP will provide to one or both of these locations information and subsequently the CPU will withdraw that information therefrom or vice versa. These particular core memory locations are referred to as X'20' and X'21' throughout this application.

In addition, it is of significance that for particular ones of the input-output instruction, including, for example, input-output instruction called start input-output device or SIO as explained in greater detail below, a particular one of the general registers of the current block, identifiable by an R field code (0000) but not being so identified by the R field in the instruction word, participates also in the execution of the SIO instruction and is automatically addressed when decoder 151 detects SIO. That general register contains a particular memory address which is of significance for the input-output operation then about to be started.

Finally, it is of importance that the R field code itself has certain numerical significance. Its code can be an odd number, an even number or it can be zero. Therefore, there is for this purpose provided an R field decoder 157 which interprets the R field code just as *a* number, decoder 157 distinguishes among the three possibilities that the R field code is odd, even, or zero and provides a two bit code identifying these three cases accordingly. This two bit code is symbolically denoted (R). This R field number (R) itself after decoding is being used to determine whether locations X'20' and X'21', or locations X'20' alone, or neither or them is involved in the execution of an instruction.

As to the X field of the instruction word, this denotes indexing. A preferred indexing method is described in application Ser. No. 546,279, filed Apr. 29, 1966 and to be used, for example, for accessing a general register of the current block holding device controller and IOP addressing codes.

Finally, the CPU is provided with a so-called condition code register 160 having four stages. For each of the instructions within the instruction repertoire of the computer, the condition code setting towards the end of execution of an instruction is of significance for further procedure, either of the execution of the instruction itself or of the continuance of the program. For the input-output instructions the condition code is of significance. Towards the end of each of the input-output instructions a condition code must have been set into the condition code register 160; if not, there is significance, per se. However, not all four stages of register 160 are being used, only the two first ones thereof. Lines CC1 and CC2 lead through a bus to all of the input-output processors.

During input-output instruction execution, these first two stages will be set or reset through bits passed to the CPU through two IOP-CPU interface lines NCC1–NCC2, being part of cable 120. All IOP's can control these lines, but only one at a time is permitted to do so, namely, the one having been addressed via the IOPA lines, or the one of highest priority among those having raised an interrupt. An input logic 161 in the CPU inverts the bits so that zero bits in either or both of the "noncondition code" lines NCC1, NCC2 can be used to indicate some failure of operation, while that will then result in one bits in register 160.

The IOP-CPU interface includes an interrupt request line IR as part of bus 120 through which any of the devices can call an interrupt through its respective IOP then setting the IR line high. That line leads to the interrupt logic of the CPU, details of which we explained in the above-mentioned application Ser. No. 572,835. The IOP-CPU interface includes further a reset command line RIO, leading from a reset button in the front panel to all IOP's as part of bus 120, and from there to all devices to reset the entire I/O system. A clock signal of 1 mc may also be transmitted through a separate line (not shown) to all IOP's and all devices.

INPUT-OUTPUT PROCESSOR (IOP) - REGISTERS

The input-output processor used in practicing the invention comprises a plurality of registers and a control phasing and timing unit, including individual control and storing elements (FIG. 6); it includes also a priority connect logic shown in FIG. 5. As far as the registers are concerned, the following registers are of importance for a better understanding of the invention. The A register 460 consists of eight buffer-type flip-flops and normally contains the device and device controller addresses, identifying device and device controller with which the IOP cooperates currently. The A register receives the device and device controller addresses either from certain low order bit positions of the M register 461 which is the principal register for communicating data to and from memory via the memory bus MX, which is part of bus 121. Alternatively, the A register can receive device and device controller addresses through eight function response lines FR0 to FR7 which connects the IOP to all of the device controllers, or more precisely, to the subcontrollers pertaining to the several devices to be serviced through this particular IOP.

The C register 462 consists of 15 buffer amplifiers and is used only as input to an adder 463. Input data for the C register is taken from the M register and from the specific registers of the fast access memory of the IOP to be described more fully below. The F register was already mentioned above; it consists of six buffered flip-flops to receive from the CPU a three bit code via the CPU function code lines FNC0, FNC1 and FNC2. The F register provides, when triggered, the function indicator signals for transmission to the device and device controllers as well as for use internally in the IOP. Each one of these function indicator lines represents a different computer I/O type instruction then executed by the CPU and represented by a specific coding applied by the OP decoder in the CPU to the FNC lines. These instructions are denoted SIO, TIO, TDV, HIO and AIO and will be dealt with in separate chapters.

The S register 464 contains at any instant the particular addressing code for passing corresponding addressing code signals to 16 memory addressing lines LX15 to LX31, pertaining to bus 121 (121*a*or 121*b* as the case may be). The S register, through lines LX, provides access to a specific memory location as identified by the code then held in the S register. The S register contains 17 buffered flip-flops. The I register 465 receives input data or order bytes from peripheral devices. An input for the I register is provided by data lines called DA0 through DA7 connected to correspondingly designated data lines leading from all device controllers serviced by this IOP to bus 131. The I register also ac cepts data bits form the IMB register 467 which is an eight bit buffer receiving bytes through distributor 469 from four different byte positions in M register during IOP output operations and before transferring them to the 0 register 466. The 0 register, in turn, drives the eight data lines DA0 through DA7 in case data or orders are to be transmitted the the devices via their device controllers. The I register provides data bytes to the M register to be distributed therein in proper byte locations and as symbolically denoted at 469. As stated, communication between core memory and IOP runs through 32 data lines MX0–MX1 and involves always the M register, which is thus a 32 bit register. On the other hand, the transfer of data to and from devices is usually to the byte level (4 bytes=1 word) and registers 0 and 1 are designed accordingly. The distributor 469 thus handles the proper byte positioning and gathering as between byte level registers 0 and 1 and word level register M.

An IOP cooperates with the devices it services through the device controllers thereof under the control of so-called commands, manifests each by a so-called command double-word. These command double-words are normally stored in the core memory requiring two locations to the word level for each of the command double words. A plurality of such command double words usually held in memory locations having consecutive addressing codes constitutes an I/O program for a particular device.

The command double words are withdrawn from memory and fed to an IOP for command execution by the IOP. The transfer of a command double word from core memory to IOP is initiated by the respective device controller during a so-called order-out service cycle described in a separate chapter, whereby normally the first such withdrawal comes after the computer( CPU) has executed a start-input-output instruction (SIO) for starting a device controlled by that device controller. The command double word includes a plurality of codes and numbers. The regular command double word includes: (1) and order code which when received by the IOP is passed on to the device controller for control thereof whereby additionally the order controls subsequent operation of the IOP for execution of the command of which that order is a part; (2) a byte count number identifying the number of data bytes to be transferred between memory and device via IOP and device controller; (3) a plurality of flag bits used for controlling operational steps to be taken by IOP and device controller when the desired data transfer operation is terminated regularly or irregularly; (4) a byte address defining the source or destination for the first byte to be transferred between device and memory.

The items (1) to (4) of a command double word, after withdrawal from memory are held in certain registers associated with the particular device controller and defining a fast access, ultimate memory location within the IOP. These items remain in the location even if not used by the IOP (because the IOP cooperates at times with other device controllers using their respective private memory locations) and until substituted by another command double word, the abridged types of commands (transfer-in-channel, and stop) will be described in later chapters.

The private, fast access memory is represented at 470. A memory location within the private memory 470 of the IOP associated with a particular device controller will normally be addressed through the addressing code held in the A register and fed therefrom to a decoder 471 to provide access to the plurality of registers, defining a memory location. The registers for one memory location associated with a particular device controller are illustrated, and it will be understood that the entire fast memory is composed of like pluralities of such registers, equal in number to the number of device controllers serviced by the IOP. On the other hand, if the IOP is not operated in multiplexing fashion as far as serving several devices at the same time, only one such memory location for all devices is needed. This modification causes then the IOP to be a selector IOP.

In detail, a memory location as defined for the IOP includes a BA register consisting of 16 fast access flip-flops; this register contains the current byte address having meaning in relation to the core memory of the computer. This byte address defies at any instant a specific word location in one of the core memory banks and a byte position within that word location, with which the particular device and device controller operates, or has operated last, for purposes of byte transfer in either direction between core memory and device via the IOP, depending on the particular type of data transfer operation. The byte address is incremented by "one" as each such byte is transferred through the IOP. Incrementation runs through the C register in that the content of the BA register is passed into the C register and from there through the adder and back to the BA register. Additionally, the BA register content is coupled to the S register so that the particular memory location can be accessed through the memory bus lines LX.

Next, the private memory location for a device controller contains a CA register which constitutes a program counter and consists of 16 fast access flip-flops and which holds the current command address which is a core memory address. This command address will at times also be fed to the S register, namely, whenever a particular command word location in the core memory as defined by this address has to be accessed. The CA and BA registers share common data input and output lines because neither of them has to be accessed concurrently. For program counting, of course, the content of the CA register runs also through the C register, the adder, and back to the CA register for purposes of incrementing the address. Since command words are double words and require two memory locations, the program advance is carried out by incrementing the second low order bit of the address by one. At times an incrementation by four may be needed which will be described in detail below.

The BC register of each private memory location associated with a device controller consists of 16 fast access flip-flops containing the current byte count. This means that for a sequence of byte transmissions between core memory and peripheral device the number held in the BC register defines the number of bytes still to be transferred during one basic operating cycle. The number held in the BC register will be decremented by one with each transfer, for normal or forward direction type operation of the respective device. For backward operation the byte count is incremented. For each effective byte transfer through the IOP, the BC register will be coupled to the C register, the byte count number will run through the adder to provide for the decrementation or incrementation as required. The new byte count number is then returned to the BC register. During each such return of the decremented (or incremented) number, a test is performed by a "count zero test" stage 481 in order to determine whether the byte count has been reduced to zero, as this will mark the end of a byte transfer sequence. The output of this count tester sets a flip-flop ZDC when detecting "byte count zero". Flop-flop ZDC then controls further procedures in the IOP, such as the providing for a so-called terminal order and service cycle termination.

The next register within the fast access memory portion associated with the particular device controller is the FFS register which consists of 16 fast access flip-flops holding flags and status bits of the current operation. For updating status and flags, the content of the FFS register runs through the C register and back to FFS. Additionally, status information is contained in the IS register consisting of eight fast access flip-flops. The IS register contains the interrupt status of the last successfully started device and device controller. This information is provided to the is register as a result of the state of flags in FFS register. One set of IS and FFS registers is shown in greater detail in FIG. 12 showing particularly the designation for status and flag bits.

The OF register consists of eight fast access flip-flops, three of them containing the least significant three bits of the byte address. The content of this register is used to keep track of the distribution of bytes as between their concatenated position in M register and serial passage to IMB buffer or from I register. Also, the OF register obtains the duplication of some of the flags. Except for status information developed during IOP-DC operation cycles and the CA register content, all other information is initially passed from the core memory into this private memory of the IOP as a command double-word. Thus, the two words constituting a command double-word are sequentially withdrawn from memory and distributed into the several registers of the private memory. The content of these registers associated with a particular device controller is instrumental in the control of IOP-device cooperation. Sequential loading of these registers establishes an IOP device program. Access to these registers is provided through the A register and decoder 471, the registers to the other device controllers then serve as temporary storage until the IOP resumes the program for them. The IOP contains, in addition, registers not illustrated which serve for intermediate storage of bits, bytes, words, in order to facilitate operation and the transfer of data in between the different register.

CONTROL SIGNAL RECEIVERS& GENERATORS IN IOP

Figure 6:
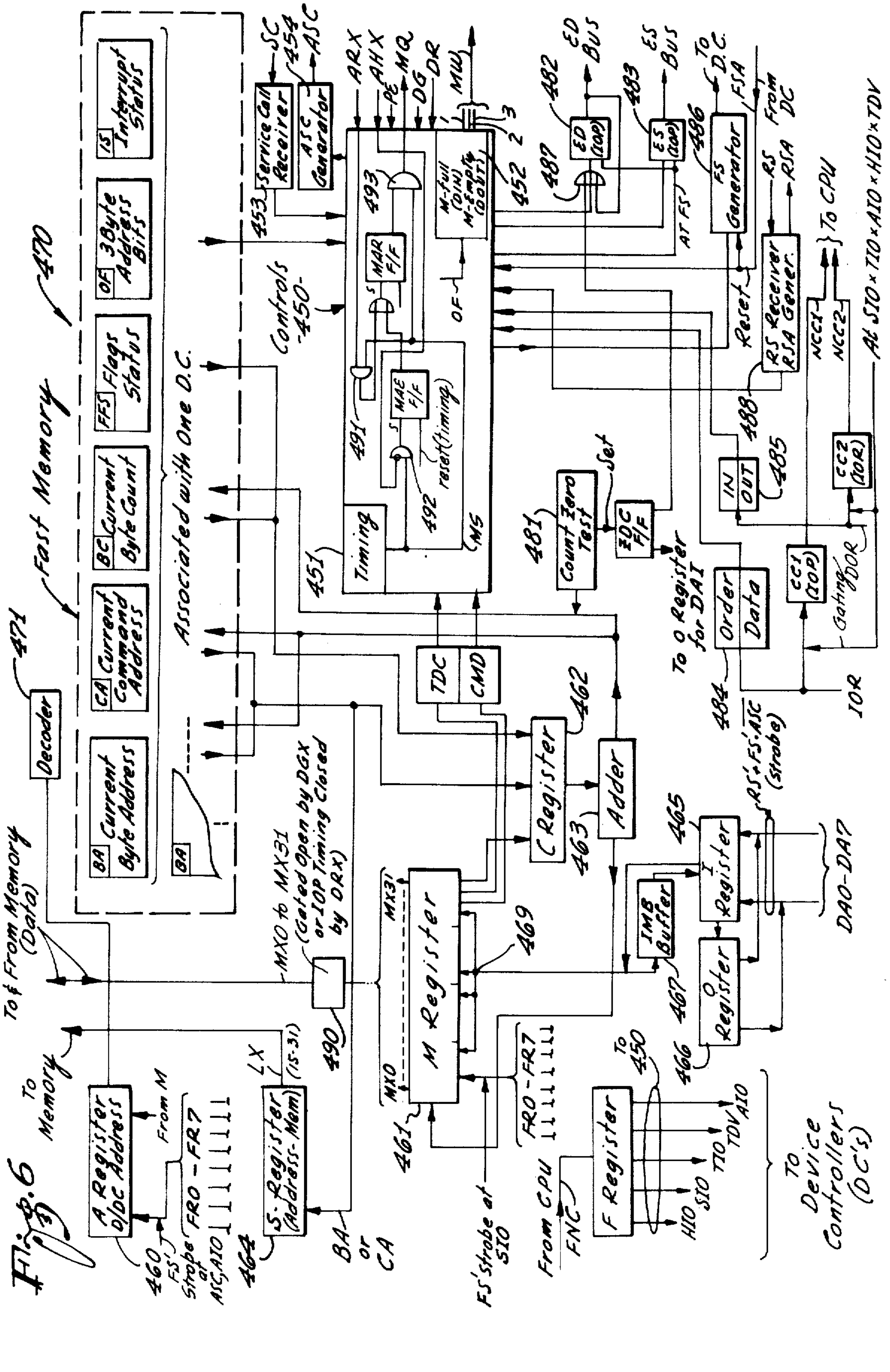
FIG. 6 illustrates a block diagram of the principal registers, private memory and important control elements in an IOP.

Particularly for purposes of communicating with the external devices, the IOP is provided with the following additional elements, which can be regarded as included in unit 450 even though they are illustrated separately in FIG. 6. First of all, there are two flip-flops ED (IOP) and ES (IOP), 482 and 483 respectively, for driving control signal lines of like designation leading to all devices as part of trunk tail bus 131. When the IOP services a device, the reset state of both flip-flops 482 and 483 is indicative that more date are to follow for transfer between IOP and device. The set state of flip-flop ED 482 raises the line ED to signal "end of data" to the serviced device; the set state of flip-flop is signals "end of service" accordingly. The flip-flop ED 482 can be driven from the output line itself because a device controller, in turn, is permitted to signal end of data also, however, the device controllers cannot signal end of service for the peripheral devices. The reason for this is that in between "end of data" and "end of service" the IOP may want to provide control information to the device. The state ED=1, ES=0 defines the transfer of such control information called "terminal order".

Among other sources for control through OR gate 487, flip-flop ED (IOP) 482 is set when flip-flop ZDC is set because of byte-count-zero detection, or when the M register is full in case of transfer of bytes from a device to the IOP, or when the M register is empty in the reverse case. This is kept track of by the control 450 in cooperation with the OF register, as symbolically denoted by block 452 in block 450. It is important to note that this control provides the multiplexing operation of the IOP, as with ED high, either concurrently or shortly thereafter ES is raised, whereupon the IOP disconnects itself from the particular device and another device can then be serviced. Since the M register holds at most four bytes, within each multiplexing time slot of uninterrupted service for a device at most four bytes can be transmitted between IOP and device. However, one can eliminate this feature, i.e., control of ED (IOP) 482 flip-flop in relation to the filling state of the M register, in which case the IOP completes servicing one device before turning to another one. Additionally, flip-flop ED (IOP) 482 will be controlled in response to error situations, necessitating the termination of data transfer between IOP and device, to be discussed in detail below.

Next there are two lines denoted DOR and IOR being also part of trunk tail bus 131 and leading from all device controllers (in parallel) to the two flip-flops 484 and 485. With this the device controller about to be serviced by the IOP signals the following: The DOR (IOP) flip-flop 484 receives signal DOR from the device, and its set and reset state informs the IOP whether order or data are to be communicated. An order is control information of immediate significance. A particular type of orders, defined as a portion of a command double0-word, is to be transferred from IOP to device as part of an I/O program for that device, informing the device of the type of service required as initially programmed into the computer. Also, so-called terminal orders are issued at times by the IOP to a device. An order from the device to the IOP is control information having significance for the possibilities (or impossibilities) of continuation of the I/O program.

The IOR (IOP) flip-flop 485 receives the signal IOR, and when set or reset respectively, informs the IOP that the communication concerns information flow from or to the device. These two flip-flops can be controlled from all device controllers but they are under control of the respective device and controller as serviced, to the exclusion of the others. This is the tool with which the device controller of the device exercises control over the IOP when servicing that device. Flip-flops 484 and 485 then instigate the sequence of operations necessary to be carried out by the IOP for servicing a device in providing for a transfer of data or orders to the device or accepting data or orders therefrom. This transfer is provided in so-called service cycles DIN, DOUT, OIN and OOUT, discussed in detail in separate chapters.

During a different phase of operation, i.e., outside of service cycles, the lines DOR and IOR are used in a different manner which is only a matter of appropriately time sharing existing cables and connections. The lines DOR and IOR provide condition code information from a device controller to the IOP setting same into flip-flops CC1 (IOP) and CC2 (IOP). The output of these two flip-flops leads to the condition code register in the CPU. Lines DOR and IOR are used in this manner during SIO, AIO, TIO, HIO and TDV functions, in that the corresponding function indicators derived from the F register control input gating for flip-flops CC1 (IOP) and CC2 (IOP). The output lines of flip-flops CC1 (IOP) and CC2 (IOP) are the lines NCC1 and NCC2 mentioned above with reference to FIG. 5.

The IOP next has a function strobe generator 486 for issuing a function strobe signal FS whenever the IOP seeks operative connection with one of the device controllers which it can service. The function strobe generator 486 is under control of the IOP, particularly the timing unit 451 thereof. The function strobe signal FS is triggered at a predetermined time after the IOP has received from the CPU one of the input-output instructions function codes and has provided one of the function indicators SIA AIO, etc., or after the IOP responds to a so-called service call SC issued by a device. The function strobe FS is a timing signal and part of the device controller IOP dialog. The function indicators from F register merely indicate the purpose of the dialog.

The IOP will normally receive a function strobe acknowledging signal FSA in response to a signal FS it has sent to the device controllers. In response to FSA, control unit 450 will develop a strobing signal FS' to set certain information provided concurrently by the device controller producing FSA into A and/or I registers. Subsequently function strobe generator FS is reset. The IOP has a service call receiver 453 coupled to a line SC of bus 131 to receive so-called service calls from the device controllers. If not occupied otherwise, i.e., after completion of an SIO, AIO, etc., function and after completion of a previous service cycle (ED and ES high) the IOP responds to service call signals SC by generating the acknowledging signal ASC, (generator 454) and passes signal ASC through a line of like designation to the device controllers. The signal ASC is also a function indicator signal, similar in type to SIO, TIO, etc., except that ASC is not derived from the CPU, it is not the result of an instruction. It is a function indicator representative of the autonomous operation between devices and IOP to the exclusion of the CPU and precedes the service cycles. As will be expounded in later chapters, data and orders are transferred between IOP and device during service cycles preceded by an ASC function indicator from the IOP which, in turn, is preceded by a service call SC. ASC is always accompanied by a function strobe FS.

The IOP next has a request strobe acknowledging generator 488 which is a signal generator providing a signal RSA into a line of like designation whenever the IOP is ready to respond to a request strobe RS received from a device controller then being serviced. A device issues a request strobe RS during a service cycle when it (the device) either is ready to accept a byte through data lines DA0 – DA7 or has a byte available for delivery to the IOP. Such a byte may either be an order or actual data. This generator 448 controls, through unit 450, the strobing RS' of the data lines DA0–DA7 for a byte transfer from the device having issued RS into I register, whereafter control unit 450 resets generator 488 to release signal RSA. For a byte transfer in the opposite direction, the IOP maintains the data lines under control of the 0 register until the device controller releases RS. An IR flip-flop in the IOP receives interrupt calls IC from any of the devices connected to it through a common line and provides an IR signal to the IR bus leading to the CPU and being common to all IOP's.

In addition, the timing and phasing unit will include a plurality of temporary storage flip-flops which receive for intermediate storage a certain information received by the IOP during processing orders and before these specific signals can be transferred into individual registers. Of significance here are flip-flops TDC and CMD which receive the (R) code explained in an earlier chapter and for reasons explained in the chapters on the IOP core memory operation, pursuant to operation of an SIO function. Some of the gating functions performed by the control unit of the IOP will be explained below with reference to FIG. 12.

When the IOP desires to communicate with memory, it places address signals on lines LX. By internal timing (451) a signal MS is produced shortly thereafter, for example, after an address-here signal AHX has been received by the IOP, blocking a gate 492, so that neither flip-flop MAE nor flip-flop MAR can set. A memory request signal MQ is produced by signal MS provided flip-flop MAR stays reset. Signal MQ was mentioned above and is used to provide access to the memory bank holding the desired location. If the address location requested is not implemented, address-here signal AHX will not be received and, in coincidence with signal MS "address not here" flip-flop MAE is set, causing, in turn, flip-flop MAR to be set which blocks gate 493 and inhibits production of signal MQ. If a memory request MQ was issued, then after some time the memory responds with an address release signal ARX, AND gated in 491 with timing signal MS to set flip-flop MAR; this then terminates request signal MQ. Flip-flops MAR and MAE are subsequently reset (if they were set) by internal timing of the IOP.

Data are gated into the IOP by gate structure 490. For transfer from M register to memory, via lines MX0–MX1 the gates are opened by internal timing and closed when the IOP receives signal DRX from memory. For transfer in the reverse, the gates are opened when the IOP receives from memory data gate signal DGX, representative of the fact that the memory has placed data on lines MX0–MX31.

THE IOP-IOP PRIORITY CHAIN

The several input-output processors are connected for operation with the CPU in a prewired priority configuration. That is to say, each input-output processor (IOP) has a particular priority rank among all IOP's entitling it to priority of operation with the CPU over those of lower rank but preventing its operation with the CPU in case an IOP of higher priority rank is to operate with the CPU. In addition, the priority connecting logic running among the several IOP's and to the CPU is operative in those cases in which the CPU addresses a particular IOP whereby with the priority connecting logic as used permits that there always will be a response signal to the CPU even if none of the IOP's responds to the address bits in lines IOPA. Absence of any response signals a complete system breakdown or unplugging of one or both trunk tail cables 120 and 122.

As was explained above with reference to FIG. 5, the F register of an IOP receives signals transmitted to all IOP's from the operate decoder 151 of the CPU, via the FNC lines. Among other signals this F register will produce a function indicator signal AIO in case the CPU executes an instruction of like designation to responds to an interrupt signal in the interrupt line IR common to all IOP's. Details of the interrupt procedure will be discussed in a separate chapter, but the particular priority determination system to be employed will now be explained, because, as stated, it is also used otherwise.

The interrupt call IR may have been initiated by one or more of the devices through their respective IOP's, whereby, in particular, in between the time one of the devices has raised the interrupt call signal line and the response of the CPU by executing an AIO instruction, other IOP's may have raised an interrupt call because one or several of their devices requested an interrupt. The CPU has only one I/O system interrupt channel. Hence, when it receives an interrupt request IR, the CPU does not "know" from which device and through which IOP that call was raised. The AIO instruction executed by the CPU in response to an interrupt call has a principal purpose to ascertain who raised the interrupt call. The priority determination logic is now designed in such a manner that the IOP of highest priority among those which at the time the AIO function indicator is received by all having pending interrupt requests, is enabled pursuant to an AIO instruction for a CPU-IOP dialog. Thus, not the IOP which was first in time for calling an interrupt will be identified as "interrupt caller", but the one having highest priority among those which raised IR.

Turning back to FIG. 5, it shall be described first how an IOP can develop a recognition signal ME in response to any function AIO, SIO, etc., developed pursuant to computer instruction execution. Gate 401 receives the AIO signal as developed by the F register of an IO). The gate 401 of an IOP is opened by the IC signal if the interrupt call was developed by one or more devices serviced by the particular IOP. If that is the case, the signal AIO passes through an OR gate 402, the output of which is the recognition signal called ME. The alternative input for OR gate 402, also producing the IOP recognition signal ME when true, is the output of comparator 420 connected to the three IOP's addressing lines IOPA leading from the CPU to all IOP's. These are the three addressing lines connected through output logic 154 in the CPU to particular positions of the D register 153 therein, as was explained above, and whenever one of the I/O instructions, such as SIO, TIO, HIO and TDV are detected by the OP code decoder in the CPU. The function AIO is not accompanied by any IOP addressing signals in lines IOPA, so that comparator 420 is not used during an AIO function. The comparator 420 in the IOP (and all comparators in all other IOP's) compares the addressing signal applied by the CPU to lines IOPA with its own addressing code established by preset switches 409. If the address compares then OR gate 402 signals ME.

Signal ME is used directly, or as inverted signal NME, in a gate 403, the inversion is symbolically shown as inhibitor input. Signal ME, in general, denotes that the IOP has recognized its address or has an interrupt pending from one of its devices. NME denoted tat neither is the case. It may be assumed that the CPU has generated the function indicator signals for lines FNC so that either the signal AIO is developed by the F register in an IOP or the comparator 420 thereof receives an input signal through the IOP addressing lines. The signals in lines FNC and IOPA are applied by the CPU to all IOP's; shortly thereafter the CPU develops control strobe signal called CNST which is sent to the highest priority IOP. It is assumed that in FIG. 5 the IOP illustrated is the one having highest priority. It had also been assumed that this was the one closest to the CPU. Thus, the priority logic for the IOP illustrated in FIG. 5 receives signal CNST directly from the IOP.

Signal CNST is passed through an AND gate 403 of this IOP of highest priority only if concurrently the signal ME is not true. The output of gate 403 when true is then the control strobe signal CNST which passes the IOP of highest priority because it develops the non-recognition signal NME. This signal CNST-NME is now sent to the IOP of the next lower priority as control strobe and to the corresponding gate 403 thereof. This then occurs only if at this time (the CPU having raised CNST) this particular highest priority IOP had neither raised an interrupt, i.e., neither of its devices had requested an interrupt; nor if in case one of the other I/O instructions is presently executed by the CPU the particular IOP is not the one, the address of which is concurrently placed by the CPU on the addressing lines IOPA.

The connecting logic sequence can readily be derived from the partial circuit, as illustrated. An IOP can receive a signal CNST only, if none of the other IOP's of higher priority developed a recognition signal ME. The signal CNST is passed down the line from one IOP to the next one if not stopped by ME and in descending order of priority rank. For the moment it shall be assumed that, for example, neither of the IOP's has an interrupt pending among its devices when the CPU executes an AIO instruction. In this case, then the signal CNST will propagate all the way down to the IOP of lowest priority. CNST as received by the IOP of lowest priority from the IOP of second lowest priority will be turned around as shown in FIG. 5*a*, and fed to a particular gate 404 therein, together with the signal NME of that lowest rank IOP indicating that it is likewise not the one which raised an interrupt request. The output signal of gate 404 now as far as the lowest order IOP is concerned, is a return signal PR. It passes through an OR gate 405' to the next higher (second lowest) priority IOP and will propagate therethrough and the other IOP's in a manner which can again be seen best from the circuit of the highest priority shown in FIG. 5.

There is provided the OR gate 405 receiving as one of its inputs the output of an AND gate 406 which in turn receives the PR signal from the next lower priority IOP via the one next lower in priority etc., ultimately then coming from gate 404 of the lowest priority IOP. In addition, gate 406 receives the signal NME or, as shown, it provides an inhibiting input for signal ME, so that in case the particular IOP is not the one which raised the interrupt request, the output of gate gate passes as a PR signal through OR gate 405 and from there to the CPU. Thus, if shortly after the signal CNST has been raised by the CPU the CPU receives the PR signal back, that is a clear indication that none of the IOP's has at that time an interrupt pending. As none of the IOP's responded, none of them drove the NCC1–NCC2 lines and the condition code will so signal.

The same situation will prevail if, for example, due to a programming or operational error, the IOP addressing lines hold a code to which none of the IOP's as presently connected responds in that neither of the comparators of the entire IOP system provides a signal ME. As stated, an IOP addressing code is provided by the CPU through lines IOPA to all the comparators in case one of the I/O instructions SIO, TIO, HIO and TDV is currently executed by the CPU. Thus, if in case of one of these four instructions the IOP address is not recognized by the one of the IOP's then shortly after the CPU has developed the CNST signal, the CPU will receive a signal PR which is indicative that the IOP addressing attempt was a failure. The condition code lines NCC1 and NCC2 have not been driven by any IOP because none responded.

Assuming now that the situation is otherwise and assuming that, for example, the highest priority IOP has an interrupt request pending when the FNC line code defines the interrupt acknowledging instruction AIO, or assuming that the address in the IOP addressing lines is that of the particular IOP as any of the other I/O instructions is executed by the CPU, then the IOP recognition signal ME is produced by comparator 420 and the gate 403 is blocked. In either case, the next lower priority IOP will not receive the control strobe signal CNST. Likewise, the gate 406 is blocked and a PR signal which could only develop spuriously in any of the lower priority rank IOP's, is not produced or passed by the particular IOP. Therefore, the CPU will not receive an immediate response.

The responding IOP will send the respective function indicator signal AIO, SIO, etc., as the case may be, to all of its associated devices, and thereby requires communication with a particular device. In case of an interrupt situation, function indicator AIO together with function strobe signal FS will thereby raise the particular device which has highest priority among the devices which placed an interrupt call. For other functions (SIO, TIO, etc.) the IOP will tend to address a particular device, in a manner to be described more fully below in the chapters on SIO instruction execution. Assuming now that the respective operation fails to develop fully, then the IOP will receive from bus 131 the signal AVO. In the case of an interrupt situation, AVO is indicative of the fact that none of the devices have now an interrupt pending; in case of a CPU addressed operation (SIO, TIO, etc.) signal AVO indicates that none of the devices has recognized its address. Thus, a signal AVO may be received by an IOP shortly after an IOP produced recognition signal ME caused the respective function indicator signal to be sent from F register to all devices. Signal AVO will pass through an OR gate 408 to an AND gate 407 which is strobed open by the CNST signal as well as by recognition signal ME. The output of gate 407 is an alternative input for the gate 405 and therefore, provides a signal PR. This signal PR resulting ultimately from AVO may also develop shortly after the CNST has been issued by the CPU.

The IOP does not set any of the flip-flops CC1 (IOP) and CC2 (IOP) so that the condition code concurrently provided by the IOP, informs the CPU again that there was a recognition failure in that neither device serviced by the IOP recognized the interrupt acknowledgement, even though the interrupt call line of the IOP is high, or that an IOP or a device address was not recognized. The CPU can deal with the situation in accordance with a routine provided for the "failure of recognition" situation.

Figure 7:
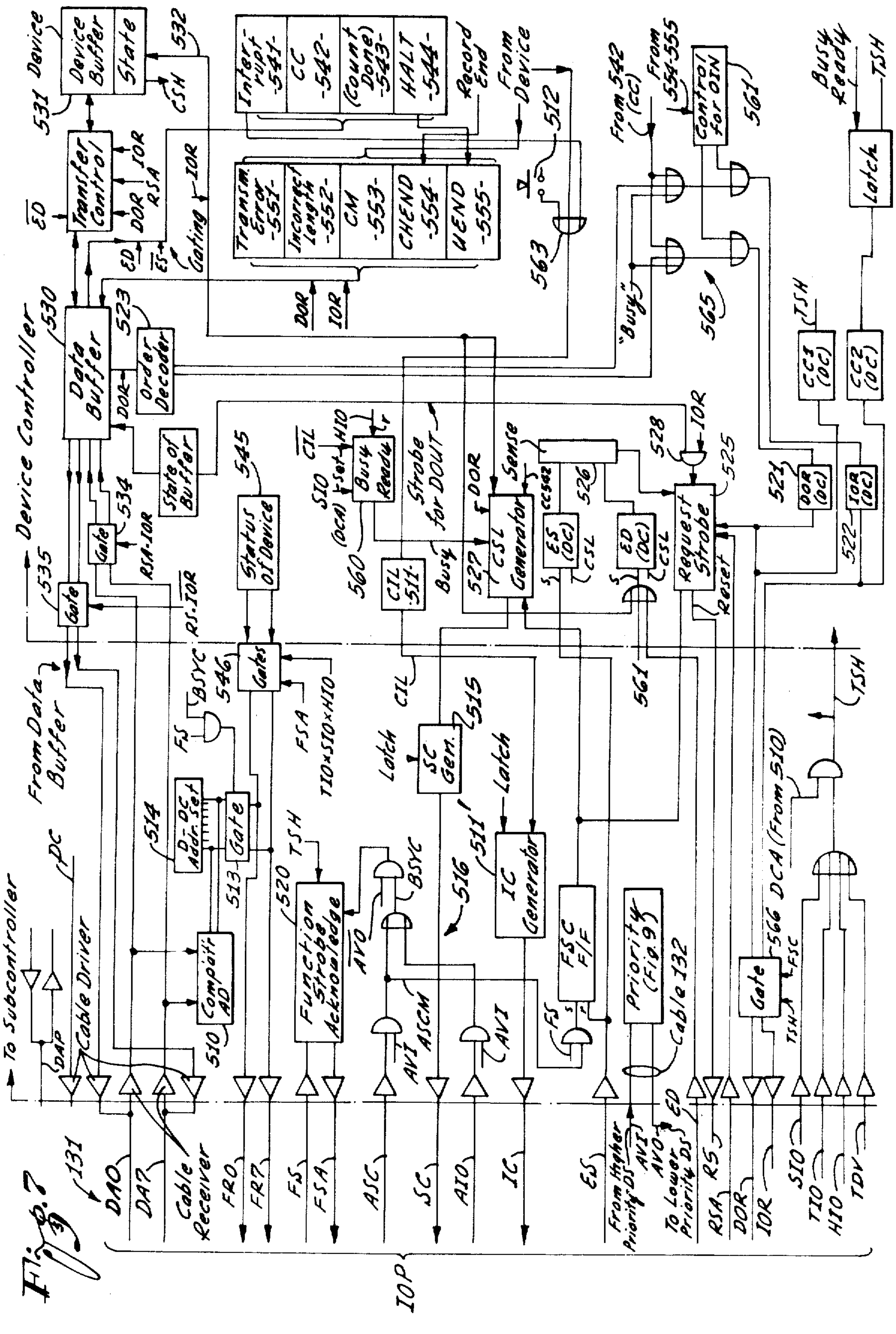
FIG. 7 illustrates schematically the IOP subcontroller device controller interface including pertinent control and storage elements and registers, sub and device controller.

An alternative input for the AND gate 407 (through OR gate 408) is provided through a circuit labeled "response unit" 450 in FIG. 5, but it is actually the control unit of the IOP parts of which are shown in greater detail in FIG. 7. The control unit 450 of the IOP provides certain coincidence signals indicative of certain operations to be performed if one of the devices on the IOP did place an interrupt call or in case a particular device was successfully addressed by the IOP during SIO, TIO, HIO or TDV instruction. In either case, additional operations are to be performed, and in case these operations have been carried out successfully the unit 450 will develop a signal PR2 indicative that at that pint when developed the IOP together with its device(s) has performed all the operations required. The completion of these operations include setting of the condition code flip-flops CC1(IOP and CC2(IOP) by the device controller of the device which did respond to the particular function indicator (AIO, SIO, etc.). This then is an alternative mode of producing the proceed signal PR and the concurrently provided condition code informs the CPU about extent of the successful completion of the operation as was demanded by the CPU by raising lines FNC. Details of these additional operations are described in separate chapters; presently the description of the priority determination logic is restricted to the CNST-PR dialog, per se, as between the I/O system and the CPU.

The CPU when receiving PR senses the condition code setting and completes its operation without involving the IOP. Conversely, the IOP can proceed with its own program without involving the CPU. Thus, upon receiving PR, the CPU drops signal CNST; it may also drop the signals on lines FNC and IOPA, and the I/O system and the CPU are then operatively separated. The function signals in lines FNC may have been dropped earlier by the CPU so that PR resets the F register. PR may also unlatch the comparator input. The detailed steps thereof are set out below. Presently it suffices to say that the priority chain logic, as described presently, and as illustrated in FIG. 5, provides for an orderly sequence of responses of the several IOP's and it ensures particularly that always in case of an interrupt situation the higher priority IOP prevails over the lower priority IOP, and in case of a direct addressing of any IOP and of any device there is an orderly sequence of interrogation of the several IOP's whereby an immediate return of a PR signal is ensured in case there is an addressing error of any kind.

DEVICE CONTROLLER (FIG. 7)

An IOP does not communicate directly with any of the devices it is to service, but only through a device controller whereby one device controller may service a plurality of devices provided these devices require a similar type service and are structurally and controlwise similar, such as magnetic tape units. All interface connections between an IOP and a device controller, however, run through a subcontroller. The subcontrollers are constructed similarly for all device controllers, while the remaining part of a device controller provides appropriate adaption of control for the specific device or devices it is to control. That part is not a subject of the present invention. However, each device controller must have a number of elements and must provide for several types of functions, operations and responses, and they will be discussed in the present chapter.

The IOP, particularly the F register thereof, transmits function indicator signals representative of currently executed computer instructions to a like plurality of lines. Some of them are mentioned here for purposes of completion only as the function they perform is not of immediate significance. These function indicator lines are designated with the same character as the signals they provide in case the respective instruction is being executed by the computer. Function indicator signal SIO or "start input-output device" is the principal control signal provided by the CPU for starting an external device. The main or principal computer program uses this instruction as the means for calling on an external device when its service is required, and the IOP servicing that device passes signal SIO into bus 131. The next function indicator is TIO, standing for "-test input-output". In this case status and control information of a particular device is requested by the computer, without interfering with the operation of that device. The function indicator HIO stands for "halt", i.e., the concurrently addressed device is to stop. TDV is similar to TIO with a somewhat different format of the information required.

The four signals are all received and amplified by respective cable receivers in the subcontroller interface module and transmitted to the device controller proper for use therein. In addition, the subcontroller forms a composite signal TSH, which is "SIO or TIO or HIO or TDV" and-gated additionally by a signal DCA to be described next. The function indicator lines are bus lines pertaining to trunk tail cable 131 as are the other lines to be described more fully in this chapter. The IOP raises these lines whenever one of the input-output instruction codes is received by the IOP from the CPU and identified by an appropriate code (FNC) then set into the F register of the IOP. The function indicator signals SIO, TIO, etc., are applied by the IOP to all subcontrollers and additional signals are needed in order to determine which particular device, device controller and subcontroller is to respond to the function indicator lines.

Eight data lines DA0 through DA7 plus one line DAP (parity) connect the IOP with all of the device subcontrollers. The eight data lines perform different functions during different operations. During SIO, HIO, TIO and TDV functions the IOP sets the device controller address code into its 0 register. The 0 register controls the data lines DA0 through DA7 whenever information is to be transmitted by the IOP to the device controllers via these lines. During SIO, HIO, TIO and TDV functions, that information is an addressing code identifying one of the device controllers, and its or one of its devices. These address signals are fed to an address comparator 510, there being one in each of all the subcontrollers connected to the IOP. Comparator 510 compares this address code with a code it receives from a device controller address switching set 514. This set of switches is part of the subcontroller. If the address code in the lines DA0 through DA7 as received by all of the subcontrollers compares with the address set by the switches 514 in one of them, then the respective comparator produces the signal DCA. The comparators in the other subcontrollers provide signal NDCA. The signal TSH introduced above is the signal which when produced by a subcontroller indicates that the addressed device controller for any of the four functions is the particular one.

A so-called busy-ready flip-flop 560 is set into the busy state and thereby places the device controller into the busy state, if signal SIO function si was issued by the IOP, and if the concurrently provided device controller address is the particular one, so that DCA is true. Furthermore, it is necessary that an interrupt has not been called for by the device so that the signal CIL (infra) is false. Of course, if, for some reason, the device controller is not operational, flip-flop 560 can likewise not shift into the busy state. The busy-ready flip-flop 560 of an operational device controller will be set into the state corresponding to "busy" in response to signal DCA, and the signals SIO and $\overline{CIL}$. The function indicator signal HIO resets busy-ready flip-flop 560 into the ready state. Additionally, the busy-ready flip-flop 560 shifts into the ready state when the CPU signal "reset input-output" (signal RIO in FIG. 5) to all devices. The function indicators TIO and RDV do not influence the flip-flop 560.

Another function indicator is ASC which is controlled only by the IOP but not in response to any instruction executed by the CPU. Signal ASC when issued by the IOP is likewise not accompanied by an addressing code for a device controller. The signal ASC is received by the subcontroller and needs to be processed only therein.

The signal ASC is issued by an IOP in response to a service call signal SC issued by any of the subcontrollers. The subcontroller, therefore, has an SC generator 515 receiving a signal CSL from a generator 527 of like designation in the device controller. This CSL generator 527 provides signal CSL in case the device requires service. It can do so only when the device controller is in the busy state, as indicated by the busy-ready flip-flop 560. For the ready state, CSL when enabled through "busy" will provide service call signals whenever the device is prepared for transfer of information, orders or data.

In case of a transfer of data from IOP to device, a device buffer 531 must be empty, at least to the extent that it can receive at least one byte. For a fully buffered device one will normally require that buffer 531 is, in fact, completely empty before the device controller demands additionally data from the IOP. Thus, "buffer-531-empty" triggers CSL through line 532. Conversely, when data are to be transferred from the device to the IOP, buffer 531 must have data available. Thus, in this case "buffer-531-full" triggers CSL. The interpretation of "empty" and "full" of buffer 531 for purposes of initiating service calls is carried out through IOR gating. The signal IOR was introduced above as one controlling in the IOP the direction of information transfer between IOP and device. The same signal controls that direction also in the device controller and presently it controls the utilization of the state of buffer 531 for controlling CSL.

The internal operation of the device could reach a critical stage in that, for example, data are held in buffer 531, the service call CSL has been generated and nothing has happened, but the device may need buffer 531 for new data, because the device has a regular data supply rate. In this case the device raises a high priority call signal CSH.

In case a service call is required for the transfer of an order, signal DOR is true and triggers the CSL generator. This is independent from any state of buffer 531. The CSL generator in the device controller triggers service call generator 515 in the subcontroller to issue signals SC into a line of like designation and being one wire in trunk tail bus 131. Provided the subcontroller has issued a service call, it may respond to an ASC function indicator issued by generator 454 in the IOP as an acknowledging signal. This subcontroller may then provide signal ASCM which, in turn, is one alternative for a signal BSYC generator (see gates 516). The trailing edge of signal ASCM with FS being true sets a service-connect flip-flop FSC thereby "legally" connecting the device controller to the IOP. This is the principle effect of service call acknowledgment on the device controller as it marks the beginning of *a* service cycle for that device controller. The "end of service" signal ES from the IOP resets flip-flop FSC.

The alternative input for the production of BSYC in the subcontroller results in case of an interrupt situation. In cases to be described more fully below, the device controller will issue an interrupt request signal CIL to an IC signal generator in the subcontroller which is a latch type flip-flop 511' but which does not latch at that point. The IC generator 511' in the subcontroller will thus issue an interrupt call IC to the IOP. The computer acknowledges interrupt calls from the input-output system by executing the instruction "acknowledge input-output" or AIO, for short, and there is accordingly another function indicator line, AIO, leading also from the F register in the IOP to the appropriate cable receiver in the interface module of the subcontroller for utilization therein. That signal is not accompanied by an address, because the principal purpose of the AIO instruction and function is to ascertain the identity of the device which had placed an interrupt call. A subcontroller which has placed an interrupt call signal IC, may provide, upon reception of the AIO signal, the alternative input for the BSYC signal generator 516.

From the circuit 516 one can see that signal BSYC can be produced by gates 516 only when a signal AVI is true. The signals ASC and AIO are processed in the subcontroller essentially in conjunction with the priority determination logic explained more fully with reference to FIG. 9. Briefly, this priority determination logic is also part of the subcontroller and responds to a signal AVI coming from a subcontroller pertaining to a device controller of next higher priority, while through an appropriate cable driver a subcontroller may provide a signal AVO to the device controller having next lower priority In the case of reception of a signal AVI by a subcontroller, none of the high priority devices has responded to ASC or AIO, as the case may be. If then the subcontroller which receives AVI has raised an interrupt IC, or has placed a service call, this then is the condition for producing BSYC.

The BSYC circuit provides an enabling signal for a function strobe acknowledge (FSA) generator 520 in the subcontroller, provided AVO is false, i.e., provided the priority logic stopped transfer of signal AVI. Signal FSA is passed through an appropriate cable driver in the interface module of the subcontroller to the IOP, in response to a function strobe signal FS when received by an enabled generator 520 from the IOP. Among the several generators 520 of all device controllers connected to the IOP, only one is enabled during ASC or AIO by a signal ASCM, as only one device controller can receive AVI and not produce AVO by operation of the priority determination logic as effective among all device controllers.

The IOP issues a function strobe FS during each of the five computer instructions and also during the ASC service call function. The function strobe FS permits IOP communication either with the addressed device during an SIO, TIO, HIO or TDV function or with the highest priority device among those having sent a service call or an interrupt call into lines SC and IC respectively, whereupon the IOP issued ASC or AIO function signals, ultimately enabling one of the generators 520 by a signal BSYC. The output of the comparator DCA (in case of a TIO, HIO, TDV or SIO function) i.e., signal TSH, is an alternative input for enabling the function strobe acknowledge (FSA) generator 520. Again, only one of all the comparators 510 in the several device controllers can provide a recognition signal DCA. The function strobe signal FS follows any of the function indicator signals at a slight delay, as sent by the IOP to all of the devices.

At other times, the data line DA0 through DA7 may receive an order, such as the order read, write, sense, backwards. The orders are parts of the I/O program written in the core memory for the particular device. After an SIO function (start I/O device) those orders are withdrawn (see chapter on OOUT, infra) from the core memory.

These order signals are then passed through the subcontroller into a buffer 530 of the device controller. An order decoder 523 in the device controller decodes this order. The interpretation of the content of buffer 530 as an order is provided again by signal DOR. The decoded order causes the device to operate accordingly, which depends entirely on the type of device so that very little general rules can be established. For example, in case of a tape unit, an order may provide starting of the tape motors in one or the other direction, stopping, rewinding, etc. In addition, however, the order decoder output provides control signals through an OR network 565 to two flip-flops 521 and 522, also called DOR (DC) and IOR (DC) flip-flops which provide through lines of like designations signals DOR and IOR to the IOP, as well as for use in the device controller.

An order as received by a device controller is in part executed by resetting flip-flop 521 (DOR=0) to indicate that the execution of such order involves always data. The order specifies the direction of data flow and thus may set or reset flip-flop 522 as the case may be. Data-order flip-flop 521 is set (order) either when flip-flop 560 shifts into the busy state as the device controller now demands an order from the IOP, so that the "busy" signal sets also flow direction flip-flop 522. Flip-flop 521 is also set when the device controller, in turn, wants to issue an order to the IOP then requiring resetting of flip-flop 522 to indicate the direction of information flow to the IOP. The control "CC" for flip-flops 521–522 is the same as from the busy state signal, and will be explained below under "command chaining". The control of flip-flops 521, 522 through circuit 565 is shown only symbolically to illustrate the different cases. The effectiveness of the respective states of flip-flops 521 and 522 at the IOR and DOR bus lines may be gated (566) by the service connect flip-flop FSC to restrict the control of the IOR and DOR bus leading to the IOP by the flip-flops 521 and 522 of a device controller to the period in which that device controller is legally connected to the IOP.

During SIO, TIO, TDV and HIO function, bus lines DOR and IOR are under control of flip-flops CC1 (DC) 521 and CC2 (DC) 522 for providing a condition code to flip-flops CC1 (IOP) and CC2 (IOP) in the IOP. Flip-flop CC1 (DC) will be set by TSH to indicate address recognition by the device. Flip-flop CC2 (DC) is controlled from the busy-ready flip-flop 560 to indicate the state of that flip-flop at the time the function is raised, i.e., before, for example, SIO or HIO have changed the state of flip-flop 560.

During an order IN service cycle (see chapter below) the data lines DA0–DA7 are used to transmit operational status information of the device to the IOP. The status information will be explained in the next paragraph. The device controller has several storage cells (flip-flops) 551 to 555 in which are set individually as soon as certain conditions occur. As soon as that happens, the device controller through unit 561 controls DOR and IOR flip-flops 521, 522 to initiate this order IN service cycle so that that status information can be transferred. These flip-flops 551 to 555 thus store the status signals from the time a change in status occurs, until transmission to data buffer 530 for further transmission to the IOP via the lines DA0 to DA7.

The status information in summary, is as follows: flip-flop 551 is set if a transmission error occurs during any data byte transmission between IOP and device, the bit is called TE. Flip-flop 554 is set (CHEND) when the device has completed, for example, the writing or reading of a particular record as defined by a particular format (a punched card, a data block on tape, etc.). This is symbolically denoted as a "record end" input signal for status flip-flop 554. However, there are additional conditions which can force the device controller into the "channel end" state.

Flip-flop 552 holds a bit IL which is set in case of "incorrect length"; a particular number of data bytes which should have been transmitted in one operation sequence, has not been so transmitted. This will occur when the IOP senses "zero byte count" but the device has not readied the end of the record on which it operates (a punched card, a record block on tape, etc.) i.e., CHEND is not true, or if CHEND is true but the IOP does not signal "count done".

The chaining modifier bit CM on flip-flop 553 permits the device controller to exercise control over program execution as far as input-output operations without the CPU is concerned. Flip-flop 555 holds a bit called UEND which is set whenever an unusual occurrence appears in the device requiring termination of the operation. Details of control of those flip-flops in certain cases will be discussed below.

During a particular phase of operation (terminal order) the IOP places information other than data bytes to be conveyed to the device controller into certain bit positions of the data lines DA0 to DA7. Such a byte stems neither from core memory nor is it destined for the device itself. These bits appear always as an information byte, but they are accompanied by additional control signals, ED–$\overline{ES}$ provided by the IOP in that combination (see chapter on IOP supra, concerning flip-flops 482, 483). These signals are now specifically used for gating the connection between buffer 530 and flip-flops 541 to 544 which are to receive the terminal order. This byte constituting the terminal order is interpreted by the device not as a data byte but as a bit concatenation constituting control information. They will be set into flip-flops 541 to 544 briefly referred to here as follows.

A first bit of this control information byte is set into "interrupt" control flip-flop 544 in the device controller. This way the IOP signals to the device that the device should now cause an interrupt. (See connection to OR gate 563.) Therefore, the content of this flip-flop 541 is one of the inputs for the CIL or interrupt signal generator 511 of the device controller. Flip-flop 542 receives the command chain (CC) bit which when received in that fashion by the device controller, requires the device controller to institute a specific sequence of operation which will be discussed more fully below and which has to do with the particular input-output program carried out by the CPU together with the device controller without utilization of the CPU. The third flip-flop 543 in the device controller will receive information during that particular phase called "terminal order" that the IOP has transmitted all data or has received all data it is supposed to during that particular cycle. This "count done" bit CD originates in flip-flop ZDC in the IOP (see FIG. 6). Flip-flop ZDC is set when upon counting of bytes in the IOP transferred the count number has reduced to zero. The content and the timing of setting of flip-flop 543 should correspond with information then available in the device (CHEND). For correct operation "count done" flip-flop 543 should be set only when the device has also signaled "channel end" by setting flip-flop 552. Should that not be the case, then an "incorrect length" situation occurs and the respective status flip-flop 552 for that situation will be set (supra). The fourth flip-flop 544 to receive information during the terminal order is a "halt" bit indicating that the current operation is to be stopped and the device has to be controlled, i.e., halted accordingly. Should flip-flop 544 be set while CHEND is not true, the unusual end flip-flop 555 will be set.

During data IN or data OUT operations, bytes are transmitted either from the external device to the IOP or from the IOP to the external device through the lines DA0 through DA7 utilizing then also the parity line DAP. Depending on the direction of data flow data buffer 530 either holds such data byte immediately prior to the transfer to the IOP or upon reception from the IOP. A transfer control device handles the traffic between the device (buffer 531) itself and the data buffer 530 in a manner that is unique to the particular device. For purposes of defining the filling state or buffer 531, the concurrent filling state of buffer 530 could be included as buffer 530 is part of the overall buffering system.

Data IN and data OUT operations are possible only if the service connect flip-flop FSC is set so that the device controller with particular device is legally connected to the IOP. The DC can now issue so-called request strobes. The request strobes are issued by a request strobe generator 525 in the device controller in response to the state of buffer 530 and in dependence upon the state of flip-flop IOR (DC). When IOR is set, data are to be received by the device, hence buffer 530 must be empty. When IOR is reset, the device supplies data to the IOP; hence, a byte must be in data buffer 530 so that the IOP can and should accept these bytes. Thus, "buffer 530 empty" or "buffer 530 full" are conditions causing triggering of the request strobe generator 525, depending on the state of signal IOR. An exclusive OR gate 528 can respond to these two different conditions for enabling generator 525. The request strobes are, of course, issued only if the service connect flip-flop FSC is set and if the "end of service" signal ES is false. This, however, can be taken care of indirectly because ES resets FSC. The request strobe signals RS are passed through the subcontroller as signals of like designation to the IOP. There is a common request strobe bus for all device controllers because only one of the subcontrollers of the system serviced by the IOP can have its service connect flip-flop set at any time so that only that particular device controller can issue request strobes into the RS line.

In case of a transfer of byte of information from the device to the IOP, RS is produced when buffer 530 is full and can connect to the DA0 and DA7 lines (gating RS $\overline{IOR}$ by the device controller), so that at any time thereafter the IOP can strobe these data lines to receive this information through its I register. After having done this, the IOP will issue a signal RSA into a line of like designation of bus 131 to acknowledge receipt of the byte. Signal RSA resets the request strobe generator 525 causing it to release the RS line so that the IOP in turn releases RSA. In addition, RSA signals to the transfer control of the device that new information can be set into the data buffer 530; it, in effect, empties buffer 530, which reflects in turn on the "state of the buffer".

In case the transfer is in the opposite direction, the IOP provides bytes to the data lines (through its 0 register) in response to a signal RS. The request strobe generator has issued RS only if the data buffer is ready to accept a byte from the IOP. The RSA signal then provided by the IOP will signal that the IOP has applied a byte to the lines DA0 through DA7. RSA–IOR is then the gating function for the device controller to strobe the data lines in order to set the bits of this byte into the data buffer 530.

The number of request strobes the request strobe generator can provide is indirectly controlled through the lines called ES and ED. The end of service signal ES is produced under exclusive control of the IOP. If raised, it causes the service-connect flip-flop FSC to be reset; any further production of request strobes is inhibited. The "end of data" line ED is under control of the IOP as well as the device controller. When ED is raised by either of them, the particular byte then transferred at that request strobe is the last one. When ES is not raised concurrently by the IOP a terminal order will follow and the device controller must issue one more request strobe. When ES is raised concurrently, no terminal order follows. The ED (DC) flip-flop of the device controller can be set either through a signal in the ED line in case the IOP raised ED. The ED (DC) flip-flop can, in addition, be controlled by the device whenever the device has completed the sequence of bytes it has to feed to the IOP or can accept therefrom at the moment. This depends on the state of buffer 531.

A sensor 526 for the ES–ED lines will control the request strobe generator 525. As long as ED=ES=0, request strobes are issued by generator 525 depending on the state of buffer 530. With ES=1 no request strobes are issued any more. With ES=1, ES=0 one request strobe is definitely issued. One can see here, that the transfer control should transfer data into buffer 530 only if ED=0.

The next set of IOP device controller interface lines are the function response lines FR0–FR7. During execution of an SIO, HIO or TIO instruction by the CPU and IOP the device controller places status information on these lines. They are held in a set of flip-flops which is indicated in general as a block 545 "status of the device". That block will include some of the flip-flops already discussed. They involve particulars of operation or status of the device at that time, including, for example, the absence or presence of an interrupt request, i.e., of a CIL signal; thus, the CIL generator 511 can be regarded as included in this status block. Likewise, the busy-ready flip-flop is part of that status block. Other status information is whether the device is operational, available, nonavailable, whether there was an unusual end (flip-flop 555), whether the device control itself is ready and available, or busy, etc. Details thereof will be discussed more fully below.

These eight function response lines FR are gated open (states 546) during the SIO, HIO and TIO functions by the function strobe acknowledging signal FSA as provided by the subcontroller. These gates are opened to pass the "status of device" as a seven bit code to the IOP via function response lines FR0 through FR6, line FR7 receives a zero bit as it is not used. The lines FR0 to FR7 are also used when the AIO and ASC functions are executed, i.e., when the signal BSYC is true. As a function strobe signal FS is received from the IOR, another set of gates connects the address switch 514 of the subcontroller to the lines FR0 to FR7. The subcontroller thus signals its address to the IOP in response to AIO or ASC functions.

Briefly the following additional signals and lines will be mentioned. The data parity line DAP serves only during the data IN or data OUT operation, i.e., when actual data flow to or from the device or from or to the IOP. The parity bit is generated from the IOP for each data byte presented to the device controllers. Also, each data byte supplied by the device controllers along with the parity bit is checked by the IOP. The data parity line carries this parity bit and the parity is odd. The parity check line PC is used only during the data IN operations. If the device is not constructed to check parity, the device controller drives the parity check line true. This causes the IOP to ignore the parity information supplied by the device controller on the data parity line.

The I/O reset signal is generated when the I/O push button in the processor control panel is pressed; if the reset signal is true all devices receiving the signal are halted and all status and control indicators in the input-output system are reset.

PRIORITY CONNECT SYSTEM BETWEEN IOP AND DEVICE CONTROLLERS

Whenever the IOP sends a function strobe signal FS to all of the devices and device controllers connected to it, this will be usually accompanied by a function indicator signal such as SIO, or ASC or AIO or others, informing the device and device controllers of the purpose of that strobing signal FS. Basically, this may occur either in response to a service call SC or in response to an interrupt call signal IC provided by a device controller, or more precisely, the subcontroller thereof to the IOP or because the CPU has executed or is in the process of executing a particular instruction (such as SIO) requiring for that purpose communication with a device controller. In response to the function strobe signal FS the IOP expects to receive a reply, usually in form of a function strobe acknowledgment signal, FSA as described. Signal FSA is sent by the device which has put forward a request (SC or IC) or because the device and device controller has recognized an address which the IOP sent down to the device controllers on request of the CPU pursuant to execution of a computer instruction. Details thereof are discussed below. There is, of course, the possibility that none of the devices or the device controllers reply. There may be many reasons for failure of a reply from the device controllers. There may be an addressing error or the device or the device controller may have become inoperative, even if such a device controller put an interrupt call or a service call on the respective lines. In this case the IOP will still receive a signal called AVO which is a specific output of a specific interconnection among the several device controllers to be described in the following.

Signal AVO will be received by the IOP from the device controller with the lowest priority as a reply to a function strobe signal FS if none of the device controllers has or is able to respond to the function strobe signal FS. The signal is one of the priority determination signals carried by the priority cable 132. The primary function of the priority cable is to determine the relative priority among the device controllers in the event two or more device controllers have raised simultaneously interrupt calls IC or service calls SC. The physical routing of cable 132 is completely independent of the physical routing of the data transmission cables from the IOP to the device controllers. The principal data and signal transmission cable 131 runs from the IOP to the device controller physically closest to the IOP. From there to the device controller which is physically closest to the first one mentioned and so forth. This mode of connection, of course, has nothing to do with the priority rank among the several devices and device controllers. The priority connections is routed in accordance to the priority of the device controllers. The data and control lines of cable 131 have been explained above with reference to FIG. 7, and the priority connection circuit within a subcontroller was then excluded. Now the priority determination circuit among the device controllers will be described.

The IOP provides permanently a signal AVI to a line of like designation. That line runs to an interface connection module of the device controller (subcontroller) of the lowest priority but without tapping. From there the same signals passes through the device controller of the next lowest priority, again without tapping, etc. Recalling FIGS. 3 and 4, this means that there is no printed circuit path from the particular terminal etching 212 into the interface module; there is only a connection from a contact element 232, etching 212, solder 213, etching 211, another contact element 232 on the other connector element and to the cable.

This signal AVI'runs through all of the device controllers because it is part of the priority cable system but that signal AVI' passes through all of the device controllers until reaching the device controller of the highest priority. There, in effect, it is turned around and serves as an input signal AVI which is thus permanently true for the priority logic in the device controller of highest priority. The priority logic will be described in detail more fully below, but the principle behind the priority determination circuit shall be briefly described first.

The signal AVI' as stated, serves as input signal AVI for the logic of the highest priority device controller. If the device with highest priority does not require any service, is not addressed and has not put an interrupt call into line IC, it will pass on the signal called AVO. That signal AVO is, in effect, AVI subject to the condition that the device controller of highest priority does not require service. The signal AVO is now passed to the device controller of the second highest priority to serve there as its input signal AVI. The logic of that device controller of the second highest priority is the same as in the one in the highest priority. If the device controller of second priority receives the signal AVI which is the signal AVO of the device of highest priority, but does not require service from the IOP, is not addressed, and has not raised an interrupt call, it passes on again a signal AVO.

Therefore, the priority determination signal is not a signal which is sent from the device of highest priority or from each of the device controllers to the IOP, but each device controller receives a signal AVI if none of the device controllers of higher priority require any service, are not addressed, or have not placed an interrupt call on line IC. Each device controller provides a signal AVO provided it does not itself require any service, has not been addressed, or has not raised an interrupt call. One can, therefore, see that in this sequence the device controller with the lowest priority will send a signal AVO to the IOP, if none of the device controllers requires any service, if none of them has been addressed or has recognized any addressing signals, or if none of the device controllers called for an interrupt. If the IOP has sent a function strobe signal FS together with a function indicator signal, such as ASC, AIO, SIO, etc., and if the IOP receives an AVO signal, this is an indication that none of the device controllers placed a service call, an interrupt call or has recognized the concurrently provided device controller address. The IOP, therefore, is enabled to provide for this situation. In particular, it will be recalled that the AVO when received by the IOP serves as production for proceed signal PR which is the response of an IOP having recognized its address to a CPU-issued control strobe. (See Chapter on IOP—IOP priority logic.)

Proceeding now to FIG. 9, the priority determination circuit in any subcontroller receives an AVI signal in case the function strobe signal produced by the IOP at that time has not caused other, higher priority device controllers to respond. The AVO–AVI transmission reception sequence determines the regular, prewired, priority among the device controllers connected to the IOP. This prewired priority can, however, be overridden by any device controller raising a high service priority call CSH or a high priority interrupt call CIH respectively concurrently with (or subsequently to) call signals CSL and CIL. Through suitable latches and drivers the subcontroller of each device controller then provides a signal HPS (for high priority service) or HPI (for high priority interrupt). There are two buses HIP and HPS connected to all subcontrollers outside of the priority determination connection, as part of the cable 131, and to receive any high priority call. The subcontrollers each receive the signals from these lines HPI and HPS.

Assuming an AVI signal is received by a subcontroller (provided as signal AVO by the non-responding subcontroller having next higher priority), this signal is passed to each of three AND gates 501, 502 and 503. All three AND gates receive also the function strobe signal FS. This function strobe signal is received by all AND gate triplets (501, 502, 503) in all subcontrollers connected to the IOP. The outputs of either gate 501, 502, 503 in a subcontroller serve as inputs for an OR gate 505 which in turn controls an AVO-signal driver to provide signal AVO in case one of the gates 501, 502, 503 goes true.

The "and" gate 501 receives thirdly a function indicator signal ASC if the IOP acknowledges a service call that may have come from any device controller. The fourth input for AND gate 501 is developed as follows. A buffered NOR gate 511 provides a false signal for blocking gate 501 if one of the following situations is present. If the particular device controller is the one that raised a service call to which ASC could now be the response by the IOP, and if the device controller also raised the high priority service call signal CSH, the output of 511 is false and gate 501 is blocked.

Thus, when signal CSH is true in the subcontroller, signal AVO is not produced and transmitted to the subcontroller of the device controller having next lower priority.

If the device controller did not produce a high priority call signal CSH, but does produce a low priority call signal CSL, a gate 508 will open if concurrently the high priority bus HPS has not bee raised otherwise, i.e., by any of the other device-subcontrollers having higher or lower priority as the case may be. As gate 508 opens, gate 506 blocks, so does gate 501 and AVO is not produced. On the other hand, if the high priority bus HPS is high (i.e., a high priority call signal is produced by any other device but not by the particular one), then the low or regular priority service call CSL of the present device controller cannot pass gate 508. If the present controller has not raised a high priority call CSH, then output of NOR gate 506 is true, gate 501 opens and AVO is produced. If the service call generator of the particular device controller did not generate either service call signals CSL and CSH, then the AVI signal will also be gated through the gate 501, the OR gate 505 to the AVO driver of the subcontroller. The AVO signal so provided serves as a signal AVI in the priority determination logic for the device controller (more precisely, the subcontroller) having the next lower priority.

One can thus see that a subcontroller must produce AVO in response to an AVI it receives if (1) it did not provide any service call (CSH or CSL) or (2) if it provided a low or regular priority service call CSL but any other subcontroller has provided at that time a high priority service call. Conversely then, subcontroller inhibits transfer of an AVI signal as an AVO signal if (1) it is the highest priority subcontroller among those having provided regular service calls CSL (and SC) and there is no high priority call pending or (2) if it is the highest priority subcontroller among those having raised high priority calls. It will be recalled that reception of signal AVI and nonproduction of AVO at the time the IOP produces any function indicator (AIO, SIO, ASC, etc.) is the equivalent to the selection of the particular device controller for response to the function. In case of ASC presently described this then means that the particular device controller will now be serviced.

Assuming the function indicator provided by the IOP and accompanying a function strobe FS is a TIO, SIO or AIO, or a TDV signal, these are all signals indicating that the computer executes a specific I/O instruction. At that time the IOP sends also the address of a specific device controller into the eight data lines DA. The address comparator 510 of the device controller provides therefor a signal DCA or NDCA depending on whether or not the specific comparator recognizes the address as its own. If the addresses-do-not-compare signal NDCA is false (because the address does compare) signal NDCA blocks gate 502, and signal AVO will not be produced. If the addresses do not compare then again the AVI signal is gated through gate 502 through the same OR gate 505 to the AVO driver of the subcontroller so as to provide again the AVO signal of the device controller of next lower priority.

In this case, production or nonproduction of AVO by a subcontroller in response to AVI, per se, is not a matter of priority. However, the priority chain provides for an orderly sequence of address comparison by the device subcontrollers until the proper one has been found. Moreover, the possibility exists that none of the subcontrollers has the address called for by the IOP through the data lines. In this case then failure of address recognition does not merely result in absence of any response by the device controller system as a whole, but after all subcontrollers have tested their own address with the one on the data lines DA and failed to recognize it, they all have sent AVO to the next subcontroller until the last one provides signal AVO to the IOP as a definite signal indicating that no device controller recognized the address signals.

Finally, in case an AIO instruction is executed by the computer, the third AND gate 503 of the system passes the AVI signal received to the AVO driver in case the device controller itself did not place any interrupt call CIL (IC from the subcontroller). The input circuit for gate 503 is analogous to that of gate 501. Gate 503 inhibits passage of AVI to the AVO driver if the device controller provided a high priority interrupt call CIH or if it provided a low or regular priority interrupt call CIL and none of the other device controllers called for a high priority interrupt, so that the HPI is low, NHPI being true.

It follows from the foregoing that if the subcontroller is the one which either placed a high priority service call or a high priority interrupt or a low priority call with no high priority call pending from another device controller, or if the subcontroller is the one whose address code is passed down by the IOP the DA lines, then the logic will stop an AVI signal if it receives one and will not produce an AVO signal. Instead, then, that AVI signal triggers the FSA generator shown in its logic equivalent also in FIG. 9 to provide the function strobe acknowledging signal FSA. This response will be accompanied by the placement of the address code of the device controller address on the data lines DA if the subcontrollers respond to an ASC or an AIO function indicator as described. In case of ASC the service connect flip-flop FSC will be prepared for triggering at the falling edge of the ASC signal.

It is another important feature of this system that the priority determination logic for a device controller is operative in this manner only if the subcontroller, in effect, is connected to power. Also, it may have happened that the device controller initially was the one which issued an interrupt or a service call but became inoperative for some reason subsequently or withdrew the call. One can see then that the priority determination logic of the subcontroller will pass on the AVI signal as AVO signal and ultimately then, of course, there will be an AVO signal set to the IOP by the lowest priority subcontroller.

This function of a subcontroller of producing AVO in response to AVI is not inhibited, for example, if the device controller itself is physically disconnected or has a power failure, or any other malfunction or change in operating conditions,. If the subcontroller itself does not receive any power, either because it is disconnected or because it has not been turned on initially, or there is a power failure, a contact 507 will directly connect the AVi input line of that particular subcontroller to the AVO output line thereof, circumventing also AVI receiver and AVO driver of the subcontroller. The contact 507 thus passes the AVI signal directly as AVO signal to the subcontroller of next lower priority. Thus, an inoperative device and/or device controller does not interrupt the priority determination logic. One can see, therefore, that if the IOP sends a function strobe signal FS down to all the device controllers accompanying one of the function indicators, it will always receive a reply. That reply may be an AVO signaling failure of operation, but the IOP will not, so to speak, be hung up. The IOP, therefore, will always receive either AVO or a function strobe acknowledging signal as response to a function strobe signal FS it sends to all the device controllers. One can see further that the signals AVO will cease to be produced as soon as the IOP drops the function strobe signal FS. The IOP drops FS after it has received either an FSA signal or an AVO signal. This in turn causes release of the FSA line or termination of AVO production.

SUBCONTROLLER CONNECT-DISCONNECT

The subcontroller provides circuitry for connecting and disconnecting the DC from the IOP interface in a transient free manner when power is applied or removed from the DC. Although the subcontroller provides the proper connect and disconnect sequencing, the controller actually provides the stimulus to start the operation.

As shown in FIG. 10, when the subcontroller is to be connected to the IOP interface, the ON-OFF switch on the subcontroller must be positioned to ON and a ground source applied to the connect-disconnect circuitry. The ground source should be applied after all voltages (representatively denoted as B+) have reached nominal operating level.

When the ground source is applied to the connect-disconnect circuitry, the following sequence occurs:

1. Approximately 4.5 milliseconds after the ground source is applied, a set of relay contacts is closed and signal NINI provided by a signal source of like designation is grounded.

2. Approximately 0.5 milliseconds later signal INI is allowed to go true. The short circuit between lines AVI and AVO (relay 507 in FIG. 9) is also removed at this time.

3. Approximately 120 microseconds after signal INI goes true, signal INC goes true and signal NINC is grounded. When the signals INI and INC have reached the true state, the controller is connected to the IOP interface and the service call, interrupt call, and cable driver lines become active.

The subcontroller will be disconnected from the IOP interface whenever the ON-OFF switch located in one of the subcontroller modules is positioned to OFF, or the controller removes the ground source from the connect-disconnect circuitry directly. The ON-OFF switch on the subcontroller is connected in series with the ground source to the connect-disconnect circuitry.

When the ground source to the connect-disconnect circuitry is removed, the following sequence occurs: 1. Approximately 1.6 milliseconds after the ground source is removed, all service and interrupt calls to the IOP are inhibited. This is accomplished by grounding signal INC and letting NINC go true through relay and transistor logic. 2. Approximately 4.2 milliseconds after the signal INC is grounded, signal INI becomes grounded through a set of relay contacts. Line AVI is also shorted to AVO through relay 507 (FIG. 9). The timing of the contacts can vary by as much as 250 microseconds. 3. Approximately 0.5 milliseconds after signal INI is grounded, signal NINI is allowed to go true.

When INI is grounded, the subcontroller is considered disconnected from the IOP interface because INI grounds all of the inputs to the subcontroller cable drivers. Line AVI is short-circuited to AVO so that the subcontroller is still able to be physically connected to the priority cable of the IOP interface without interfering with the operation of the priority cable. The cable drivers affected are shown in FIG. 7 along the subcontroller-IOP interface line.

SERVICE CALL-ACKNOWLEDGE SERVICE CALL DIALOG

As soon as a device with device controller has been placed by the SIO function signal into the busy state, the device triggers the service call CSL generator 511, and the subcontroller will issue a service call signal SC into the common bus of like designation. The IOP will soon have completed the operation required pursuant to its participation in executing the SIO instruction. As soon as the CPU releases the IOP from participating in the execution of the SIO instruction (by dropping CNST), the IOP becomes responsive to pending service calls. Of course, a service call will now be pending from the particular device that was addressed and started placed into the "busy" state by the SIO instruction. Nevertheless, it is possible that other device controllers have placed service calls on line SC so that it is not certain at that point which of the particular devices is the one which raised this signal SC. The service call-service call acknowledging dialog will now be described in general.

As soon as the IOP senses service call signal SC, (receiver 453 in IOP) and after it is not occupied anymore otherwise the IOP will provide a response signal called "acknowledge service call" or ASC for short into the output line of like designation and within trunk tail bus 131. Shortly thereafter (by internal timing) the IOP will issue a function strobe signal FS. As this signal FS now concurs with an ASC signal, it is identified therewith as a function strobe signal provided for purposes of responding to a service call. This means that there are no particular addressing signals for any specific DC provided by the IOP. Therefore, the FS signal is to be responded to by the device controller (subcontroller) having the highest priority among those which placed service calls.

As was explained with reference to FIG. 9 such a device controller (subcontroller) will not produce an AVO signal in response to an AVI signal it will soon receive. It follows also that the device controller now responding to ASC is not necessarily the particular one which has been addressed pursuant to execution of the latest SIO instruction. That device controller will respond now only either if it is the only device which placed a service call signal, or if it is the one with the highest priority among the several DC's.

In any event, at some time after the SIO instruction the service call of the particular device controller then rendered busy will result in an ASC from the IOP to which the device controller can respond. Responding means that the signal BSYC is true to that subcontroller's function strobe acknowledge (FSA) generator 520 is triggered to issue signal FSA. In addition, the subcontroller opens gate 513 and puts its own addressing code on the function response lines FR0 through FR7. The IOP strobes these lines shortly after receiving the signal FSA to set the addressing code thus applied to function response lines FR into the A register. Shortly thereafter, the IOP drops the function strobe signal FS and ASC, and the device controller responds thereto by dropping FSA and SC.

The dropping of ASC (falling edge of signal ASCM) causes the service connect flip-flop FSC in the subcontroller to be set. The set state of flip-flop FSC establishes the fact that now this particular device controller is legally connected to the IOP for service to the exclusion of other device controllers, also connected to the IOP for being serviced when needed but not serviced at that time. With the removal of the signal FSA by the subcontroller, the addressing code is likewise removed from the function response lines FR0 to FR7.

The SC-ASC/FS-FSA dialog between IOP and device controllers has significance whenever the device controller has placed a service call. It will do so, not merely after an SIO instruction but at any time thereafter until halted. REference will be made repeatedly to this dialog. As was mentioned above, a device controller which has just been set into the busy state through an SIO function will immediately place a service call on the line SC of bus 131. As will be explained below, the device controller thereby seeks more information concerning the type of service desired whereby particularly the first command will include an order to the device controller defining the type of operation desired.

SERVICE CYCLES (GENERAL)

In the normal case and for the usual type of peripheral equipment, the input-output operation desired will involve the transfer of data, ultimately between peripheral device and memory. In dependence upon the nature of the device the transfer may be one direction only (card reader, paper tape reader, printer, card punch, measuring equipment) or bidirectional (magnetic tapes, drum, disks). All transfers run through the respective IOP as well as through the respective device controllers. The transfer between IOP and core memory is usually (but not necessarily) to the word level, the transfer between IOP and device controller and between device controller and device is always to the byte level; at least as far as the described system is concerned. Of course, a different format for data transfer device and IOP could be chosen.

The device itself may process, receive or provide data in any format. However, it is necessary to endow the device with byte-assembly or partitioning capabilities if the transfer between IOP and device is to the byte level. The buffer 531 in FIG. 7 represents this portion of the device. It now has to be observed that the transfer of a word from (to) core memory to (from) IOP requires a period equivalent of a memory cycle which is shorter than a microsecond. Since IOP and memory operate asynchronously a short waiting period may precede each memory cycle, particularly if at the time the IOP launches a memory request the particular memory bank is occupied. If the memory banks are divided into pairs in that one bank of a pair holds the even address numbered locations and the other one the respectively interleaved odd numbered locations, then in case of consecutive address locations accessed sequentially by the CPU (which has always priority of access to any bank) the CPU will switch accessing between two memory banks, so that the IOP can have access in between. Thus, the IOP needs never to wait very long before it can have access to a memory location for fetching or delivering data. Nevertheless, the time between a memory request and transfer of a word to or from memory, from or to the M register of the IOP is usually in the microsecond range. The transfer from IOP to device controller is a transfer from register to register and can be made even shorter.

On the other hand, the transfer to and from device, from and to device controller or device buffer is a considerably slower process, one or even several orders of magnitude below. For this reason the transfer of bytes to and from device is an intermittent process which does not have to occupy an IOP on a continuous basis. Therefore, whenever the device buffer 531 has received information it will trigger the CSL generator 527 via line 532 to cause placement of a service call SC by the subcontroller, so that data can be transferred to the IOP. When the device buffer is empty, the service can be temporarily discontinued and the IOP can occupy itself otherwise. When data are to be transferred to the device the device buffer 531 must be empty, i.e., the data previously transferred into that buffer must be fed to the device before the data buffer can receive new data. Thus, for this type of transfer, the empty state of the device buffer is the condition on which the device controller will trigger the CSL generator via line 532 to cause placement of a service call. The device controller otherwise may be equipped with a timer to raise the high priority service request line CSH in case the regular service call has been placed for quite some time without being acknowledged by the IOP through an ASC function. For devices operating at a very slow rate, a device buffer may not be needed and device controller buffer 530 suffices. For economy of operation device buffer 531 may, for example, receive serially several bytes from the device before raising service call (CSL) generator 527.

After a device controller acknowledged an ASC signal by raising FSA and causing its service connect flip-flop FSC to be set, the device controller-IOP configuration will enter one of four possible service cycles. Immediately after an SIO instruction only one (OOUT) type of service cycle is possible, thereafter, i.e., after each new SC-ASC/FS-FSA dialog any of the four service cycles are possible. The type of service cycle is determined by the two DOR and IOR flip-flops 521 and 522 respectively receiving set and reset control signals from the order decoder 523 in the device controller if the service cycles are of the data type. For order type service cycles they are controlled differently.

Three points are important: First, during a service cycle the IOP is under exclusive control of the DOR, IOR signals then applied by the one legally connected DC to the DOR and IOR bus lines as far as information transfer is concerned. Second, during a service cycle the device controller can issue request strobes RS at a rate principally determined by rate with which the device can accept or provide data bytes. This way the device controller controls the transfer rate of information between device controller and IOP. Third, termination of a service cycle is under exclusive control of the IOP (signal ES).

The four service cycles are denoted as follows:

| | |
|---|---|
| "Order Out" or OOUT for short; | (DOR, IOR)=(1,1) |
| "Order In" or OIN | (DOR, IOR)=(1,0) |
| "Data Out" or DOUT | (DOR, IOR)=(0,1) |
| "Data In" or DIN | (DOR, IOR)=(0,0) |

The service cycles follow the SC-ASC communication cycle; in other words, the device controller has issued the service call because it is desirous of communicating with the IOP for purposes of executing a service cycle. During the later part of the SC-ASC communication cycle, the device controller requesting service is connected to the IOP, in that its service connect flip-flop is set. The next step is taken by the device controller to specify which of the possible four service cycles is to occur by setting the DOR, IOR flip-flops 521, 522.

The information exchange between the device, through its device controller, and the core memory through the IOP, is exclusively to the byte level. The device controller, of course, responds initially to orders it received previously and the order decoder 523 provides a two bit code into the IOR and DOR flip-flops to inform the IOP via the IOR and DOR bus lines whether the information byte in the present service cycle is to be transferred to the IOP from the device controller or from the device controller to the IOP; this is denoted specifically by a true or a false signal in the IOR line. The DOR line distinguishes whether the information to be transferred are data or orders.

The timing of the transfer of bytes is initiated by the device itself, as it provides to the device controller strobing or clocking signals or the like indicative of the fact that it now wishes to transfer or to receive a byte. Particularly the request strobe generator 525 will issue a request strobe when data buffer 530 is full for a transfer of information to the IOP (for data or order in service cycles). Conversely the generator 525 will be raised when buffer 530 has been emptied into the device and can thus receive new information from the IOP data or orders pursuant to a DOUT or an OOUT service cycle.

The device controller issues request strobe signals RS to the IOP in response to such clocking signals. It will do so when the device controller permits it to do so, i.e., if service connected flip-flop FSC is set. In addition, however, the two bus lines ED and ES tapped by the device controller provide specific states in a two bit code which enable or disable the request strobe generator 525. The interface line ED is controlled by the IOP and by the device controller, interface line ES is exclusively controlled by the IOP. The latching gates or flip-flops ED (DC) and ES (DC) in the service controller are normally reset or unlatched at the beginning of a service cycle, for example, in response to a raised service call (CSL). Thereafter they are controlled (i.e., they can be set) through true signals in interface lines ED, ES and coming from the IOP. Additionally, the flip-flop ED (DC) can be controlled internally while its output can also control the ED interface line leading to the IOP.

The IOP provides false signals into both bus lines to reset flip-flops ES (DC) and ED (DC) as long as the IOP can accept request strobes from a device controller legally connected to the IOP. As the IOP by operation of its own flip-flop ED (IOP) 482 provides a true signal into the line ED, it signals thereby to the request strobe generator of the DC that the present or current request strobe RS is responded to by the IOP by transferring the last information byte (in case of DOUT or OOUT) to the device in the current service cycle, but that the device controller must still generate another request strobe RS and that thereupon a so-called terminal order (to be discussed below) will be issued by the IOP. The device controller will drive its flip-flop ED (DC) true if in case of a DIN or OIN service cycle the device furnishes now the last byte available in buffer 531. In case of an unbuffered device, (no buffer 531), ED is always raised with the transfer of the one byte from or into buffer 530, i.e., there will be only one request strobe for data transfer per service cycle.

The IOP will set its ES (IOP) flip-flop whenever the current byte transfer is to be the last one in the series. The true signal in line ES resets the service connect flip-flop which in turn disables the request strobe (RS) generator; also, no more request strobes will be accepted by the IOP. The IOP is then disconnected from the device as far as service is concerned and if the device requires further service, it must raise another service call.

If the IOP wishes to issue a terminal order as concluding step of a DOUT or an OOUT service cycle, it must set its flip-flop ED (IOP) 482 first and with the last byte to be transmitted to the device controller (there is only one byte in case of OOUT), but holding ES down. The generator 252 sensing this condition must now issue another request strobe. With this last request strobe the IOP issues a terminal order.

In case of DIN or OIN, the device controller sets the flip-flop ED (DC) when the last byte (the only one in case of OIN) is to be transferred to the IOP, if less than four bytes are to be transferred in the cycle. If the IOP does not desire to provide a terminal order, it sets immediately ES (IOP) which consequently inhibits the request strobe generator 525 in the device controller. If the IOP desires to issue a terminal order it will not raise ES when receiving ED, but will pass the terminal order to the device controller and then raise ES.

The timing of the IOP is designed that at most four bytes of data can be transferred in one service cycle. It is this aspect which provides multiplexing. The IOP generates a signal ED at least once every four bytes, thus terminating the service cycle, to be concluded eventually by a terminal order. It does not require special measures if the control unit 450 simply raises ED whenever for a DOUT-type operation the M register is empty, or full for a DIN-type operation; either case requires then a memory cycle and is a suitable point in time to end the data flow between IOP and device in that service cycle. However, the IOP may generate ED after any byte, thus allowing only one byte of data to be exchanged per service cycle which occurs always for OOUT cycles or if the number of bytes to be transferred after an SIO instruction is not divisible by four, or if the CPU desires service by the IOP because the CPU always has priority over any of the interconnection devices.

In general, the IOP may set its flip-flop ED (IOP) 482 to drive the line ED for any one of the four following reasons: An error of some sort has been detected and the IOP has been conditioned to terminate operations when this error is detected, for example, a parity error or the like. Second, a work boundary has been reached during data transfer and the IOP has to address the core memory to obtain more data bytes, or it has to transfer a word holding four bytes to memory before it can accept new bytes. Thirdly, signal ED will be raised by the IOP to terminate the current service cycle so that higher priority type operations such as the service to the CPU can be carried out. The fourth reason is that signal ED is received from the device controller, and this will be used by the IOP to set its ED (IOP) flip-flop 482. This will be the case if, for example, the device controller had issued a particular request strobe and it has received all data necessary or has provided all data for the current service cycle, and wishes on its part to terminate the particular service cycle. For example, if the device buffer 531 is to the word level (four bytes), it can be filled from the device rather slowly at the transfer rate of the device. Thereafter, a service call is placed and the four bytes can be rapidly transferred to buffer 530, byte for byte, so that the request strobes can be issued rather rapidly. When the device is empty the service cycle is terminated. When the device buffer 531 is filled again another service call is raised, etc.

If an error occurred in the device, the device controller can terminate the service cycle by raising line ED. As indicated for the set input of the ED (DC) flip-flop, line 561, the reasons that a device controller may ask for an order IN service cycle will be reasons for terminating the current service cycle. There are also essentially similar reasons for the line ED to be driven by the IOP and by the device controller, namely, that the service cycle should be terminated because the regulator, relatively high speed transfer of bytes between the device and the IOP cannot be continued at the moment so that the service is to be terminated as far as the device controller is concerned, or because the IOP has to receive more information of any kind.

The line ES is, as stated, under exclusive control of the IOP; it is driven true either concurrently with a signal ED regardless of its source if there is no necessity for a terminal order, subsequently to a true signal ED and as a terminal order is issued. In the first case, the line ES is driven during the same such cycle that ED was drive so that both appear together back at the ED–ES sensor 526 of the DC. The sensor 526 should always use the trailing edge of the signal RS to inspect the state of the ED–ES lines leading from bus 131 to the device controller to decide whether additional request strobe signals will be required, and if required, whether it should be for a terminal order (ED=1) or data transfer (ED–0).

The IOP responds to a request strobe RS received through the line of like designation in trunk tail bus 131 by generating a request strobe acknowledgment signal RSA. If the state of lines IOR and DOR require a data out or an order out type service cycle, then the IOP will in response to RS pass first the appropriate byte into the 0 register the output of which is applied to the data lines DA. After the signals have settled, the IOP produces RSA.

On the other hand, the operation as controlled by the DOR and IOR lines may require acceptance of a byte by the IOP because the device placed a byte on the data lines DA0 to DA7. The IOP then provide the request strobe acknowledgment signal RSA as soon as the eight data lines DA0–DA7 have been strobed by the IOP and its content set into the I register of the IOP. As the device controller senses the RSA signal, it will release the request strobe RS, i.e., RSA resets the request strobe generator 525. At that time, as was mentioned above, the generator will sense the ED-ES line in order to decide whether or not another request strobe should be issued or whether service cycle will terminate so that the device controller must issue another service be honored subsequently by the IOP, either immediately if no other device requests service or if within the chain of priority of the device controllers, the particular device can be serviced again as no higher priority device requests service. It is an important aspect of the IOP system that a peripheral device being, for example, a data acquisition device and delivering data infrequently and/or at random times, do not have to provide for an interrupt each time it has data available. Instead, the device controller is at some initial point placed into the busy state by an SIO function and is under control of an order read, i.e., its IOR–DOR flip-flops are set for DIN-type service cycles. The DC then simply waits until data arrive and issues service cycles only then, i.e., when data are in device buffer 531. Priority of service then depends on the priority rank of the device controller and of the IOP with which this device cooperates.

TERMINAL ORDER (TO)

The terminal order is a data transmission from the IOP to the device controller. A service cycle cannot consist of a terminal order by itself but may conclude any of the four service cycles. It will always conclude an OOUT or an OIN service cycle. The IOP controls the initiation of a terminal order by controlling the state of the lines ES and ED. Concurrently with the transfer of the byte which precedes the terminal order, via data lines DA, the IOP sets the flip-flop ED (IOP) but holds flip-flop ES (IOP) in the reset state. It will be recalled that (ED, ES)=(1,0) establishes that the next request strobe by the subcontroller will result in the transfer of a terminal order. Also, this state ED=1, ES=0 can be used in the device controller to set IOR flip-flop 522 for internal use as now information (namely the terminal order) is about to flow from the IOP to the device controller.

Upon sensing the trailing edge of the RSA sensor 526 in the device controller strobes the ES–ED lines. The request strobe generator 525 now issues that one additional request strobe. In doing so, it will cause the IOP to raise also the ES line so that no further strobe should be issued by the device. During this last request strobe, before sending RSA the IOP gathers several bits from certain locations in the IOP, as symbolically shown in FIG. 12. These bits are assembled in the 0 register as the terminal order and placed as such on the data lines DA0–DA. RSA is raised and the device controller strobes them as usual (RSA IOR) to place the bits defining the terminal order into the buffer 530 and to respond to the content of the terminal order.

The IOP may issue a terminal order or TO, for short, for any of the following reasons: (1) to request that the DC generate an interrupt request; (2) to signal count done to the DC, i.e., the number of bytes to be transferred in one sequence (having required possibly many DIN or DOUT service cycles) have been transferred between device and memory via IOP; (3) to signal IOP half; in conjunction with this, the DC may be instructed to ignore the last byte of data.

The bits in a TO byte have the following significance:

Bit I — interrupt. This bit will be "1" if one of the three interrupt status bits CE1, UE1 and ZC1 of the IS register is a "one" (see FIG. 12). The device controller must respond by generating an interrupt request (see chapter on interrupt, infra). Also, when conditions for halting the device have arisen this bit may be one. This bit is set into flip-flop 541 of the device controller. From there it will trigger CIL generator 511 via OR gate 563.

Bit CD — count done. This is signaled when all required data transmission is complete as far as the IOP is concerned. The IOP senses this by the set state of flip-flop ZDC. This bit is set into flip-flop 542. The device controller must respond to this condition with another service cycle, specifying order IN (OIN), in which CHEND is signaled (see chapter on order IN service cycle).

Bit CC — command chain. This bit is one of the flag bits register FFS and controls, in effect, the sequencing of extensive I/O operations involving the particular device and without requiring execution of a new SIO instruction by the CPU. This bit is thus instrumental in lending a great degree of autonomy to the I/O system without involving the CPU. This bit is set into flip-flop 543 of the device controller.

Bit IOPH — IOP halt. This signifies that the IOP has detected one of a variety of conditions that inhibit it from successfully completing the required operations for the channel. This bit is set into flip-flop 544 and halts the device controller. (See chapter on IOP HALT.)

A fifth bit may be transmitted in a terminal order, particularly if the IOP halt situation arose due to a data error in the last byte transmitted by the IOP to the device, order or data. The fifth bit is used in the device controller to ignore the last byte transmitted by the IOP before the terminal order. For example, the content of buffer 530 or buffer 351 (one byte-stage thereof) can be erased.

EXECUTION OF INSTRUCTION SIO-CPU OPERATION

Pursuant to execution of the computer program an instruction called start-input-output or SIO for short, may be withdrawn from memory and the instruction word SIO is then distributed into the various register portions collectively consisting the instruction register. The computer thereby attempts to cause a particular input-output device to begin to perform specific operations which are part of the program, but which are executed separately, using then solely an IOP, a device and memory, entirely independent from the CPU which can proceed with its program after executing the SIO instruction, i.e., after merely starting an external device pertaining to the peripheral equipment.

The SIO instruction word has the format as shown in FIG. **5*b*. The format is fully explained in general in application Ser. No. 572,835, filled Aug. 16, 1966 of common assignee, now abandoned. Indirect addressing is permitted for this instruction; it has an operation code set into the OP register of the CPU (see FIG. 5). It has R and X fields; the X field permits and indicates indexing to be carried out in a manner described fully in patent 3,405,396 (Ser. No. 546,279, filed Apr. 29, 1966) of common assignee. The R field is set into the R register 155** and defines one or two of the general registers of the current block, which depends on whether the R field code is odd or even. The reference address field of the instruction word, possibly as modified by indexing and/or indirect addressing operations, has no immediate significance as a core memory address. Instead, it includes several concatenated codes defining several different addresses within the IO system.

Three bits of the reference address define an IOP address identifying one of the several IOPs. The high order bit positions of the reference field hold a device address, if that device is associated with a single device controller. Alternatively, that field may be subdivided in a device address field and in a device controller address field in case the device controller cooperates with a plurality of devices. One particular bit position identifies that portion of the reference address field as representing a device address serviced by a single device controller or as a compound address for a device controller and a device. In the following we shall refer to those addresses frequently and designate them as device controller addresses with the understanding that this includes device controller address proper and device address either as a compound code or as two concatenated, separated codes. Where the distinction between the two cases has to be made, it will be indicated.

Of further significance is that upon loading an SIO instruction into the instruction register, the general register "zero" of the current block of the usually R field identified general registers is impliedly included; it participates in the execution of the SIO instruction by the CPU and is not identified by any code in the SIO instruction word. This register, however, could be identified by an R field code and has the R field code (000). If the R field code in the SIO instruction word is actually 000, it is the only general register of the current block used; if the R field is ≠ (000), this "zero" register is used additionally to the ones identified by the R field directly.

Aside from performing the necessary general operations in the CPU for the execution of an instruction, the first effect of the execution of the instruction SIO by the CPU is twofold: At first the CPU enters into communication with the I/O system directly, and, in addition, the CPU communicates with the I/O via the memory. This latter part shall be described first.

A particular core memory location is set aside permanently for the purposes of data communication between the I/O system and the CPU, in the following called X'20'. As the SIO instruction is executed by the CPU, the OP decoder 757 causes the memory location with the address X'20' to be addressed directly. Furthermore, the following information is assembled by the CPU for transfer to location X'20'. Details of the assembling per se are not important here as it merely involves the transfer of the desired information into a suitable CPU register for further transfer as a word to the memory data bus 110 (FIG. 1). This compound word is to be composed for ultimate transmission to an IOP, as the IOP will withdraw it from location X'20'.

Figure 5C:
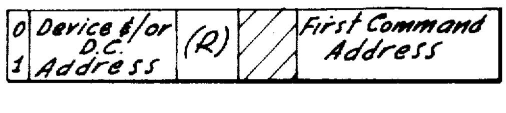

This compound word is shown in FIG. 5*c*; it is composed, first, of the device-device controller address bits from the reference address portion of the SIO instruction as held in the D register of the CPU.

As was stated above, for execution of the SIO instruction, the general register (000) of the current block is accessed. This occurs prior to accessing of any register of the current block as actually identified by the R field code of the instruction word SIO. General register (000) contains a one-half word, defining the memory address code which in turn defines the location containing the first command for the desired input-output operation to be started as a consequence of this SIO instruction. This half word forms the second portion of the compound word to be stored in location X'20'.

The R field of the SIO instruction word has a dual role. On one hand, as stated, it addresses one of the general registers of the current block, but the code number itself is of significance with regard to the information the CPU desires and which the input input-output device should return at the end of the execution of the SIO instruction. Details of that return information will be discussed more fully below. Presently, it suffices to recall that the CPU has a R-field decoder 157 which provides a tow bit code distinguishing the following situations: A first code (00) is provided for the situation that the R field itself identifies the general register (000). A second code (01) is set aside when the R field code is odd, and the third code (11) is provided when the R field code address code is even. This two bit code is represented as (R) in FIG. 5*c* and is set into two particular bit positions in location X'20'.

The transfer of the information included in the compound word shown in FIG. 5*c* is the first phase of data communication from the CPU to the IOP device via memory. As far as the CPU is concerned, this phase is completed when this compound word as defined is placed into the X'20' core memory location. It will then be up to the IOP to withdraw that information therefrom. In order to do so it is, of course, necessary that a particular IOP be addressed. This then is the function carried out through the direct CPU-I/O interface connection and to be described next.

The following lines serve for providing signals from the CPU to the I/O system through trunk tail 120 calbe. There are first the three lines for the signals FNC0 FNC1 and FNC2. They originate in the OP code decoder 151 of the CPU, and the three bits which can be transmitted through the three lines identify the several instructions used by the computer in the CPU to communicate with the I/O system. These instructions include the SIO instructions (and others such as TIO, HIO, AIO and TDV to be described in detail later). The function code lines FNC will provide these bits to all of the respective F registers of the IOPs. For instruction SIO, a function indicator signal of like description will thus be developed by the F-register.

Next, there is the triplet of IOP address lines for the signals IOPA0, IOPA1 and IOPA2, respectively. These lines originate in the output logic of the instruction register portion (D-register) of the CPU holding the IOP address bits of the SIO instruction word. The respective comparators (420) in all the IOPs receive this IOP address; each compares it with the number set by its respective IOP address selector switches 409 and provides signal ME if the address compares, or NME if not. Next, the control unit 152 of the CPU as operated by the CPU decoder 151 issues a control strobe CNST through the line of like designation. The line passing the CNST signal leads to gate 403 of the input-output processor having the highest priority among the IOPs. That gate passes signal CNST to the IOP of the next lower priority if the output of the comparator 420 is false (NME true). As explained above, the connection of the IOP priority determination system runs in this same manner all the way down to the input-output processor having lowest priority. There it is, so to speak, turned around and drives a line for a return signal called "proceed" signal PR. Signal PR can be produced in that fashion as originating in the IOP of lowest priority and as a direct continuation of the CNST signal only if the comparators of all the IOPs connected to the system have provided false signals. In this case, the IOP address in the SIO instruction word was not recognized by any of the IOPs, for example, due to a programming error.

There exists now a similarly staggered transmission line for the signal PR from an IOP of lower priority to the IOP of respective next higher priority. Therefore, the IOP having the highest priority may receive a PR signal from the IOP with the next lower priority and passes it on to the CPU if it has not recognized the IOP address on the IOP addressing lines. For this purpose gate 406 receives the false output of the comparator as a true signal NME together with the PR signal from the IOP of next lower priority. Therefore, a PR signal will be passed on through an IOP–CPU interface line directly from the IOP of highest priority to the control unit of CPU in immediate response to a signal CNST if noen of the IOPs recognized the address set into the IOP addressing line.

As such prematurely returned proceed signal PR is received by the CPU, none of the condition code control flip-flops such as CC1 (IOP) and CC2 (IOP) in any of the IOPs will have been set, so that the non-condition code lines NCC1 and NCC2 are both false. The condition code register in the CPU thus receives the code (1,1): Input-output address not recognized.

If one of the IOPs recognizes the address on lines IOPA and produces a comparator output ME, its two control gates 403 and 406 are accordingly blocked; neither the CNST signal can pass then to the next lower priority IOP nor can a PR signal be passed on the CPU or to the next higher priority IOP, at least no immediately. The IOP can, however, pass on a signal PR if control gate 407 provides a true output which, however, occurs at a later phase of the operation, namely, when the particular device, the service of which is sought by the CPU pursuant to execution of the particular SIO instruction, has provided certain information to be described later on, or if the device address was not recognized by any of the devices serviced by the IOP which had recognized its IOP address, so that signal AVO is received by the IOP. Thus, the provision of signal CNST and the expectation of a signal PR marks the second phase of executing the SIO instruction. The IOP operation in between receiving CNST and sending PR is described in the next chapter.

IOP OPERATION - IOP MEMORY INTERFACE

The first function of the IOP which recognized the address in the IOP addressing lines as its address, is to withdraw the compound word from memory location X'20'. Therefore, in response to comparator output ME the IOP control unit 450 forces the address code for memory location X'20' into the address register, or S register of the IOP. The content of the S register are addressing signals applied to 16 lines LX15 through LX31 which lead by trunk tail cable through the IOP memory interface to one of the several ports of each of the several memory banks 11*a*, 11*b*, etc., (see FIG. 1). Depending on the port, these lines should be labeled LA or LB, etc., but the letter "X" denotes that the respective lines of an IOP can be connected to any port depending on the priority of IOP access to memory. However, any IOP will always feed into the same type of port, A, or B, or C, etc. It will be assumed that only one IOP connects to that port in each memory bank. If these ports are to serve more than one IOP, then it is necessary for an IOP to monitor lines LX first to determine whether another IOP placed an address code on these lines.

As soon as one of the memory banks has decided that the address called for on bus LX is present, it feeds an "address here" signal, called AHX for short, to inform the IOP that the address is, in effect, in existence. Of course, of memory location X'20' this signal AHX will always be provided by one memory unit, as this address location is always implemented. Nevertheless, the implementation test is standard routine for the IOP memory dialog. Moreover, the port of that memory bank is prepared by the AHX signal, leaving the other banks totally unaffected. As soon as signal AHX goes true control unit 450 of the IOP will raise a memory request signal MQX in line MQ being part of bus 121*a*. Signal MQX is fed to the particular bank having location X'20'. The addressing code on lines LX will be gated into the memory for address location access control therein as soon as the port priority logic of that memory bank has determined that memory bank 11*a* can communicate, for example, through port B with the IOP. As soon as the address is placed in the memory address register (151 - FIG. 8*c*) signal ARX is issued by the memory bank into line AR. The unit 450 when receiving ARX releases lines LX and drops memory request signal MQ. After the memory bank has received the request signal MQ it starts a memory cycle to withdraw the content of location X'20'. As soon as the thus addressed memory location permits, it will provide the data, i.e., the compound word (FIG. 5*c*) stored in the location X'20' to memory data lines MXO through MX31. The providing of these signals will be preceded by a control signal DGX in a data gate line DG which is part of bus 121*a* and leads to the control unit 450 of the IOP. The data gate line may be shared by other IOP's or by the CPU if the particular IOP and CPU share the same memory port. Thus, signal DGX will be recognized only by the particular IOP which did send out the MQX requesting signal. Upon receiving signal DGX control unit 450 of the IOP gates the data provided by the memory to the lines MXO through MX31 into the M register. The memory bank raises a data release signal DRX in a line DR shortly after it has provided the desired read word to lines MX and at a definite period before the memory will drop these signals from lines MX. Signal DRX can be used to block the input gates in lines MX for register M.

As stated, this compound word now held in the M register (FIG. 5c) includes the first command address for the particular input-output program desired to be performed; it includes also the address of the device controller for the device to which that program pertains and the (R) code representing the fact that the R field code number in the SIO instruction word was (000), odd or even.

This compound word is now distributed in the IOP. The device and device controller address is set into the A register. The A register decoder 471 responds and provides access to the fast memory location associated with the device controller the address of which is in the A register. This enables ultimately the transfer of the command address code which is a half word of the compound word withdrawn from core memory location X'20', to be set into register CA of that associated memory location of the IOP. This transfer, however, may not be consummated immediately, but may require intermediate storage of the command address in the C registers for reasons explained in the chapter on the transfer of return information from the IOP to the CPU. The device controller address is not only set into the A register, but is passed additionally through I register 465 to the 0 register 466 which applies this address code to the DA0–DA7 data lines leading to all device controllers and devices serviced by the IOP. Finally, the two (R) code bits are set into flip-flops TPE and CMD. These flip-flops are time shared and perform other functions during other operations of the IOP. During an SIO instruction as initiated from the CPU they serve as temporary storage for the (R) field bits and will control the extent of information transmitted by the IOP to the CPU via memory.

FUNCTION STROBE AND ACKNOWLEDGEMENT AT SIO DEVICE CONTROLLER STATUS RETURN

After the IOP has distributed the compound word it has received from the CPU via memory location X'20' into the several IOP registers as described, the address of the device the service of which is requested by the CPU is applied by the 0 register to the eight data lines DA0 through DA7. As soon as its own operation permitted, the IOP raises function indicator line SIO which is one of the outputs of the F register.

As described above, the subcontroller of each device controller has a comparator 510; if the device controller address in the data line DA is equal to the adjusted one, the comparator 510 in the respective subcontroller produces a signal DCA, and signal TSH turns true. Signal DCA enables the function strobe acknowledging generator 520. As soon as the above-described distribution of the compound word has been completed, and particularly as soon as the 0 register holds a device controller address, and shortly after having raised SIO, the generator 486 of the IOP will generate a function strobe signal FS. Function strobe signal FS succeeds the raising of function indicator SIO and the application of the device controller address by the O register to the data lines DA0 through DA7 so that the later signals have properly settled. Upon occurrence of the function strobe signal FS indiscriminately applied to all subcontrollers the subcontroller having raised DCA and receiving function indicator signal SIO now produces acknowledging signal FSA. Additionally, the subcontroller provides status information into the function response lines FR0 through FR7, which form also part of the trunk tail IOP–DC interface connection. Gates 546 which may be opened, for example, by signal FSA for the function SIO (and others) to apply the "status of device" block to the function response lines FR. The eight function indicator lines FR0 to FR7 receive the following information:

The line FRO receives a one bit if that particular device has an interrupt pending, i.e., its interrupt calling device 511 produces signal CIL. It will be recalled that for purposes of this status information generator 511 can be regarded as included in block 545. The lines FR1 and FR2 together receive codes (00), (01), (10), or (1,1) respectively, if the particular device is either ready or nonoperational or unavailable or busy. Line FR3 receives a one bit if the device is set to automatic operation. Line FR4 receives a bit if previously there was an unusual end, as indicated by the set state of UEND flip-flop 555. The bits FR5and FR6 receive codes (00), (01), (10) or (11) respectively if the device controller itself is ready or nonoperational or unavailable or busy. No bit is assigned to the line FR7.

In somewhat greater detail, if the bit set into line FRO is true, then the addressed device has requested an interrupt which has not yet been acknowledged by the CPU through an AIO instruction device. Reasons for interrupts are discussed in a separate chapter; one possibility is, for example, that the "interrupt" flip-flop CIL in the device controller is set. The device cannot be started by an SIO until the interrupt has been acknowledged.

The possible coding bits received by the function or response line of FR1 and FR2 have been explained briefly and the following is to be added. Status block 545 receives these bits directly from the device. A device is ready if the selected SIO addressed device is on-line nd all device conditions required for proper operation are satisfied. If this device is not operational, it means that the selected device is, in effect, disconnected or it is concurrently on-line but it will not allow it to proceed for some internal condition. In either case operator intervention is usually required. The device is unavailable if the selected device has more than one channel of communication available and is connected to a device controller or IOP other than the one specified by the IOP code in the SIO instruction presently executed. Device busy means that the selected device is on-line and has accepted a previous SIO instruction and has already been assigned an I/O operation.

The function response line FR3 should, when true, indicate that the device is in the automatic mode, but if it is false, then the device requires operator intervention. This bit is used in connection with the previous ones to determine the type of action required. For example, if the device is a card reader and is on-line and able to operate, but not yet in the automatic mode, then the bits set into the lines FRI, FR2 and FR3 are all false, because the device is ready, but still manual intervention is, in fact, required. If the operator subsequently loads the card hopper and presses "card reader start" push button, the status would advance (FR1, FR2, FR3)=(001), which means that the device is ready and in the automatic mode.

If the card reader is in status (000) and the SIO instruction is executed, the SIO would be accepted, but the card reader would advance to status (110): device busy but manual intervention required. In reality this means that the device controller will not issue service calls and request strobes for a data IN type operation. Should the operator then place cards in the hopper and push the start button, the card reader status would advance to (111); the device would be busy and in the automatic mode, and the operation would proceed, i.e., there would be service calls and request strobes sent to the IOP to provide for communication between the card reader and memory via the IOP. Should the card subsequently become empty, or should the operator press the "stop" push button, then the card reader status would return to (110). If the card reader is in the status (001) when a SIO instruction is executed, the reader advances to status (111). The information on the cards may then be read into core memory and the input operation continues as normal. Should the hopper subsequently become empty or the stop push button be pressed, it will go to status (110) until the operator corrects the situation. It is significant that no intervention by the CPU is required; as soon as the device status is busy-automatic, service calls and request strobes can issue.

The bit sent into line FR4 indicates an unusual end condition, the bit is "one" when such unusual end occurred during the last operation. The reason may be a normal end or a fault condition. For a fault condition, the device has halted at other than its normal stopping point. In either case, the UEND flip-flop 555 was set and the device will not automatically request action from its device controller, i.e., no request strobes will be produced. The specific details of the indication are a function of this particular device.

Proceeding now to a more detailed explanation of the stations information provided to lines FR5 and FR6 "device controller ready" means that the selected device controller is on-line and all device controller conditions required for proper operations are satisfied. "Device controller nonoperational" means that the selected device controller is currently off-line or is on-line but some condition has developed that does not allow it to operate properly. In either case operator intervention is required. "Device controller unavailable" means that the selected device controller is currently connected to an IOP other than the one addressed by the I/O instruction. This is mentioned for completion only and may normally not occur, and finally, "device controller busy" means that the selected device controller is on-line and has accepted a previous I/O instruction and is currently engaged in performing an operation for the addressed IOP. This is established by the busy-ready flip-flop 560 in the device controller.

It should be mentioned that the distinction between the device status defined by bits for lines FR1 and FR2 and the device controller status defined by bits for lines FR5 and FR6 is significant only when a device controller controls several devices. First of all, this is a case where device controller address and device address are to be distinguished. The addressed device controller may, for example, be ready, but the addressed device may be nonoperational. This latter condition does not preclude the possibility that the device controller is ready for operation with another one of the devices it services. To give another example, the addressed device may be ready, but the device controller may be busy with another device. If, however, a device controller services and controls only one device, then the status coding for FR1, FR2 may be similar to the status coding for FR5, FR6 unless the computer has the capability of changing the status of the device controller and/or of the device independently.

These then are the status information which the device controller provides to the function response lines FR0 through Fr6. The coincidence of the device address recognition signal DCA and of the function strobe signal FS result in production of the acknowledging signal FSA by the FSA generator 520 in the subcontroller, signaling to the IOP that the signals now on lines FRO through FR6 is the requested status information. The IOP will, in response to that signal FSA, provide a strobing signal FSI to cause these status signals of the device to be set into the seven low order positions of the M register. The device controller itself having signaled status "ready" now shifts into the busy state in that signals SIO and DCA place flip-flop 560 into the busy state, provided the device controller does not have an interrupt pending, (CIL not true). The signaling of "device controller ready" denotes in particular that the device controller accepts the SIO function. When later on the CPU will receive this status information it is informed therewith, that the device controller (1) has accepted the "start I/O" instruction and (2) is now in the busy state.

Concurrently with the transfer of detailed status information, the device controller provides also condition code information into lines DOR and IOR. The signal TSH sets condition code flip-flop CC1 (DC). Ultimately this condition code bit denotes whether or not the I/O address in the SIO instruction word was recognized by the I/O system. The signal TSH is produced only if(1) an IOP recognized its address and (2) a device controller recognized its address. Hence, setting of flip-flop CC1 (DC) is representative of complete I/O address recognition. A latch in the input circuit of flip-flop CC2 (DC) prevents the flip-flop from being set by signal TSH when the device is busy at the time of appearance of the SIO function indicator signal. When the device is ready, and shifts into the busy state as a result of accepting the start-input-output instruction request (SIO), condition code flip-flop CC2 (DC) is likewise set.

The IOP when strobing the function response lines FR for loading the device controller status information into the M register, strobes also lines DOR and IOR for loading the IOP condition code flip-flops CC1 (IOP) and CC2 (IOP) (FIG. 5 or 6). Later on, when the IOP produces the proceed signal PR, the CPU will strobe the lines NCC1 and NCC2 leading from the IOP's to the CPU. One can see that the "ready" state of the device controller at the time of an SIO instruction and function and, if true symbolizing acceptance of the start input-output instruction by the device controller, is signaled doubly to the IOP (and later on to the CPU), once as a true, second condition code bit, and again in the status bits (00) as set into lines FR5 and FR6. This is not a redundancy because the condition code is an immediate but temporary response received by the CPU for immediate usage; the status bits will be part of extensive status information that may or may not be used by the CPU or may be used later on. Such usage, in turn, may depend on the earlier received condition code setting.

Shortly after the IOP has strobed the FR and IOR, DOR lines, the IOP will release function strobe signal FS which, in turn, causes the subcontroller to drop signal FSA: the IOP device controller dialog is terminated; the device controller is now in the busy state while the IOP must process the status information it has received.

IOP RETURN RESPONSE

The TOP is now in possession of all information which the CPU desired to receive in response to the SIO instruction. The extent of that information depends on the R field coding in the SIO instruction word. It will be recalled that this code was set into flip-flops TPE and CMD. Briefly, code (00) means that the CPU wants only the condition code. As the condition code is always returned, this case can be discussed last. Code (01) means that aside from the condition code status information, the content of the BC register (byte count) associated with the addressed device controller is to be transmitted. Code (11) means that still additionally the current command double-word address is to be transmitted from the IOP to the CPU. This address (+1) is held in the CA register associated with the addressed device and signifies the memory location (+1) from which the device controller previously drew the last command double-word. As code (11) in flip-flops TPE and CMD signals the most extensive transfer of information from the IOP to the CPU, this case shall be taken up first, i.e., it will be assumed that as the M register received the compound word (FIG. 5*c*) from memory location X'20', "one" bits were then set into flip-flops TDE and CMD. In this case then, the half word of the compound word defining the new command word address cannot be set directly into the CA register associated with the addressed device controller (whose address was set into the A register and caused the decoder to access the particular CA register). Instead, the then existing content of the CA register (previous command word address plus one) is set into the C register under control of flip-flops CMD and passed through the adder (set for subtraction). The content of the adder is passed into the lower half word bit positions of the M register. Hence, the M register holds now the last command double-word address. Subsequently, under control of the timing unit 450, the new command double-word address (held in the 16 high order bit positions of the M register) is set into the C register for subsequent passage into the CA register.

It is significant, that the loading of the M register with the current command double-word address of the previous operation sequence of the device is an operation which precedes the loading of status information from the device (via lines FR) into the seven low order bit positions of the M register. As the current command double-word address is now loaded into the 15 low order bit positions of the M register, a memory cycle is instituted (provided CMD is true). The S register still holds the addressing code for memory location X'20' and MQX is raised as soon as the (old) command word address is set in the lower bit positions of the M register.

As the IOP now demands service from the memory for writing information into location X'20', it raises also the write byte lines MWO and MW1, indicating that a low order half word is to be written into the location defined by the address code held in the S register, presently X'20' and applied to addressing lines LX. The memory will provide the address release signal ARX so that the control unit 450 releases lines LX and drops signal MQX. The old command double-word address of the previous operation held in M register is applied to lines MX0to MX15 after MQ has been raised and upon receiving signal DRX from memory the controls unit 450 releases the lines MX, MQ and MW. As stated, this operation occurring only when CMD is true precedes the setting of the device controller status information into the low order bit position of the M register as described in the preceding chapter.

The transfer of the current (old) command double address into memory location X'20' does not occur when CMD is false. If TDE is true, then the R field code of the SIO instruction was not (000) and regardless of the state of CMD, (i.e., regardless whether the R field code was odd or even) the following transfer of information from the IOP to memory location X'21' takes place. This occurs particularly, after the device controller status information has been strobed from the lines FR into the seven low order bit positions of the M register.

Certain bit positions of the register FFS of the associated service controller hold a plurality of status bits which are indicative of the operational status of IOP-DC co-operation during a previous operation. These status bits are to be transferred from bit positions 8–14 of the FFS register to bit positions of like designations in the M register for further transfer to location X'21' as part of the return information to be received by the CPU when executing SIO. These status bits are shown in their symbolic designation in the FFS register representation illustrated in FIG. 12. The status bits shall be described first. However, it should be mentioned that for explaining these IOP status bits many steps described in detail in later chapters have to be anticipated.

The bit IL in bit position "8" of the FFS register represents whether an incorrect length condition has been signaled to the IOP during the previous operation. It will be recalled that flip-flop 552 in the device controller holds an "incorrect length" bit, and if it does, it has signaled that fact to the IOP operation called order IN and described in a separate chapter. During that order IN the bit of flip-flop 555 in the device controller has been set into position 8 of the FFS register as status bit IL.

An incorrect length situation is present if during the previous operation the device controller received a "-count done" signal from the IOP before assuming the "channel end" state (flip-flop 554), or when having assumed "channel end" without receiving "count done" from the IOP. More particularly, a transfer of bytes between memory and peripheral device pursuant to execution of a command involves always a particular number of bytes, which is the initial byte count number of a command double-word held in register BC. The IOP signals "count done" (flip-flop ZDC being set) to the device controller whenever that number of bytes has passed through the IOP between core memory and peripheral device (in either direction as determined by the order in the command double-word). On the other hand, the external device may at that time still have bytes for transfer or its operation still requires more bytes when the IOP signals "count done". This constitutes an incorrect length, and if that occurred in the previous operation concerning that device, an "incorrect length" bit is set in bit position 8 of the FFS register and is now transmitted as IOP status information to the CPU. For example, 80 columns have to read from a card. If, for some reason, the initial byte count number was not 80 due to a programming error, an incorrect length will have occurred.

The IOP is capable of suppressing an error condition on incorrect length since there are many situations in which incorrect length is a legitimate situation and not a true error situation. Incorrect length is suppressed as an error if the SIL flag bit in the sixth bit position of the FFS register has been set (see FIG. 12). In other words, an incorrect length bit "one" is not transferred as status to the CPU pursuant to the return of status information presently described, if the SIL flag is set. However, at the end of the execution of an input-output operation by a device, this "incorrect length" status bit is "one" if an incorrect length situation occurred anywhere in the command list regardless of the coding of the "SIL flag" and is transmitted as IOP status to the CPU.

Another status bit TE in the FFS register (bit position "9") indicates occurrence of a transmission error. The device controller may have signaled during the above mentioned order IN operation that a transmission error occurred in the device. Such error was manifested in the flip-flop 551 of the device controller. Alternatively the IOP may have detected a parity error when receiving data from the device or a data overrun may have occurred in the information transmitted between device and memory during the previous operation. Bit position "10" of the FFS register holds a status bit TMP indicative of occurrence of a transmission memory error. If a memory parity error (signal PE from memory) has occurred during a data input-output operation, a parity error is detected on any output operation and on partial word input operations as far as memory is concerned. A device halt at the time of parity error occurrence does not occur unless the HTE flag (bit 4 of the FFS register) is set; this will be discussed below. Bit position "11" of the FFS register holds bit MAE which is set if previously there was a memory addressing error, i.e., if the core memory in response to a memory request signaled back — address not here. Bit position "12" of the FFS register holds status bit CMP which denotes IOP memory error; if a memory parity error has occurred when the IOP was fetching a command during an operation described below as order OUT, this bit will have been set.

Status bit "13" in the FFS register is an IOP control error indicator. This bit is set if the IOP has encountered two successive transfer-in-channel commands (see separate chapter on this command). Bit "14" in the FFS register indicates an IOP halt. This bit is set if during the previous operation the IOP issued a halt order to the addressed device because of an error condition. The conditions for halting will be discussed below.

These IOP status bits in the FFS register are transferred to bit positions 8–14 in the M register. Together with the device status bits previously provided by the device controller they form a "status" half word response word to be transferred by the IOP to memory location X'21' for further transmission to the CPU. In addition, the byte count held in the register BC and being the residual byte count number left in the BC register since the previous operation, is transferred to the high order bit positions of the M register. That number should normally be zero. It will not be zero, for example, in case of a particular "incorrect length" situation, or if at the time the SIO instruction is executed the device as addressed is already executing a previous SIO instruction. All these cases are encoded in the status information for informing the CPU why there is a non-zero byte count number.

The IOP thus composes a response word from the "-status" information and from the content of the BC register in the M register. This occurs only when flip-flop TPE is set. The IOP will force memory address X'20' set in the S register to be incremented by "one" to hold address X'21'. The above mentioned addressing sequence concerning control lines MQ, MW, LX, etc., will cause this word, including "status" and the current byte count number, to be set into the memory location X'21'.

COMPLETION OF THE CNST-PR DIALOG

The signal PR, when received by the CPU, signals to the CPU that a response of the input-output system is now available. This is always true regardless of the type of response. Failure to receive PR within a specified time leads to a trap situation in the CPU (see application Ser. No. 572,835, supra). The immediate response information is contained in the condition code bits applied at that time through the two lines NCC1 and NCC2 to the first two stages of the condition code register of the CPU. Thus, upon receiving signal PR the CPU will strobe these lines to set the condition code bits in lines NCC1 and NCC2 into the condition code register, and the control unit of the CPU will then test these first two stages of the condition code register to determine the nature of the response available.

It will be recalled that the proceed signal PR was produced in the line of like designation leading to the CPU shortly after the CPU produced the control strobe CNST, if neither of the IOPs recognized the address on the IOP addressing line as its own. In that case the condition code lines NCC1 and NCC2 were not raised by any of the condition code flip-flops NCC1 (IOP) and NCC2 (IOP) of any of the IOPs, so that after inversion of these condition code bits the first two stages of the condition code register receive "one" bits. This, of course, means a complete failure of the attempted SIO instruction as far as starting a device of the I/O system is concerned; at this particular point in the main program the computer demanded the service of an external device, but the I/O system as a whole is incapable of responding as there may have been an error in the programming or addressing, failure of connecting a device to the system, setting the wrong codes, etc. In accordance with the main program in the computer, a condition code setting 1,1 may result in a subroutine dealing with the particular situation.

Assuming that an IOP did recognize its one address, but that none of the devices serviced by this IOP recognized its own address. In this case then a signal AVO is returned by the priority connection system among the device controllers to the IOP in response to a function strobe signal FS and a function indicator signal SIO. Again, no condition code information appears on the IOR and DOR lines, none will be set into the lines NCC1 and NCC2. The AVO signal when received by the IOP passes through the gate 407 as this is opened by the ME signal (resulting from address recognition by the IOP) and by the CNST signal from the CPU or the next higher priority IOP. This gate 407 now produces a signal serving as alternative input to OR gate 405, and a proceed signal PR will be produced. Upon reception of this signal, the CPU will strobe the condition code lines NCC1 and NCC2, and again a setting of (1,1) will result in the condition code register — no I/O address recognition. Another error situation can occur if during the reading of the memory location X'20' a parity error occurred. This was signaled by a signal PEX into memory-IOP interface line PE. That signal can be used as alternative input for gate 407 signaling PR.

In addition, PE can be used to hold the condition code control flip-flops CC1 and CC2 (IOP) down, and the situation is treated as a nonaddress recognition, because parity error may have simulated an existing address, IOP and/or device controller, though actually programming provided false ones.

The desired production of a PR signal in response to a CNST signal occurs, of course, when resulting from address recognition by both, an IOP and a device connected thereto. Now the PR signal will be produced if certain conditions are satisfied. These are monitored by the control section 450 in the IOP tending to establish coincidence of the following conditions:

The memory address X'20' must have been read during (FIG. the first part of IOP operation pursuant to execution of an I/O instruction without an error. The condition code flip-flops CC1 (IO) and CC2 (IOP) in the IOP must have received information at the time of the function strobe acknowledging signal FSA provided by the device is received by the IOP. That is all that is required to produce a signal PRZ as alternative input for gate 407 to produce the proceed signal PR, if flip-flops TDE and CMD were both reset after the IOP received the compound word from the CPU (Figure 5*c*) via location X'20'.

If TDE and CMD were not both reset, the desired status condition information from the address device must have been obtained by the IOP. This, in turn, initiated the transfer of the "status" and "byte count" information from the IOP to the memory locations X'21', eventually preceded by a transfer of the "old" command word address into the location X'20'. The IOP actually has completed its contribution to the execution of instruction SIO only after that transfer has been completed. Therefore, the control unit 450 of the IOP will respond to a completion of this transfer. The control unit 450 provides then again the signal PR2 to the control gate 407 which, in conjunction now with the true output ME of the comparator in the IOP unit, and the signal CNST, provides signal PR.

If the IOP has the highest priority, signal PR regardless when and how produced runs directly through the IOP–CPU interface into the control unit of the CPU to signal to the CPU that the I/O system has completed its operation required for the execution of the SIO instruction. If the IOP is not one of a high priority, this PR signal will run through the other IOP's and through their respective control gates 405 enabled due to the fact that their respective comparators provide outputs NME as they did not recognize the IOP address. CPU When the IOP has performed the functions and has issued signal PR, it no longer needs IOP address and function code (SIO) from the CPU. Therefore, the CPU drops the information from the IOP addressing lines and the lines FNC after it has received the proceed signal PR from the IOP. The CPU is informed as to whether or not the IOP and/or the device recognized the address by reception of the condition code bits. Furthermore, the control unit of the CPU will release the CNST line which, in turn, releases the PR signal information. Thereupon the direct CPU–IOP dialog pursuant to execution of the I/O instruction SIO is terminated.

The last phase of execution of the instruction SIO will be continued by the CPU alone and in response to the condition code setting. Assuming the setting is not (1,1) then the CPU will withdraw the information now held in the memory location X'20' and will store this information into the general register of the current block, as identified by the R field code. If the R field code for the general register of the current block is an even addressing number, that register will receive the content of memory location X'20'. The IOP loaded the current or old command double-word address of the previous operation of the particular device controller into this location when the R field code (R) was even.

The general register of the next higher addressing number will then receive the content of the memory location X'21' which includes the status information as provided by the IOP and the device controller, and the current byte count number of register BC in the IOP. Should the R field coding be odd, then the general register of the current block, so identified, has an odd addressing number. In this case the command double-word address of the previous device controller operation was not loaded by the IOP into any memory location, but memory location X'21' received the "status" and the current byte count; that information is then, during the last phase of the execution of the SIO instruction, transferred from the memory location X'21' to the general register as identified by the odd-numbered R field code of the SIO instruction.

THE OOUT SERVICE CYCLE

At the end of an SIO instruction execution, as far as the IOP is concerned, the particular device controller which was addressed pursuant to execution of the SIO instruction, will as soon as it enters the busy state, place a service call SC on the line of like designation in bus 131. The IOP will respond to the service call as soon as the CPU has released the IOP and after service calls of any of higher priority devices have been satisfied. Thereupon the IOP will answer the service call of the particular SIO-addressed device in that the device controller thereof receives AVI and thus can respond to the function strobe FS accompanying an ASC signal. As afore-described, concurrently with the acknowledging signal FSA the device controller places its address on the function return lines FR, the IOP strobes the lines (FS') and sets the device controller address code into the A register. The output of the A register opens up the portion of the fast memory in the IOP associated with the particular device controller and including one each of the registers CA, BC, etc., as needed, to be discussed below.

For purposes of this description, it is now assumed that the particular device connected for service to the IOP (in that its service connect flip-flop is set) is the one addressed to the IOP with the understanding that this may not necessarily have occurred after the CPU released the IOP from further participation in the execution of instruction SIO, but the IOP may, in the meantime, have serviced other devices which had a higher priority. Thus, the IOP cannot expect after executing a SIO instruction that the next FSA signal it receives comes from the particular SIO addressed device, which is the reason that device controller must always provide its address to the IOP when demanding service.

On the other hand, the device placed into the busy state by the previous SIO instruction is, at this point, "unaware" of the particular purpose which caused the computer to demand its services and it is necessary that the device and the device controller be informed of the type of service required. After an instruction SIO and when the device controller entered the busy state, the first service call will be accompanied by an order OOUT. In other words, the DOR–IOR flip-flops 521 and 522 will be set to drive lines DOR and IOR true (see control 565) after the device controller has entered the busy state. As soon as the IOP provided a function strobe signal FS, it cleared also the ES(IOP) and ED (IOP) flip-flops so that these two lines hold false signals enabling the request strobe generator 525 through the sense device 526 in the device controller. Flip-flops ES (DC) and ED (DC) may be reset with the function strobe FS, or previously by CSL of the device controller. Thus, as soon as the service connect flip-flop is set (at the trailing edge of ASC) RS generator 525 will issue a first request strobe RS. The IOP now receives the request strobe signal and starts its own timing cycles. The IOP will particularly respond to the two DOR and IOR true signals with which the IOP is informed that an order OUT service cycle is requested by the device, which means that the device counts an order.

The IOP cannot immediately respond to the request strobe RS (at OOUT) as it does not have any order available. Instead, the IOP will institute a core memory reading operation, as was described above in general. It will be recalled that during the execution of the instruction SIO the register CA, associated with that particular device, received the first command word address which defines the memory location in which the first one of the first command double-word of an I/O program for the particular device is stored. That may be a single command double-word or the first one of a list of commands constituting an extensive I/O program to be executed by the I/O system as a result of that particular SIO instruction.

Therefore, in response to the OOUT operation, as controlled by the device (DOR=IOR=1), the content of the CA register will be transmitted to the S register in the IOP. This is possible, because during the preceding service call-acknowledgment dialog the device controller address was set into the A register, and the accessing operation to the proper register CA is controlled by decoder 471 for the content of the A register. The first command double-word address after set into register S is passed through the LX lines to the memory and by operation of the IOP-memory interface the first one of the command double-word will be passed from memory to the M register.

The CA register passed the first command address not only to the S register but also to the C register which is the input to the adder, and by operation of the IOP, the current command double-word address is incremented by 1 and returned to the S register. The first one of the command double-word has the following format: The seven low order bits hold an order and the high order half-word (bit positions 16 to 31) hold a so-called byte address.

The orders each include a general portion and a specific portion. The general portion is defined by specific codes. For example, bit positions 6 and 7 may be (01), (1,0) or (1,1) respectively defining the orders generally as "write", "read" or "control". "Write" means that a transfer from memory locations to an external device is requested. "Read" denotes a transfer in opposite direction. The remaining bits within the order code can specify the "read" or "write" process in greater detail as far as the particular device is concerned.

The order "control" is specified by the additional order bits (0 to 5) to denote the type of control desired. For example, tape rewind, backspace file, etc. Bit positions 6 and 7 are both zero for the two other orders, distinguishing by (01) and (11) respectively in bit positions 4 and 5 and denoting "sense" and "read backward". "Read backward" is similar to "read". How it involves the IOP will be described below. The sense order is used to determine the state of the device other than the "status" return during execution of the SIO function as described above. "Sense" involves particulars unique to the device, for example, the particular position of a tape, or disk, the number of lines printed, etc. The device controller must be equipped to furnish such information.

These orders are transmitted by the IOP, (0-register) to the respective device controller. Such an order is executed in a two-fold manner, first, it involves particulars of the device concerning the device operation demanded by that order; second, the order is executed by cooperation of the device controller with the IOP, and that part of the execution involve exclusively DIN (data in) or DOUT (data out) type service cycles. "In" and "out" refer always in relation to core memory as ultimate destination or source; or in relation to the IOP as far as immediate transfer between IOP and device is concerned.

For orders "write" and "control" there will be DOUT type service cycles (from memory to device) and it is up to the device controller to interpret the bytes then transmitted by the memory through the IOP to the device as data proper or control information. For orders "read", "read backward" and "sense", DIN-type service cycle or cycles will be executed (transfer to memory from device). The device controller then has to assemble bytes being data "read" or state information as the case requires.

The "control" order may not involve any byte transfer as the order, per se, may suffice, in which case there will be no DOUT service cycle at all, unless additional control information has to be transmitted to the device which then is a byte transferred to the service from memory by a DOUT service cycle.

The first portion of the first one of the command double-words received by M register is thus one of the seven order codes. Five have been mentioned above, two additional orders will be discussed in later chapters. It will thus be an order which defines the specific operation required by the CPU to be performed by the device and the device controller. Through certain transmission stages these order code bits are passed through the I register into the register of the IOP for temporary storage therein; the 0 register controls the data lines as far as providing information to the devices is concerned. As soon as this order is in the 0 register the IOP is in a position to provide the request strobe acknowledgement signal RSA in response to the request strobe RS which with the device controller requested an order. The signal RSA thereupon passes the order through the bus 131 to the particular device having raised the request strobe RS and having its service connect flip-flop set.

Upon occurrence of the RSA signal, the device controller strobes the DA lines (see gates 534) and sets the byte which holds the first order into the buffer register 530. Concurrently, and in particular response to the OOUT type service cycle as determined by the true state of DOR and IOR lines, the IOP will set its ED (IOP) flip-flop, and the ES will stay false. This is the usual case, as the OOUT service cycle always terminates with a terminal order. The device responds to the reception of the order in buffer 530 by further processing same, the decoder 523 prepares for controlling DOR and IOR flip-flops 521, 522 during the next service cycle; the order is sent to the device so that the device itself can now actually begin to operate, e.g., to prepare itself for the transmission or reception of data.

The device controller upon sensing RSA releases the request strobe signal RS (resetting of generator 525). If the IOP senses the release of the RS signal, it releases on its part the RSA. The DC must now generate another request strobe signal subject to the state of signals ED and ES. It will do so because an OOUT operation always concludes with a terminal order. The IOP, as soon as it senses dropping of the request strobe signal, will disconnect the 0 register from the data lines DA. This completes the first phase of OOUT as far as the device controller is concerned. As to the IOP, the service cycle OOUT continues in the following manner.

The M register, when receiving the first one of the command words, received not only the order but also the memory byte address. This memory byte address is either a source or a destination, or more precisely the beginning of a source or of a destination in memory of data. If the order calls for DOUT type service cycles, bytes have to be transmitted to the device and the byte address is a source; if the order calls for DIN type service cycles, bytes have to be transmitted from the device to memory, so that the memory byte address is a destination.

This byte address held in the upper bit positions in the M register is transferred by the IOP control to the BA register of the fast access memory location in the IOP pertaining to the particular device. The three low order-byte address bits are also set into certain bit positions of the OF register, to facilitate handling. The byte address as provided is always the first one of a series. Any data byte received, for example, from a device (during a DIN operation, infra) will have to be set into the corresponding byte position location in the M register, because upon transfer of a full word (four bytes) from the M register to a memory location, the relative byte positions within that word are maintained. The next byte then has to be placed into the next higher byte position in the M register corresponding to a next higher byte address, etc. This distribution of bytes into proper byte positions in the M register is controlled by distributor 469 which is under control of the bits in the OF register defining the relative byte position within any full word location.

The S register held the address of the first one of the first command double-words. After the address release signal ARX has been received from memory, the address is set into the C register and passed through the adder to be incremented by "one" and fed back into the S register. A new core memory access cycle is now commenced to obtain the second one of the command double-word. The first, i.e., flow order byte of this second command word holds flags. the half word held in the high order bit positions is the so-called byte count number. As soon as received by the M register, the second one of the commands double words is distributed into the fast access memory location associated with the particular device. The flag bits are set into the low order bit position of the FFS register. Some of the flags are additionally set into the OF register. The significance of the individual flag bits is shown in FIG. 12 and will be described below and in relation to the particular operations they control.

As stated, the second command word includes a half word which is called a byte count number. It is a number which defines the length of the byte list beginning with the memory byte address previously placed from the first command word into the BA register associated with the particular device which demanded the OOUT service cycle presently described. This byte count number is decremented with the transfer of each byte from the IOP to the device, or vice versa, for example, during DIN or DOUT TYPE service cycles to be described below. The initial byte count number received as component of the command double-word passes first the C register, but without incrementation during this first passage and from there into the BC register of the fast memory portion associated with the particular device.

An OOUT service cycle always concludes with a terminal order which in this case, i.e., at the end of an order OUT service following the SIO-starting operation is essentially of significance only with regard to the interrupt bit within the terminal order. Interrupt operations will be described in a later chapter; suffice it to say that the terminal order concluding OOUT after an SIO operation will have a false interrupt bit if the entire operation up to this point was without error, so that the device controller can now proceed in accordance with the order it received during OOUT.

DIN-DOUT SERVICE CYCLES

During the OOUT service cycle, an order code was transferred to buffer 530 and caused the decoder 523 to respond. However, the decoder will obtain control over the input lines for the DOR and IOR flip-flops 521, 522 respectively at the earliest when the terminal order is transmitted at the conclusion of the OOUT service cycle, because the state of lines DOR and IOR have no significance any more when the terminal order issues, except that IOR should stay set for the terminal order because IOR=1 represents information flow from IOP to device controller. At the end of the order OUT service cycle, after transfer of the terminal order to the device controller, flip-flops ES in the IOP is set to raise the ES line and the sensor 526 in the device controller upon strobing the ES-ED lines inhibits the request strobe generator 525. The service connect flip-flop is also reset by ES=1 so that the device is now disconnected. The device and the device controller are now in an autonomous operative state.

The decoder 523 now sets the DOR and IOR control flip-flops 521, 522 and the device controller will enter the operative state in accordance with that order. As soon as the device has the first information byte available (in case of DIN) or can accept a byte (in case of DOUT), the service call CSL generator 527 will be triggered to raise the service call SC generator 515. As soon as the IOP is not occupied by the CPU the IOP will answer with an acknowledging signal ASC followed by a function strobe signal FS. If other devices having higher priority have no service requests pending then the particular device will issue the function strobe acknowledging signal FSA. In concurrence therewith the particular device addressing code is placed again on the function return lines FR through gate 513. This identification operation is always the first step in any service cycle. The code is set into the A register of the IOP so that the decoder 471 provides access to the fast memory portion associated with the particular device.

The lines DOR and IOR will have a code dependent upon the two possible types of service cycle and data transfer that may now ensue. It may be a data IN (DIN) with both IOR and DOR holding false signals or a data OUT (DOUT) with IOR true and DOR false. It will be assumed that the pending order is data OUT. The IOP senses now the IOR line and we presently assume that it is a true signal because the device requests data. The content of the BA register is set into the S register and a memory read cycle (MQX, ARX, DGX signals) occurs to apply the address code for the word which includes the first byte to lines LX. The byte address is also set into the C register, passes through the adder to increment the word level of the address by one and back into the BA register. Therefore, now the IOP accesses a full word memory address and places that word into M register. Consequently up to four bytes of data can now be transferred from M register to the device controller, one byte at a time, and during one service cycle, unless that service cycle is interrupted for any reason, and if the byte count number in BC register is at least "four". The transfer of bytes from the M register is controlled by distributor 469 under control of the OS register; one byte after another is set from the M register into the IMB buffer register and passed via the I register into the 0 register, to apply the data byte to data lines DA0–DA7. The latter transfer occurs in response to a request strobe RS issued during such a data OUT cycle by the device controller, whereupon the IOP provides a request acknowledgment signal RSA.

The device controller has provided the first request strobe in response (1) to the state of the signal lines ES and ED, which are both false at the beginning of the DOUT service cycle unless the initial byte count number has just "one"; (2) the buffer 530 must be empty (or hold only bits which can be destroyed). This is likewise the case at the beginning of a data service cycle.

Upon receiving RSA, the device controller strobes the data lines DA by opening gate 535 and sets the byte into buffer 530; by internal control the byte is then passed on to the device (buffer 531), whereupon RS is raised again. With each request strobe the IOP will transfer a byte to the O register and issue a request strobe acknowledging signal RSA so that the device controller can set the byte into buffer 530. The device controller, in turn, is able to provide another strobe signal FS as soon as buffer 530 has emptied into the device, buffer 531.

Concurrently with the transfer of each byte, the byte count number in the BC register in the IOP is decremented in that the current content of the BC register is passed through C register, adder and back into the BC register of the fast memory associated with the particular device. The decremented number is sensed before return to the BC register; if it is not zero flip-flop ZDC remains reset and the operation continues.

With the last byte of data to be transferred of this one word and during that service cycle, the IOP drives the ED line true. Normally the IOP drives also "end of service" line ES (flip-flop ES (IOP)) true simultaneously during transfer of the last data byte of the current service cycle provided a terminal order is not required.

If the IOP detects that a terminal order is required, it holds down the "end of the service" line ES false when driving the ED line high, so that generator 525 in the device controller provides a last request strobe. The IOP then drives the end of service line ES true simultaneously with the terminal order to indicate that the current byte is a terminal order and that the service cycle is now completed.

As was mentioned above, there are reasons why a service cycle may not last for four full byte transmission phases. For example, the byte count number in the BC register may have been decremented to zero indicating that all of the data to be transmitted by the computer from the particular list of memory byte locations to the device have, in fact, been transmitted. In this case, the ZDC flip-flop in the IOP has been set when "zero" is the number to be returned into the BC counter. This will set flip-flop ED (IOP) to drive the ED line true while maintaining ES false to indicate to the DC that the end of the data sequence has been reached. However, this does not, per se, inform the device controller about the "count done" situation. As was mentioned above, the terminal order has a bit position (set into data line DA1) indicating "count done" if that is the case. Hence, with each terminal order the state of flip-flop ZDC is applied to line DA1 and the respective set or reset state is transmitted as CD bit to the device controller, to set or reset flip-flop 543 therein. (See symbolic representation in FIG. 12.) When the "count done" bit is "1" then the required byte transmission is complete. The DC must respond to this condition to (1) provide another service call and (2) set lines DOR and IOR to specify the service cycle as an order IN. That will be described in the next chapter. The terminal order may also call for an interrupt if an error occurred in the IOP. This can occur prior to the "count done". Details of interrupt situations will be discussed below, in the chapter on interrupts.

Assuming that the order transmitted during OOUT requires a data IN (DIN) type service cycle then the operation is as follows. Each request strobe RS is produced in the device controller when a byte is available in register 530 and applied to the data lines DA. The IOP accepts the data byte by strobing the data lines DA and setting the byte into the I register. Thereafter the IOP produces a request strobe acknowledging signal to cause release of line RS. The device will provide another byte into register 530 and raise RS again, etc. Since the IOP has buffering capabilities for a full word (M register) it can accept up to for data bytes during each service cycle before transferring the four bytes as a composite word into memory. The distribution of the bytes from the I register into the several sections of the M register is controlled again through the byte number in register OF. The last byte transferred during a DIN service cycle is indicated by either the IOP (when the M register is full) or by the device controller when no more bytes are available. In either case, the ED line is driven true. The use of the ES signal line by the IOP for deciding whether or not the service cycle is to terminate with a terminal order is the same as for the data OUT cycle.

During transmission of each byte, the BC counter content is decremented in the same manner as aforedescribed and the "count zero" is performed to determine the state of flip-flop ZDC. The "count zero" test may find a decremented byte count number zero before the M register is full, which, of course, supersedes then as a condition for terminating the data transfer of this cycle and ED is driven true. At the end of the service cycle, the full or partial word in the M register, as the case may be, is transferred to memory. The location is defined again by the address held in the BA register and which, of course, is being set into the S register. The MW0 to MW3 (or less) lines are driven true to inform core memory how many bytes are actually to be written into the designated memory location.

IOP - HALT

During any of the service cycles error situations can develop requiring the device to halt. Halting is signaled to the device controller in a terminal order concluding a service cycle, usually the one in which the condition for halting arose. IOP halt transmitted as fourth bit (IOPH) is received in flip-flop 544 of the device controller. Depending on the structure for the device and device controller, the device controller may take no action or inhibit further data transfer in that, for example, no more service calls are issued until the device has reached "record end"conditions causing the "channel end" flip-flop 554 to be set. That, in turn, will result in another service call for an order IN service cycle to be described in detail in the next chapter; thereafter, the device shifts to the ready state.

The following conditions can cause an IOP halt terminal order to be issued by the IOP, to be described with reference to FIG. 12. The FFS register holds in bit position 4 the halt-on-transmission-error flag HTE which, When set, opens gate 611 to signal IOPH. If during a data IN or data OUT operation a parity error PE has been signaled to the IOP, status TMP in bit position 10 of the FFS register is set to indicate that a transmission memory error has occurred. The TMP, when true, can pass through gate 611 for defining the IOPH bit in the terminal order concluding that data IN or data OUT service cycle. If the device controller has signaled a parity error DAP during a data IN operation, status bit TE in position 9 of the FFS is set to signal a data transmission error. TE can be passed through gate 611 when open by HTE and results in an IOPH. A status bit TE can be set into the FFS register also by an order IN (next chapter). The so-called incorrect length status bit transmitted through an order IN from the device controller is also used to generate IOPH. This will be effective only if one permits order IN service cycles before "channel end" has been obtained, e.g., before the device has completed operation on the current record. The output of gate 611 is additionally used to inhibit command chaining, (see chapter on command chaining).

The IOPH is also recorded in bit position 14 of the FFS register to indicate as status, that there was an IOP halt condition. Moreover, the IOPH bit when transmitted to the device controller is used to set UEND flip-flop 555 for the device controller to signal unusual end to the IOP in the next order IN service cycles. Details thereof are discussed in the next chapter and the effect of UEND when received by the IOP will be discussed in the chapter on interrupts. Three other conditions can cause an IOP halt; they are independent from the HTE flag. These conditions are particularly important because the IOP has memory access capabilities independent from the CPU.

Status bit MAE in bit position 11 of the FFS register is set when at any time the IOP desired access to a memory location and receives an "address not here" signal $\overline{AH}$. Status bit CMP in bit position 12 of the FFS register is set if the core memory signals "parity error" PE during a memory cycle when the IOP attempts to withdraw a command double-word from memory. This will occur during an OOUT. Thirdly, it is a forbidden condition that two transfer-in-channel commands (see chapter on "transfer-in-channel") be encountered in immediate sequence. If so, an error situation is present and a control error bit CE is set into bit position 13 of the FFS register. These three situations are monitored by an OR gate 615 likewise signaling IOPH to the device controller in the respective terminal order and setting status bit IOP-UE in the FFS register. Order IN and possibly interrupt operations may likewise follow.

THE ORDER IN (OIN) SERVICE CYCLE

The device controller initiates the order IN service cycle to transmit an operational status byte to the IOP. This will usually be the case if the previous data service cycle was terminated short of transferring the full set (four) of permissible bytes, i.e., if the actual end of data transmission has been reached. More generally, if for any reason (discussed in detail below) one of the flip-flops 554 (CHEND) and 555 (UEND) in the device controller is set during device operation, an order IN service cycle is required. One of the flip-flops 551 to 555 may have been set for reasons of internal device operation or because the IOP had terminated a service cycle with a terminal order signaling "count done", CD=1 for flip-flop 543 or by signaling IOP halt, IOPH=1 for flip-flop 544. Either of these latter signals transmitted by the IOP to the device controller as terminal order affects one or more of the flip-flops 551 to 555. As soon as then one of the flip-flops 554 and 555 is set circuit 561 responds and the device controller terminates that cycle by setting flip-flop ED (DC). DOR (specifying "order") causes placing of another service call and, when the IOP has responded and the service connect flip-flop is set again the device controller will specify "order IN" (see control of IOR-DOR flip-flops 521, 522 by block 561. During an order IN (OIN) service cycle and reports the status of all flip-flops 551 to 555 to the IOP.

The service cycle OIN commences in the usual manner with service call SC and acknowledgment ASC, placement of a function strobe FS, placement of device and device controller address on the function return lines FR setting of the service connect flip-flop FSC the IOR, DOR lines then holding a code DOR=1, IOR=0 identifying the order in (OIN) service cycle. As this is an IN cycle as far as the IOP is concerned, the IOP will strobe the data lines in response to the first request strobe during that order IN cycle so that its I register can receive the order IN. Since only one data byte is to be transmitted, the ED line will be driven true by the device controller.

Not the entire eight bits of a byte are used but only five thereof. The bits are held in the status flip-flops 551 to 555 of the device controller. For an OIN cycle they are set into the five low order stages of the buffer 530 and gated into data lines DA0to DA4. Some of the status bits have developed by the device controllers in response to internal conditions in the device which may have developed during preceding device operations, others are determined by a preceding terminal order. The status will now be described briefly in the following, including a brief description of the operational steps taken by the IOP after it receives these status bits, whereby it is significant that the OIN service cycle concludes always with a terminal order. It is therefore necessary to observe carefully the following distinction: An OIN service cycle may be instigated by a device controller as the result of a terminal order received from the IOP at the conclusion of a service cycle (other than OIN). An OIN service cycle itself is always concluded by a TO basically for the purpose to inform the device controller whether as a result of the OIN service cycle it should (1) call for an interrupt and/or (2) halt its operation. The FIG. 12 should be consulted for tracing the information flow related to OIN, through gates having reference numerals above 600 and can be considered as part of control unit 450 of the IOP.

The status bit held in the flip-flop 554 when set indicates "channel end" (CHEND). The device controller thus reports channel end to the IOP when it no longer needs to be connected to the IOP. This does not necessarily means that the device has concluded operation or function associated with an operation, but it means, for example, that the device no longer requires the IOP to conclude that operation. CHEND will be set true in flip-flop 554 if the device has reached the end of the record on which it operates (record block of data on a tape, a complete card, etc.), and/or when the IOP signals "count done" via a terminal order.

The terminal order with which the IOP responds to the "channel end" condition at the conclusion of the OIN service cycle requests an I/O interrupt if the "interrupt on channel end" flag ICE in FFS register is true, bit CE1 in IS register. Interrupt procedure will be explained in a later chapter. If the command chain flag bit (CC) in the FFS register is true, then CHEND signaled to the IOP results in a CC bit in the terminal order concluding the OIN service cycle. Command chaining will be explained later in detail; briefly it concerns the point whether after CHEND a device should shift from "-busy" to "ready" requiring a new SIO to return to "-busy" or whether it should stay busy and call for a new order in a new command double-word. If the TO concluding OIN does not include CC=1 the device returns to the ready state. This is the termination of an I/O program involving the particular device. As the device controller shifts to the ready state it will not issue any further service calls. If further communication with the device is required, there must be an SIO instruction in the main program of the computer.

Flip-flop 555 in the device controller holds a bit (UEND) which, when true, indicates "unusual end". An unusual condition occurs when the IOP has, in a prior terminal order, signaled "IOP halt", and did set a bit IOPH into flip-flop 544. A device controller reports unusual end when it detects unusual conditions that require it to disconnect from the IOP. It so disconnects after receiving the terminal order that follows the order IN as usual. If the "interrupt or unusual end" flag IUE in FFS register is set, interrupt status bit UEI in the IS register will be set and the terminal order concluding OIN will include interrupt bit I to cause the device to request an interrupt after it has disconnected from the IOP.

The next OIN order bit to be discussed is called TE and held in flip-flop 551; it is true if there was a transmission error. For example, when the device controller detects an error in the data transmission within the device and through the controller, it sets flip-flop 551. For example, a sequence of data may have to be transmitted between the memory, IOP, device controller and device in either direction pursuant to data IN or data OUT service cycles. Now, the device detects a transmission error. The device still continues until encountering "channel end" whereupon the device controller institutes an OIN service cycle.

The IOP places the transmission error bit TE as a status bit of like designation in bit position 9 of the status register FFS. As "channel end" is indicated concurrently with "transmission error" the possibility of command chaining exists, because the terminal order concluding OIN provides bit CC to the device controller, gate 601. However, that is inhibited by gate 602 if the OIN signaled TE provided the HTE flag in register FFS is set (gate 611). The IOP indicates also "IOP halt" in the terminal order concluding the order IN, (gate 611) provided the HTE flag is set and status bit IOP-UE in the FFS register is set accordingly. However, IOP halt has no direct effect on the device because the device halts anyway at "channel end" when the command chain bit is suppressed.

The status bit held in flip-flop 552 and to be transmitted to the IOP during each order IN service cycle is an "incorrect length" bit. Incorrect length is indicated by the device controller if it receives a terminal order specifying "zero byte count number" (state of flip-flop ZDC in the IOP) before the device has reached an end of record, or if the device reaches end of record before a terminal order specifies "zero byte count". In either case, the byte count does not agree with the length of the record. For example, data are recorded on magnetic tape in byte blocks of N bytes That number N is then a byte count number stored in memory as part of a command double-word and withdrawn therewith when the tape is read. The device should read all N bytes from the tape, no more, no less, and then the byte count number should have reached zero. If not, there is error; called incorrect length. Lack of coincidence of CD and "end of record" causes the device controller to producw CHEND in flip-flop 554 as well as IL in flip-flop 552. The true bits are then transferred to the IOP in an OIN service cycle. The IOP responds to an incorrect length condition as follows: (1) the IOP records the incorrect length condition as a status bit IL in bit position 8 of the FFS registered associated with the device; (2) if the "suppress incorrect length" flag SIL is set and regardless of the state of the HTE flat (within FFS register positions 6 and 4 respectively), nothing further is done. Thus, the CPU will later on merely be informed through status bit IL, but the device operation is not influenced when IL is signaled.

If the "SIL" flag is false gate 604 opens and if the HTE flag is true, gate 611 opens and "channel end" is indicated concurrently, the IOP signals "IOP halt" in the terminal order concluding the order IN service cycle as well as for status bit IOP=UE in the FFS register. Additionally, the command chain bit in the terminal order is suppressed, via gates 604-610-611-602, leaving gate 601 closed. Finally, flip-flop 553 in the device controller hold the so-called chaining modifying bit. The chaining modifier bit may be used in conjunction with a particular command called transfer IN channel to permit branching within the command program. The meaning of this bit will be apparent after the following two chapters. Suffice it to say that an order IN service cycle is required if the device controllers want to inform the IOP on the state of this modifier bit.

COMMAND CHAINING

Among the flags held at any instant in the flag register FFS of the fast memory portion associated with a particular device, is a so-called command chain bit. Bit position 2 of the FFS register associated with a device receives this flag bit whenever for the particular device a new command double-word has been fetched from core memory and placed into the appropriate registers in the IOP. This transfer usually occurs in response to an order OUT, issued by the device controller. When the command chain flag bit CC then provided is set, command chaining is required. Command chaining means the following:

After the IOP and the device controller have completed execution of the order included in the particular command double-word, because there is "byte count zero", another command double-word including another order, is to be fetched from the core memory address held in the CA register associated with a particular device, and that new order is then executed. This, however, occurs only, (1) if the command chaining flag bit CC in a command double-word and set into register FFS is set, and (2) if there are no conditions requiring the command chain bit to be ignored (gate 602 in FIG. 12). Therefore, this bit is a means of providing command programs without intervention by the CPU. In other words, it is not necessary that interrupts be created or that the main computer program executes another SIO instruction after a particular order of a command double-word has been executed, but IOP and device controller can execute autonomously pluralities of such commands, and the tool for this possibility is the flag bit "command chain". The operation is now as follows.

Assuming, for example, there was the execution of an order resulting on one or several data IN or data OUT service cycles. Assuming this was a card reading or a tape reading process. A data block consisting of a predetermined plurality (N) of bytes in accordance with the initial byte count number held in the BC register has been transferred between core memory and device. If the operation was correct, the entire card on tape data block content has been read, and the byte count number is reduced to zero at the time the device controller reached channel end regularly through an "end-of-record" signal from the device, i.e., the IOP signaled "count done" to the device controller in a terminal order after completeion of transfer of all bytes by the device controller and the device controller provided "channel end" to its status flip-flops 554 through an "end-of-record" signal from the device. The reading, for example, of a particular card is thus terminated properly. It is now absolutely not necessary that this terminates the operation of the device in that it reverts from busy to ready state. As this card reading operation comes to an end, the device controller signals "channel end" in the appropriate position pursuant to an order IN service cycle it executes after the last data cycle concluding with TO "count done". A TO with "count done" always requires the device controller to provide an OIN. Now, if the command chain flag CC is set in the flag register FFS for that particular device controller, then the IOP sets the command "chaining bit" in the terminal order which is produced in the last phase of the order IN service cycle (OIN).

The device controller receives the command chaining bit in the terminal order concluding OIN, and it causes an order OUT service cycle to be instituted. Setting of flip-flop 542 causes a service call which will be acknowledged by the IOP in due course and the device sets the DOR and IOR lines high. This, in turn, causes the IOP to provide an order OUT operation.

Therefore, under the control of the device controller a new command double-word is fetched from core memory in a manner as aforedescribed and distributed into the registers CA, BC, IS, FFS, etc., associated with the particular device.

If the command chain flag in that new command double-word is set than after executing the particular order pertaining to that command double word, an order OUT will again be issued by the device controller to continue in the execution of the particular program. If the command chain bit CC in flag register FFS is in the reset state at the time the device reports "channel end" to the IOP through an order IN service cycle, then the IOP responds by means of a terminal order concluding that OIN service cycle, in which the command chaining bit is false, flip-flop 542 will be reset. As a consequence the device will shift back into the ready state, unless the interrupt bit in the terminal order is 1. If not, the device will shift back into the ready state and will require a new SIO instruction to start the device.

In summary, if the command chain bit CC in IOP fast memory is set, the CC bit is true in every TO. However, the DC should inspect this bit only during the TO following the OIN during which CHEND was reported to the IOP. At that time, if this bit is reset, the DC should return to ready and not issue any more service calls until a subsequent SIO instruction is issued. One exception exists: If bit 0 in TO is also true, the DC should issue an interrupt request, wait for its acknowledgement, and not accept SIO's until an AIO has been issued. If the CC bit is set, command chaining is called for, and the DC should request another service cycle, during which OOUT should be called for to get the next command.

TRANSFER-IN-CHANNEL

The versatility of the input-output system is further evidenced by the fact that within the program of sequential orders as contained in command double-words, branching is permitted. This is carried out by operation of a so-called transfer-in-channel order. This order was not listed above among the orders "read", "-write", "read backward", etc., because the format of the command word associated therewith differs from the format associated with these other orders.

Pursuant to the execution of an order OOUT from the device controller, the IOP may find a particular double-word in which the order code contained in the first one of the double-words defines a transfer-in-channel order. The order transfer-in-channel is executed within the IOP and has no direct effect on any of the devices and particularly not on the device which issued the order OUT. The primary purpose of transfer IN channel is to permit branching within the command list so that the IOP can, for example, repeatedly transmit the same set of information a number of times.

When the IOP executes transfer-in-channel it loads the command counter, i.e., the CA register for the device controller it is currently servicing, with the command address which is contained in the second half of the command word which included the order transfer-in-channel. Usually, (i.e., for other command words) these bit positions hold a memory byte address, but in case of a transfer-in-channel, these biy positions hold a new command address which accordingly is transferred into the CA register associated with a particular device controller. This new command address may, for example, be the same from which the previous command double word (not having transfer-in-channel) was fetched, to execute that command again.

Since during that operation an order is not transferred to the device controller, the device controller necessarily has not received any new order and will not change its DOR or IOR lines. Therefore, the operation "order OUT", as far as the device controller is concerned, continues as far as control of the IOP by the device controller is concerned. The IOP will, therefore, shift the new command address into the S register and the new command double word specified by this address is withdrawn from the core memory in two memory read cycles. This, of course, will include the transmission of an order code to the device controller. Flags, byte counts, memory byte address of this new IOP command double-word command are distributed in the registers regularly and by the IOP and the particular OUT service cycle will then be completed. The order now received the device controller will control its DOR and IOR flip-flops to institute another service cycle, for example, data IN or data OUT, etc. It should be mentioned that, of course, a transfer-in-channel command double-word initiating this entire process has also a second word but that is entirely ignored.

CHAINING MODIFIER

The transfer-in-channel, therefore, allows a command list broken into a noncontiquous group of commands. When used in conjunction with command chaining, transfer-in-channel illustrates the control of devices such as unbuffered card punches or unbuffered line printers. The current flags are unaltered during this command, thus the type of chaining called for in the previous command double-words is retained until changed by a command double-word following the transfer-in-channel. For example, assume that it is desirous to present the same card image 12 times to an unbuffered card punch. The punch itself counts the number of times that its record is presented, and when 12 rows have been punched, it causes the IOP to skip the command it would have executed next normally (namely, the transfer-in channel). The skipping now is the mode how to break out of such a repetition loop. The tool is the chaining modifier introduced briefly above.

If, at the end of executing an order, the device controller monitors that it has completed this operation, it usually initiates an order IN service cycle signalling CHEND. The order IN service cycle includes in the third position a bit for a chain modifier. The content of this bit is placed into flip-flop CMD of the IOP which was used during an SIO function but thereafter, particularly during service cycles and cycle sequences it can be used otherwise. Thus, flip-flop CMD receives the chaining modifier bit CM during each OIN. If this bit is set then the next OOUT execution (instituted by the command chain flag in the FFS register) causes the IOP to skip one command double-word address in the I/O program list. This, of course, has meaning only if the command chaining flag bit is, in fact, set in the IOP.

More particularly, of the command chaining flag CC is set, then an order OUT service cycle will necessarily follow the particular order IN service cycle in which the device controller signals CHEND to the IOP in representation of the completion of the current operation. The OIN byte transmitted by the device controller to the IOP includes the chain modifier bit. As command chaining is desired, the device controller will follow with an OOUT service cycle because the terminal order in the concluding phase of the OIN service cycle transmits the command chaining bit to the device and is presumed to be set. If the device controller has the chaining modifier flip-flop 553 reset, then the modifier bit is zero and the next command word will be fetched pursuant to OOUT from the address code held in CA register. This is the regular sequence of command program execution. However, if in the previous OIN service cycle the chain modifier bit was set, then during the following OOUT the content of the CA register will be set into the S register only after having been incremented to skip the address it would define without incrementation. That new address is then set into the S register and from there the operation proceeds to fetch a different command double-word. In such a case, a portion of the command list might appear as follows:

| Location in Command List | Command | |
|---|---|---|
| C | Write | |
| C + 2 | Transfer | in channel (back to C) |
| C + 4 | Stop | |

The command at location C would be executed repeatedly, since the transfer in channel command at the next command location (C + 2) would normally branch back to the write command at location C. This loop would continue until the device controller caused the IOP to skip the transfer in channel command via the coding of the chaining modifier bit of the order IN. The next order OUT would cause the IOP to fetch the command at location C + 4, which includes the stop order described in the next chapter.

One can be see than that by appropriately providing the list of command double words and by using the chain modifier as well as the transfer-in-channel command branching may be obtained in a manner partially or completely under the control of the device controller and the device.

STOP ORDER AND DATA CHAINING

The command word-order repertoire includes an order "stop" not yet mentioned. The other bits of the associated command double-word have no meaning and are ignored. The controls unit 450 in an IOP thus includes a detector for that stoporder cord, to inhibit any other transfer operation in the IOP normally following the setting of the first (and second) command word into the IOP. The stop-order has eight bits, the first one can be "1"or "0," the seven others are all zeros. They are transferred into O register and from there into buffer 530 in the device controller, as is usual for an order transfer. Decoder 523 responds to the stop order codes (at least seven zeros) to set the channel end flip-flop 554, or a flip-flop operating in parallel thereto. The device controller will institute an order IN service cycle in response to the simulated "channel end" condition. The stop-order itself when decoded in the device controller can halt the device controller or establish the ready state. Alternatively, if the stop-order is decoded in the IOP, and if the previous flag bits are still in the FFS register, then the stop-order can inhibit the transfer of the command chain bit to the device controller in the terminal order concluding the OIN in which the simulated "channel end" was signaled by the device controller to the IOP. This then terminates the device controller operation as is normal at "channel end" without command chaining. Still alternatively, the stop-orxer could be used as an IOP-halt signal.

If the first bit of the stop order is a one, then the interrupt flip-flop 541 will be set and the device will call an interrupt. This then establishes an "interrupt at channel end" independent from the ICE flag. This command can be used to stop a device program when, for example, there was command chaining, followed by a command modifier causing the program to proceed differently than during command chaining now finding the "stop" order command word.

Data chaining is the term used to described a particular IOP reaction to running out of data. In other words, the byte count in register BC IOP fast memory for a particular DC goes to zero. The flag bits included in the command double-word include a data chain bit DC set into bit position O of FFS register. The IOP performs the following sequence of actions when the byte count goes to zero and flip-flop ZDC sets: Access is made to the IOP fast memory to determine the next command double-word address. The IOP makes access to two main core memory cells determined by the command double-word address which draws the two words and stores a new byte count, a new memory byte address, and a new set of IOP control flags in its fast memory. However, the order bits in the new command double-word are ignored and are not passed on to the device conroller. The IOP sets up the conditions for the device controller to request a TO in that the IOP drives ED (IOP) true while holding down ES. During the TO, the device controller is requested to interrupt if the count zero flag bit ZC1 in the IS register is set, but the "count done" itself is not signaled at this time by the IOP to the device controller as symbolically denoted by the data chain suppressor gate 616. The IOP then continues data exchanges with the device controller based on further service requests from that device controller as if nothing has happened. Data chaining will continue until the DC flag is false. Then, of course, "count done" (ZDC=1) will lead to "channel end" as described.

INTERRUPT OPERATION - INITIATION

Each device controller is provided with an interrupt call signal generator 511, such as a flip-flop CIL, to provide a signal of like designation to latch gate 511' in the subcontroller to produce interrupt call signal IC to be fed to a bus, common to all the device controllers connected to a particular IOP and pertaining to trunk tail cable 131. The wiring sequence of the cable 131 including interrupt control wire IC does not represent any priority amount the several devices. The priority for service among the several devices is established by the priority logic explained in a previous chapter.

The interrupt call generator flip-flop CIL can be set to provide an interrupt call in either of three different situations. First the front panel of the device will be provided with a push button switch 512 or the like which the operator can press manually to initiate an interrupt call. Second, the device itself may request an interrupt. For example, if the device needs control information from the IOP, or any other condition arises being unique to the particular device and requiring the generation of an interrupt in order to inform the CPU of that fact, as will be described below, each interrupt is acknowledged by the CPU in that an AIO instruction is executed.

Pursuant to the execution of that instruction the device returns to the CPU via the IOP information informing the CPU about the reason of the interrupt. Certain bit positions in that return information are freely selectable and unique to that device which can be used for encoding the reason why a device can call for an interrupt. Details of the execution of the AIO instruction will be discussed more fully below.

Thirdly, the interrupt call flip-flop CIL in the device controller may be set on condition which can be regarded as "preprogrammable interrupt". At times, when the IOP communicates with a device through its device controller, the IOP issues the "terminal orders", or TO for short. As stated above, during the terminal order the IOP transfers control information to the device controller through the seven data lines DA0 through DA7. The terminal order bit called I (see FIG. 12) is transmitted via line DA0 to determine whether or not the device should call for an interrupt. If bit I in TO is "one" it sets interrupt status flip-flop 541 which in turn triggers CIL. the reasons for that interruption will be discussed next.

As stated above, a particular register among others is associated with device and device controller. This particular register is called FFS and contains the so-called flag bits. The command double-words of which the input-output program is composed each include flag bits in certain low order bit positions. These flag bits determine certain operating conditions for the IOP program executed for purposes of servicing the particular device. In particular, they control the decision whether or not certain steps have to be taken. These flag bits are usually set in the FFS register each time a new command is withdrawn from memory pursuant to program progress. A flag is regarded as being set, when the respective flag has the value "one." Among these flag bits the following are of significance for the interrupt operation.

There is a first flag called IZC. If flag IZC is set, an interrupt is to be requested by the device as soon as the byte count number (in register BC) is decremented to zero. It will be recalled that this number is decremented with each byte transfer between IOP and device and when reduced to zero flip-flop ZDC in the IOP sets. Decrementation of the byte count number to zero means completion of transfer of the number of bytes as determined by the initial byte count number. This will occur during a regular DIN or DOUT service cycle. Thereupon the IOP concludes that service cycle by issuing a terminal order and sets bit ZDC as bit CD into flip-flop 543 of the device controller provided data chaining is not called for (DC=0), see FIG. 12, gate 616 for the assembly of a terminal order.

If the IZC flag is set, "count done" is signaled by flip-flop ZDC causes an interrupt status bit ZCI to be set in the IS register (see gate 607) and in the same terminal order bit I for interrupt, is likewise set, to set the flip-flop 541 in the device controller which then triggers the interrupt call generator CIL in the device controller. Thereupon the device controller calls for an interrupt which is the fastest way of informing the CPU of the completion of that operation.

Another flag in FF register is called ICE. If it is set an interrupt order bit is generated by gate 605 when "channel end" is signaled to the IOP by the device controller during an "order IN" service cycle. That interrupt bit is fed to the device controller during the terminal order concluding the OIN cycle in which CHEND was signaled. For a transfer of a definite number of bytes between device and memory via IOP "channel end" should concur with "byte count zero". However, that may not be the case when there is error, or if the data byte transfer is of indefinite, unpredictable length.

Another flag is called IUE (bit position 5 in FFS register). If the flag IUE is set an interrupt is to be requested when pursuant to an order IN service cycle the device controller signaled to the IOP "unusual end" and through gate 606 in the IOP the interrupt bit I is set in the terminal order concluding this order IN. The "interrupt on unusual end" flag IUE is also instrumental in calling for an interrupt if at the time the device controller reports "channel end" the IOP-UE status is set, because there was a halting condition (see gate 612). This is significant if at the time of the order IN the IOP did not yet signal IOPH (so that UEND flip-flop 55 in the device controller is not yet set).

In either case, i.e., when the flag IZC or the flag ICE or the flat IUE is set in the flag register FFS associated with the device, the next terminal order TO issued by the IOP will include a "one" bit to be set into data line DA0, if the condition defined by the flag has, in fact, occurred and such occurrence was signaled to the IOP by the device controller. The device controller triggers then CIL generator. This way, the device is now caused to request an interrupt. It will be appreciated that whether or not a device calls for an interrupt in that manner is preprogrammable because it depends on the state of three flags as described, and they are preprogrammable. If for any of the three flag bit settings the IOP sends a terminal order to the device controller informing the device controller to call for an interrupt, a "one" bit is set respectively in one of three low order bit positions of the IS register to respectively define interrupt status bits CE1, UE1 and ZC1.

Another, more involved interrupt situation, which is also programmable can occur as follows: the flag register FFS has one flip-flop holding a flag called HTE It is a flag defining whether or not there should be a "-halt" on a transmission error. If this flag is set the IOP signals an "IOP halt" to the device controller during a terminal order if any of the following conditions occur: (a) a parity error has been signaled by the IOP by the main or core memory during communication between the IOP and the main memory (TMP); (b) the device controller signals a transmission error (TE to the IOP by means of a zero set in an order IN service cycle, (of which the terminal order is the conclusion); (c) the device controller signals "incorrect length" (IL) to the IOP by means of "one" bit in the byte, particularly for line DA1 transmitted by the device controller to the IOP during an order IN service cycle, provided the SIL flag in the FFS register is not set; if set "incorrect length" is excluded from the conditions causing the IOP to issue a "halt" via a terminal order; (d) an input data parity error bit has occurred (DAP into TE).

Thus, if either one of these four cases occurs, the IOP transmits a signal called "IOP halt" to the device controller. Whenever the device controller receives a terminal order in which the "IOP half bit" is true, sets the UEND flip-flop 555 and "unusual end" will be transmitted by the device controller to the IOP, in the byte transmitted by the device controller during an order IN (OIN). That will occur after the device has reached the end of the record on which it operates and when it signals "channel end" in the same order IN.

Independently from the state of the HTE flag, IOP halt was also signaled when the IOP detected (1) memory address not here (MAE=1), or (2) memory parity error concerning the command double-word to be fetched (CMP) or (3) control error - two transfer-in-channel commands in sequence. Either one of these cases caused IOPH to be issued. In the first or the second one of these cases it may well be that the device has not even started. Nevertheless, an OIN will result during which UEND is signaled, and if the IUE flag is set, an interrupt will result.

Now one can see that in either one of those error situations, the device controller sends an order IN byte which includes an "unusual end" signal to the IOP. If the IUE flag in the FFS register is set, then the terminal order concluding that order IN service cycle signals to the device controller an interrupt request I, the interrupt flip-flop 541 in the device controller is triggered and an interrupt call is raised by CIL generator 511.

If a device controller has raised the interrupt call signal CIL, the IC driver in the subcontroller then produces an IC signal, possibly accompanied by a high priority interrupt request CIH. The interrupt call is fed to the IC bus common to all device controllers and connected to the particular IOP. No particular priority is established at that point. Simply, the interrupt call signal in that line has been raised. The IOP receives signal IC and on its part energizes an interrupt request driver to provide an IR signal to the IR bus which leads from all IOP's and as part of the trunk tail cable 120 to the CPU. Again there is not differentiation as to priority. Any IOP can place an interrupt request call on the respective line IR and it will immediately pass through the IR bus to the CPU. At that time there may already be an interrupt request pending, produced by another device controller serviced by the same or another IOP which is of no consequence. The decisive factor is that an interrupt request is provided to the CPU through a single line IR which can receive such request from all input-output devices and to be dealt with by the CPU in accordance with the interrupt system of the CPU. An IOP receiving an interrupt call IC does not know at that point which device originated the call, and the CPU receiving a request IR does not know from which IOP the request came.

In patent application Ser. No. 572,835 (supra) of common assignee, the CPU priority control system has been described in detail and is not repeated here, but the disclosure of that application as far as necessary, is incorporated by reference in the application. The single I/O system interrupt line IR bus is one of the interrupt channels that leads to the interrupt system of the CPU in accordance with a particular prewired priority among different interrupt channels of which the IR channel of the I/O system is but one. It is an important aspect that the transmission of interrupt calls CIL-IC-IR from a device controller Through an IOP to the CPU is entirely independent from the current operating state of the IOP; i.e., an IOP can transmit interrupt calls to the CPU even though it is occupied otherwise.

In the above application it has also been described how the CPU responds to this or any other interrupt signals in that a certain status change occurs within the CPU if a particular interrupt request is honored by the CPU and CPU operation shifts to a new program. In this new program the first or one of the first instructions to be executed is an instruction called AIO. The execution of that instruction will be described next.

THE AIO INSTRUCTION

The AIO instruction has, as usual, an operate code, and R field identifying a general register which for an AIO instruction is to receive information as a result of the execution of the instruction AIO. The instruction word for AIO also has an X field, permitting indexing. The reference field of instruction word AIO is meaningless and suppressed.

The OP code provides three FNC signals as usual for the execution of input-output instructions, and each IOP receives signals FNC through trunk tail cable 131. Each IOP raises the AIO function indicator signal. Alternatively, AIO may be raised only by those IOP's which have interrupt calls pending from one or more of its devices. In addition, the decoder 151 in the CPU causes the control unit 152 of the CPU to issue a control strobe CNST which is also used in other instructions. It will be recalled from the description of the SIO instruction that the CNSt signal is sequentially passed through the various IOP's, in descending order of priority, from one to another. During execution of an SIO instruction, the priority connection did not come into play and was used to provide sequential com-parison of IOP addresses then sent by the CPU to the I/O system and to make sure that a return proceed signal PR is sent back to the CPU regardless of address recognition by any IOP.

The circuit transmitting CNST from IOP to IOP is now operating as a true priority determination system when instruc-tion AIO is executed. An IOP which has received from its device controllers one or several interrupt calls provides in response to the reception of an I/O signal the ME or NME signals (gates 401 and 402 in FIG. 5). In case an IOP has an interrupt call pending the ME signal is true and the NME signal is false, if not the relationship is reversed. The NME signal when true causes passage of a signal CNST when received by gate 403 to the next IOP. A signal ME when true prevents the transmission of signal CNST to the IOP of next lower priority. The signal chain thereby establishes a priority determination sequence. It can thus be seen that the IOP of highest relative priority among those having an interrupt call pending from one or more of their respective devices, will produce the signal ME and the control strobe will be prevented from further transmission. In other words, the present AIO instruction will, by necessity, cause recognition of one of the devices connected to the IOP of highest priority. Other IOP's having lower priority and having devices which placed an interrupt call have to wait for the execution of another AIO instruction. Consequently, it is not the sequence in time of placement of an interrupt request line IR which determines priority of interrupt acknowledgment by the CPU, but the wired priority for the reception and transfer of signal CNST alone determines which interrupt request is to be honored first.

As a result of receiving a control strobe signal CNST and having an interrupt call pending, signal ME is produced and the IOP triggers the function strobe generator 486 to produce function strobe FS. Concurrently thereto the IOP passes the AIO function indicator signal down the trunk tail cable 131 to the several device controllers. Making reference briefly to the priority logic among the several device controllers, (FIG. 9) it is now apparent that among the several device controllers connected to the IOP only the one with the highest priority within the connecting logic among the device controllers which generated an interrupt call can prevent an AVI signal from transmission as an AVO signal to another device controller. More particularly, if the high priority interrupt call line HPI has been raised, the device controller of highest priority among those having placed a high priority call can respond by stopping AVI–AVO transmission and triggering its function strobe acknowledging FSA generator 520. If no high priority has been called for by any device controller, the priority is again determined by the priority rank among those having placed the regular IC call. In either case the subcontroller receiving AVI but not sending out AVO causes its function strobe acknowledgment generator 520 to produce the response signal FSA. The same controller produces signal BSYC and through gate 513 the address code of the device controller is placed on the function response lines FR to thereby signal to the IOP that (1) it has requested an interrupt and (2) that among the device controllers of the entire system which requested an interrupt, it is the one with the highest priority.

The IOP upon receiving FSA sets this device address into the A register and strobes lines DOR and IOR to load condition code flip-flops CCI (IOP) and CC2 (IOP). In addition, the device which was able to produce the function strobe acknowledgment signal FSA puts on the data line DA0 through DA7 a plurality of bits which uniquely identify the cause of the interrupt call provided by the device controller. These are unique with the device and will define the cause why the device issued an interrupt, other than by response to an interrupt through a terminal order. There are no preassigned causes for an interrupt to be generalized and the status information now provided by the device controller to the data lines are uniquely associated with the possible interrupt conditions, which a device controller can generate on its own. The meaning of the status and the interpretation thereof is up to the programmer.

Still furthermore, the DOR and IOR lines are being driven to set the condition code. Should, therefore, a device controller be able to respond to AIO in this manner, the same signal which triggered the function strobe generator, i.e., the signal BSYC-NAVO, AND-gated with CIL may set condition code control flip-flop CC1 (DC) to signal via line DOR that the device has recognized the interrupt acknowledgment. Flip-flop CC2 (DC) is controlled to distinguish between unusual and usual interrupts.

The device controller does not report the reason for interrupt initiated by a terminal order from the IOP; instead the IOP will provide that information to the CPU. The status information supplied by the device controller through the data DA are fed into the I register of the IOP concurrently with the setting of the device controller address bits into the A register. After the IOP has strobed the function response lines FR, the data lines DA and lines DOR and IOR (controlling flip-flop CC1 (IOP) and CC2 (IOP), the IOP drops the FS signal which, in turn, releases the FSA signal line. Furthermore, the interrupt call generator IC is reset to remove the interrupt call signal IC (and the high priority signal CIH, if any).

The IOP composes a particular word in the M register for transmission to a memory location X'20'. Pursuant to responding to AIO the address code X'20' is placed into the S register. The word to be transmitted to location X'20' is an assembly of bits defined as follows. The device controller address, presently in the A register, is placed into the eight highest bit positions of the M register. In the next three lower bit positions of the M register the IOP places its own address. The content of the I register (seven bits) which may define the cause of the interrupt call if the call was initiated by the device itself or manually and not in response to a terminal order is placed into the seven low order bit positions of the M register. The bit positions 8 through 12 of the M register receive certain information from the FFS and the IS registers is stored associated with the particular device controller. The address code of the device was previously signaled by the device through lines FR to the A register, and is stored therein. The A register controls the fast memory access decoder of the IOP to provide access to the registers associated with the device, particularly registers FFS and IS.

It will be recalled that certain flags ICE, HTE and IUE are held in the FFS register. During an order IN the device controllers may have informed the IOP about certain errors which occurred. In dependence upon the flag settings the IOP then informed the device controller (through a terminal order) that the device controller should request an interrupt. If such an interrupt request was, in fact, the reason for the interrupt, then the AIO instruction execution presently discussed serves the purpose of informing the CPU about the cause of the interrupt. That cause is held in certain bit positions of the FFS and IS registers which received the order IN byte from the device controller and one of these bits brought about the entire sequence. These bits have been mentioned above and are summarized presently (see FIG. 12).

Five bits are involved for loading into bit positions 8 through 12 of the M register. In bit position 8 of the M register bit IL is loaded from bit position 8 of the FFS register if an incorrect length condition has been signaled by the device controller to the IOP during the previous operation. Bit position 9 in the M register receives bit 9 (TE) from FFS and it will be a "one" if the IOP or the device controller detected a data parity error or a data overrun in the transmitted information. Bit position 10 of the M register receives the interrupt status bit ZC1 from bit position zero of IS; it is a "one" if the byte count for the operation being performed by the interrupting device has been reduced to zero. That "one" will have been stored in IS if the IZC flag in the FFS register is set. Bit position 11 of the M register receives the interrupt status bit CE1 held in bit position 1 of IS which is a "one" if the device controller has signaled "channel end" to the IOP and if the "interrupt at channel end" flag ICE in register FFS was set. Finally, bit position 12 of the M register receives the interrupt status bit VE1 held in bit position 2 of the IS register which is a "one" if the IOP has originated an interrupt as the result of an unusual condition signaled by the device under conditions as were described above.

This compound word, half of which is status word, while the other half is an I/O address as held in M register of the IOP (FIG. 6) is sent by the IOP now through the usual IOP memory communication to core memory location X'20' involving addressing from the S register via lines LX.

Having done so, the IOP sends a PR2 signal through gates 407 and 405 (FIG. 5) so that a proceed signal PR is received by the control unit of the CPU. In response to the reception of PR, the CPU first strobes the condition code bits from lines NCC1 and NCC2 into stages one and two of the condition code register. The CPU then examines the condition code and if the bit in position zero is a zero, the CPU withdraws the compound word from the location X'20' and loads it into the R field identified general register of the current block and terminates the instruction. When an IOP which has received an interrupt call that in response to its instruction strobe signal receives a signal AVO, it issues directly the proceed signal to the CPU with the appropriate condition code setting. This can happen only if the IC bus in the cable to the devices is still high. If it went low before the IOP receives AVO, the signal ME turns false and actually the IOP of the next lower priority having an interrupt pending will receive CNST and sends function indicator AIO with function strobe down to its device controllers.

HIO, TIO, TDV INSTRUCTIONS

Within the instruction repertoire of the computer, the following are of additional significance, for input-output operations. The instruction "half input-output" or HIO, for short, when executed, causes the addressed device to immediately stop its current operation. The stopping of the device is in no way synchronized with the function the device is performing so that it may be stopped improperly. It is a drastic measure with which the CPU is enabled to interfere with the further operation of the input-output device.

In general, the HIO instruction has the usual format analogous to the one shown in FIG. 5b; the address field defines an IOP address and a device-device controller address. The CPU assembles the same type of word to be placed in memory location X'20' which includes the R field code (R) device and device controller address and the command address (FIG. 5c). That latter address, however, is of no immediate significance. The IOP is addressed through the IOP addressing lines as described with reference to the SIO instructions. The addressed IOP withdraws the compound word from location X'20' and raises a function indicator line HIO and addresses the particular device causing its status to be signaled to the IOP. All these operations are similar to the execution of the SIO instruction. However, the HIO shifts ready-busy flip-flop 560 in the device controller to "ready" and this shifts it into the ready state. The busy state is thus drastically terminated, the device just stops; no further service call can be issued by that DC. The condition code returned from the IOP informs the CPU whether or not the address of the device was recognized by the I/O system and whether or not the device was operating at the time to receive the order to halt. The response information returned to the CPU from the IOP by memory location X'20' and X'21' includes the concurrent command double-word address, the current status of the device and the number of bytes still to be transferred at the time the device was halted. The operation is otherwise exactly the same as described with reference to the SIO except that the device is halted instead of started. Subsequently, of course, the device does not raise a service call for an OOUT.

The second additional input-output instruction called "test input-output" or TIO, for short. This TIO instruction is used to make an inquiry on the status of data transmission. The operation of the selected IOP, device controller and device are not affected. Thus, the TIO function is merely carried out in between those service cycles if the device is busy because of a previous SIO. The addressing is precisely the same as in case of an SIO instruction, except that no operations are initiated or terminated by execution of the TIO instruction. The execution of the TIO instruction causes the device controller of device address and the two bit (R) code to be transferred to the memory location X'20' of the main memory. This information is then transferred to the IOP and used in the same manner as for the HIO or SIO instruction, i.e., it provides the IOP with the device and the device controller address and lets the IOP know what kind of response information the IOP should feed back to the CPU via the memory locations X'20' and, eventually, X'21'. The IOP then proceeds to extract the status of the device controller therefrom. The condition code information returned from the IOP informs the CPU whether or not the address of the device was recognized by the I/O system and whether or not a successful SIO is currently possible with the addressed device (device ready or busy, etc.).

The response information returned to the CPU from the IOP memory location X'20' and X'21' provides the program with the information necessary to determine the following: status of device controller and of the IOP; number of bytes remaining to be transmitted in the current operation, if any, and the present point at which the IOP is operating the command list. Essentially the return of this information from the device controller to the IOP is similar to the operation during the SIO instruction when the device and device controller informs the IOP of its status.

Finally, there is an instruction called "test device" or TDV. It is used to provide information other than that obtainable by means of the TIO instruction. The operation of the selected IOP device controller and device are not affected and no operations are initiated or terminated. The execution of the TVD instruction code causes the address of the device controller and device and the two bit code (R) to be transferred to the memory location X'20' of the core memory. This information is then transferred to the IOP and used in the same manner for the HIO and TIO instructions. The condition code information returned to the IOP informs the CPU whether or not the address of the device was recognized by the I/O system. The response to a TDV instruction provides the programmer with details pertaining to the condition of the selected device, the number of bytes remaining to be transmitted in the current operation and the present point at which the IOP is operating in the command list. The status response information provided by the TDV instruction pertains to data overrun and device end condition in addition to status information that is unique to the device.

The invention is not limited to the embodiments described above but all changes and modifications thereof not constituting departures from the spirit and scope of the invention are intended to be covered by the following claims.

I claim:

1. In a general purpose digital computer, having a central processing unit performing arithmetic operations on data in accordance with instructions, manifestations of which and of the data are stored as information in a memory having a plurality of individually addressable memory locations, the computer further having a plurality of device controllers and peripheral devices, controlled by the controllers for input-output operations of information to be fed to the memory and/or to be withdrawn therefrom, the improvement comprising:

the memory including a plurality of individually and independently addressable memory banks, each bank having a plurality of different, individually addressable storage locations, the pluralities of addresses differing for the banks of the plurality;

a first plurality of lines connected to the central processing unit and to each of the banks of the plurality in parallel for receiving addressing and data signals from the central processing unit to be applied to all of the banks, and for providing to the central processing unit data signals and instruction signals as received from any of the banks;

an input-output processor having a plurality of storage means for storing manifestations of memory locations, a storage means of the plurality associated with a device controller of the plurality, the memory locations holding control information and defining sources or destinations of data;

a second plurality of connecting lines including address lines and data lines connecting each of the memory banks in parallel to the input-output processor for the transfer of addresses to all banks and for transfer of data and control information between an addressed bank of the memory and the input-output processor, independent from any concurring transfer of information between a different memory bank and the central processing unit through the lines of the first plurality;

first means in the input-output processor connected to the addressing lines of the second plurality for providing thereto addressing signals to be effective on all banks of the memory, and for providing memory access request signals through one of the lines of the second plurality to be effective in the bank holding the location as defined by the addressing signals, to obtain transfer of control information or data between the memory location as accessed by the addressing signals and the input-output processor via said data lines;

control connections between the central processing unit and the input-output processor, for a dialog of control signals to be initiated by the central processing unit pursuant to which the input-output processor operates to receive control information from memory for a particular one of the storage means;

a third plurality of connecting lines connecting the device controllers to the processor, and including data lines effective in parallel on all controllers to supply or to receive data;

means in each device controller to provide control signals including device controller identification signals to the processor via connecting lines of the plurality if a device on the device controller requires data transfer service, the processor being responsive to the identification to select the associated one of the plurality of storage means;

means in the device controllers interconnected for providing selection from among the device controllers which one to provide identification signals and to receive or to supply such data;

second means in the input-output processor responsive to the control signals from the device controller and connected for coupling the selected one of the storage means to the first means for respectively supplying thereto manifestations of one of the memory locations to serve as memory addressing signals;

third means in the input-output processor for selectively, arithmetically modifying the manifestations for the memory locations independently from the central processing unit for controlling progression of data transfer between device controllers and memory; and means in the processor connected to the data lines of the second plurality and to the data lines included in the third plurality for temporarily storing data as transferred between the device and one of the second memory location, via the processor.

2. In a general purpose digital computer as in claim 1, first control means under control of the central processing unit for initiating data transfer by the processor between memory and a predeterminable one of the device controllers of the plurality;

second control means in the input-output processor for normally limiting the data transfer between the device controller of the plurality and memory to a predeterminable number of items, requiring operation of the first control means for providing further data transfer; and third control means in the input-output processor for rendering the data transfer independent from the second control means.

3. In a computer as in claim 1, each bank having a first and a second input port, the connecting lines of the first plurality leading from the central processing unit to the input port of a first one of the banks and out again to the first input port of a second one of the banks;

the connecting lines of the second plurality leading from the processor to the second input port on one of the banks and out again to a second input port of another one of the banks, the first and second input ports of a bank of the plurality providing access to the bank in response to memory request signals and addressing signals respectively provided by the processing unit and by the first means of the processor.

4. In a computer as in claim 1, a bank of the plurality providing a signal if it holds the location the address of which being applied to the addressing lines of the second plurality, the processor including means responsive to the signal to provide a memory request signal for instituting a memory cycle in the bank that provided the signal.

5. In a computer as in claim 1, each of the banks including address control means, operating so that memory locations associated with sequential memory addresses are in different banks.

6. In a computer as in claim 5, a pair of the banks having locations pertaining to two different address continua, each of the banks of the pair having address transforming means so that the locations addressed by sequential addresses as applied and within the combined continua, are in different ones of the banks of the pair.

7. In a general purpose digital computer having a central processing unit performing arithmetic operations on data in accordance with instructions, manifestations of which and of the data are stored as information in a memory having a plurality of individually addressable memory locations, the computer further having a plurality of peripheral devices for input-output operations of information to be fed to memory and/or to be withdrawn therefrom, the improvement comprising:

the memory including a plurality of individually addressable memory banks, each connected for receiving addressing and data signals from the central processing unit and for providing to the central processing unit data signals and instruction signals;

a plurality of input-output processors each individually addressable by the central processing unit and operative for providing to said memory banks addressing signals and for receiving from or providing to a bank of the plurality, not currently occupied by the central processing unit for communication of information, information signals independently from the central processing unit;

a connecting system, connecting each of the input-output processors of the plurality, to each to the banks of the plurality, for any processor to be enabled to independently and concurrently communicate with a bank, and including means to establish a priority ranking as to access by any processor of the plurality to any bank of the plurality;

arithmetic means respectively included in each of the input-output processors for performing arithmetic operations to provide a sequence of said addressing signals independently from arithmetic operation and addressing capabilities of the control processing unit:

the plurality of devices being divided in subpluralities, a subplurality including at least one device, the devices of a subplurality being connected to an input-output processor of the plurality for receiving therefrom and/or providing thereto information respectively subsequent to reception from locations in the memory or for subsequent transfer to locations in the memory as defined and addressed by the sequence of addressing signals;

means in each processor of the plurality having storage locations associated with the devices of the subplurality and holding data and control information pertinent to the data transfer as between the respective device and memory, said arithmetic means up-dating the content in the storage locations;

means connected for providing operative connection of a device of a subplurality of the plurality to the respective input-output processor to the exclusion of the other devices of the subplurality at any instant, for obtaining said transfer of information between processor and said operatively connected device; and means for providing priority ranking among the devices of a subplurality as to access for connection to the respective processor of the plurality.

8. In a general purpose digital computer as in claim 7 the means connecting each of the processors of the plurality to the central processing unit including connecting lines for providing control signals, including processor addressing signals, in response to execution of a particular one of the instructions by the central processing unit;

address signal receiving means in each of the processors and connected to receive the addressing signals and to provide a return response when the addressing signal as provided by the central processing unit agrees with manifestations of the address identifying the processor;

means for providing particular operative connection between a device and a processor having responded to an addressing signal for obtaining information transfer as between the processor, the device and memory.

9. The improvement as set forth in claim 8, each of the input-output processors including storage means for storing signals representative of the number of items of information still to be transferred between a device of the subplurality and memory through the respective input-output processor; and means for operating the arithmetic means in the input-output processor for updating the number in relation to each transfer between the device and the input-output processor.

10. In a computer as in claim 8, the central processing unit including a fast access memory, a portion of which selected to be available as current storage facility, the particular instruction including signals identifying a particular location within the selected portion, holding the starting address for an operational sequence as to data transfer between said memory and the one device through the processor; and means provided for obtaining a transfer of that address to said processor to commence execution of the transfer sequence by the processor independently from central processing unit.

11. In a general purpose digital computer as in claim 7, there being device controllers for the peripheral devices; each device controller servicing at least one device, each input-output processor, and including buffer means for holding information signals provided by or to be delivered to one of the peripheral devices via the respective device controller and respectively prior to delivery to or after having been provided by the memory;

first connecting means connecting each of the processors of the plurality to the central processing unit including connecting lines for providing control signals, including processor addressing signals, in response to execution of a particular one of the instructions by the central processing unit;

receiving means in each of the processors and connected to receive the addressing signals and to provide a return response when the addressing signal as provided by the central processing unit agrees with manifestations of the address identifying the processor;

second connecting means for connecting at least one device controller of the plurality to each of the processors of the plurality, at least one processor having a subplurality of device controllers connected to it;

first circuit means in each processor rendered operative upon addressing by the central processing unit and providing device controller addresses via the second connecting means to all of the device controllers as connected to the addressed processor;

second circuit means in each processor providing service calls and its own address through the second connecting means to the processor, upon receiving its address by the processor;

storage facilities in each processor and having individual, device controller addressable locations, that are respectively accessed upon issuance of a device controller address by the respective device controller, the storage locations including memory addresses;

means in each processor operating in response to the content of an accessed location in the storage facility for providing addressing signals for the memory to define memory locations as source or destination of the information as transferred, and including arithmetic means for updating these memory addresses;

third circuit means in each of the processors feeding said addressing signals to said memory for obtaining the transfer of items of information between respectively addressed memory locations and the buffer means in the respective processor; and fourth circuit means in each of the processors of the plurality to obtain transfer of items of information between the buffer means in the processor and a device controller which provided accessing in the storage facility.

12. In a computer as in claim 7, each memory bank having a plurality of ports, one port of each bank connected to the central processing unit, the remainder of the ports of each bank respectively connected to the input-output processors, each port permitting independent access to the particular bank including transmittal of memory addresses and supply of data to or withdrawal of data from an addressed location in the respective bank.

13. In a general purpose, digital computer, having a central processing unit performing arithmetic operations on data in accordance with instructions, manifestations of which and of the data are stored as information in a memory having a plurality of individually addressable memory locations, the computer further having a plurality of device controllers and peripheral devices controlled by the controllers for input-output operations of information to be fed to the memory and/or to be withdrawn therefrom the improvement comprising:

a first plurality of connecting lines connecting the processing unit to the memory to gain access to the memory upon issuance of request signals and address signals and at a particular, lower priority as to concurrent requests for memory access made otherwise;

an input-output processor having a plurality of storage means, each storage means of the plurality including a first location for storing the address of a memory location holding signals pertaining to a sequence of commands, a second location for storing the address of a memory location, defining source or destination of data, a third location holding a count number for identifying data transfer steps, each storage means associated with a device controller, the memory also holding manifestations of the commands of the sequences;

a second plurality of connecting lines connecting the processor to the memory to apply addressing signals thereto so as to gain access to the memory and to provide to or to receive data from memory, there being:

first means in the processor to provide memory request signals, second means in the processor to couple one of the first or second locations of one of the storage means to lines of the second plurality to pass thereto memory addressing signals, third means in the processor for temporarily storing data received from or to be transmitted to a memory location as addressed by operation of the second means, and fourth means in the processor to arithmetically operate on the content of the first, second and third locations for updating the content thereof upon progression of data transfer as between the third means and memory independently from the central processing unit;

control connections between the central processing unit and the input-output processor for entering into dialog of control signals to be initiated by the central processing unit, upon executing a particular instruction and pursuant to which the processor initiates a memory request for access to memory so as to provide transfer of control information between processor and memory and involving the content of a storage means of the plurality;

a third plurality of connecting lines between the device controllers of the plurality and the processor, to provide to the processor control signals, leading to the issuance of memory request signals by the processor, and to provide additionally device controller identifying signals to the processor for placing the associated one of the plurality of storage means at the disposal of the first through fourth means in the processor, the third plurality of connecting lines including data lines as between the third means of the processor and all device controllers in parallel; and circuit means serially operative between all device controllers to select the device controller that is to provide its identifying signals and to supply or to receive data on the data lines.

14. In a general purpose digital computer as in claim 13;

means (a) in the input-output processor for assembling a plurality of items of status information in response to said control signal;

means (b) in the input-output processor for controlling the means (a) in response to said control signal to obtain transfer of said items to a particular memory location;

means (c) in the input-output processor connected for providing a response signal to the central processing unit subsequent to the transfer as controlled by the means (b); and means (d) in the central processing unit responsive to said return signal to withdraw these items of information from said particular memory location.

15. The improvement as set forth in claim 14, comprising:

means for providing to the input-output processor a second control signal;

means in the input-output processor responsive to the second control signal for calling on a particular one of the devices to receive therefrom a first plurality of items of status information to be included in the assembly as provided by the means (a); and transmission means for a two bit code under control of the particular device and connected to the central processing unit for signaling thereto absence or presence of the device and one of two possibilities as to its operational state.

16. The improvement as set forth in claim 15, including means for storing items of status information of previous operations of the device to be included by the means (a) in the assembling of status information.

17. In a general purpose digital computer as in claim 13 the third plurality, including a service call line and a service call acknowledging line, respectively leading from the input-output processors to all device controllers of the plurality;

means in each device controller for providing a service call to the line whenever the device controlled by the device controller requires service from the input-output processor, and independent from the providing of a service call by another device controller of the plurality;

means in the input-output processor for providing a signal into said acknowledging line in response to a service call; and circuit means interconnecting the device controllers of the plurality for establishing priority ranks among the device controllers so that the device controller having highest priority rank among those having provided service calls at the time of the signal in the acknowledging line can accept the acknowledging signal.

18. THe improvement as set forth in claim 17, including circuit means in each of the device controllers establishing a connect state of the device controller when having accepted an acknowledging signal;

the bus including a third line connecting the input-output processor with all device controllers; and means in the input-output processor for providing a signal into the third line to be received by the device controller in the connect state for terminating the connect state thereof.

19. The improvement as set forth in claim 18, means included in each of the device controllers for being enabled when the respective device controller is in the connect state, the latter means being under control of the device for providing request signals at a rate determined by the data acceptance or supply rate of the device;

a fourth line included in the bus connecting the input-output processor to all device controllers to receive the request signals from the device controller in the connect state;

means in the input-output processor connected to the fourth line receiving the request signals for controlling the reception of data from or the supply of data to the device having its controller in the connect state; and data lines included in the common bus connecting the input-output processors to all device controllers for the transfer of said data between the input-output processor and the device controller issuing said request signals.

20. The improvement as set forth in claim 19, the bus including a fifth line for transfer of an end-of-data signal;

means in the input-output processor for providing said end-of-data signal to said fifth line; and means in the device controllers responsive to said end-of-data signal to prevent further data transfer to or from the device controller.

21. The improvement as set forth in claim 20, including means in the device controller connected to the line for the end-of-data signal to provide an end-of-data signal to the input-output processor when the device controller is unable to provide or to accept data.

22. The improvement as set forth in claim 20, and including means in the input-output processors for providing control information to the device controller subsequent to providing of said end-of-data signal and prior to providing said end-of-service signal.

23. In a general purpose digital computer as in claim 17, the third plurality including interface connections for the processor and the device controllers to provide control and data information between the processor and the device controllers on a time sharing basis;

first means in each of said device controllers of the plurality for receiving a priority control signal from another device controller, a first one of the device controllers receiving the respective priority control signal from the processor, and selectively inhibiting or permitting transfer of the priority control signal to still another one of the device controllers, a last one of the device controllers inhibiting or permitting transfer of the respective priority control signal to the processor, the first means being independent from said interface connection;

second means included in the processor for providing particular control signals;

third means included in the interface connections to receive the control signals and passing them to all said device controllers;

fourth means in each device controller and responsive to one of a plurality of conditions and to said control signals for inhibiting transfer of the priority control signal if received from another device controller or processor; and fifth means in each device controller for occupying particular ones of said interface connections when inhibiting said transfer.

24. The improvement as set forth in claim 23;

means included in the fourth means of each device controller for providing call signals, the interface connection including means for transmitting the call signals indiscriminately as to the particular device controller having provided a call signal;

means included in each input-output processor responsive to the call signals and providing a function indicator signal into a line included in said interface connection for transmission of the indicator signal to all of said device controllers; and means included in the fourth means of each device controller responsive to a signal it receives by operation of the first means, for inhibiting the transfer if having provided a call signal and receiving the function indicator signal as one of such conditions.

25. The improvement as set forth in claim 24, each device controller including means responsive to inhibition of transfer of the signal if received by operation of the first means to provide an identification code through said interface connection to the processor.

26. The improvement as set forth in claim 23;

the input-output processor being connected to be responsive to execution of particular ones of the instructions by the central processing unit, and providing one of a plurality of signal into respective ones of a plurality of lines included in said interface connections accompanying said addressing code;

means included in the processing unit to provide device controller addressing codes to the device controllers via lines included in said interface connections; and means included in each device controller responsive to the addressing codes and comparing same with the addressing code of the respective device controller to inhibit transfer of the signal received by operation of the first means when the codes compare.

27. The improvement as set forth in claim 23;

the input-output processor being connected to be responsive to execution of particular ones of the instructions by the central processing unit and providing one of a plurality of signals into respective ones of a plurality of lines included in said interface connections accompanying said addressing code; and means in the device controller respectively responsive to the signals of the plurality if the device controller inhibits transfer of the signal received by operation of the first means, to permit, inhibit or test device controller operation with regard to transfer of data between device controller and processor.

28. In a general digital computer as in claim 13 the third plurality of connecting lines having a plurality of lines connecting the processor to each of the device controllers including first lines for the transfer of information between each of the device controllers and the processor, and including a plurality of function indicator lines, a function strobe line and a function strobe acknowledging line;

first means in the input-output processor providing a signal into one of the function indicator lines, an addressing signal into the first lines and a signal into said function strobe line;

second means in each of the device controllers receiving said addressing signals and including address defining means to provide an address recognition signal if the addressing signals compare with the address as defined by the defining means;

third means in each device controller responsive to the recognition signal when produced and further responsive to said function strobe signal to provide a function strobe acknowledging signal; and fourth means in each device controller responsive to said function indicator signal when the respective device controller produces a function strobe acknowledging signal for providing particular device control as determined by the function indicator signal.

29. The improvement as set forth in claim 28, the device controllers selectively enabled and disabled by the processor for demanding service by the processor, each device controller including a service call generator enabled when the device controller can demand service;

a line included in the bus and connected to said generators to transmit service calls of the generator and device controller to the processor;

a service call acknowledging generator in the input-output processor connected for receiving service calls in said latter line;

an additional function indicator line in the bus connected to the latter generator to provide a service call acknowledging signal into said latter line upon receiving a service call, unaccompanied by an addressing signal but accompanied by a function strobe line;

means for interconnecting the device controllers so that only one thereof among those having provided service calls is enabled to respond to said acknowledging signals for providing said function strobe acknowledging signal; and means for providing an address code to the bus identifying the device controller producing the function strobe acknowledging signal is response to the signal in the additional function indicator line.

30. The improvement as set forth in claim 28, a plurality of lines included in said bus, and means in each device controller for providing status information to the bus when providing the function strobe acknowledging signal, the information being descriptive of the operative state of the device controller.

31. In a general purpose digital computer as in claim 13;

a pair of control lines of the third plurality connected between said device controllers and said processor;

means in each device controller for providing a first signal into one control line of the pair for controlling the direction of data transfer through said processor; and means in each device controller for providing a second signal into the other control line of the pair for distinguishing between data and control information to be transferred between processor and device controller, the transmission as controlled by the input-output processing being under control of the first and second signals.

32. The improvement as set forth in claim 31, means in the central processing unit responsive to a particular one of the instructions and connected for controlling the input-output processor for enabling a particular device controller of the plurality;

means in each device controller when enabled to provide the second signal to demand control information; and means in the input-output processor responsive to said second signal for accessing a memory location of the plurality to withdraw therefrom control information and feeding same to said device controller.

33. In a computer as in claim 13, the central processing unit including high speed access storage facilities, organized in groups, a group thereof being operative as registers in any instant, the control connections operative to cause the processor and the central processing unit to exchange information via at least one particular memory location, the processor to receive device controller identification and memory addresses for storage in the first locations in the associated storage means, the central processing unit to receive status information on the device controller.

34. In a general purpose digital computer having a processing capability for performing arithmetic operations on data in accordance with instructions, manifestations of which and of the data are stored as information in a memory having a plurality of individually addressable memory locations, the improvement comprising:

the memory including a plurality of individually addressable memory banks, each bank having individually addressable storage locations, each bank responding to a different group of addresses;

each bank having a plurality of ports, each port having means for receiving addressing signals and providing a first signal indicative of absence or presence of the location in the respective bank whose address is applied to the receiving means, each port further having data transfer means for accepting and supplying data to be stored or withdrawn from an addressed memory location in the bank;

a plurality of data processors, each processor means for providing sequences of addressing signals, there being means for connecting each processor to one port each of all banks for providing addressing signals to the banks;

each processor further having means respectively connected to the ports of the bank, one port each per bank of all banks, for selectively receiving from and providing to the memory banks information signals representative of data and control information, independently from each other, a processor of the plurality being capable of communicating with any of the memory banks not occupied for communication with another processor of the plurality; and a plurality of peripheral devices connected to some of the processors of the plurality to supply thereto and/or to receive therefrom data to be transferred to or from memory.

35. In a general purpose digital computer, having a central processing unit performing arithmetic operations on data in accordance with instructions, manifestations of which and of the data are stored as information in a memory having a plurality of individually addressable memory locations, the computer further having a plurality of device controllers and peripheral devices, controlled by the controllers for input-output operations of information to be fed to the memory and/or to be withdrawn therefrom, the improvement comprising:

the memory including a plurality of individually and independently addressable memory banks, each bank having a plurality of different, individually addressable storage locations, the pluralities of addresses differing for the banks of the plurality;

a first plurality of lines connected to the central processing unit and to each of the banks of the plurality in parallel for receiving addressing and data signals from the central processing unit to be applied to all of the banks, and for providing to the central processing unit data signals and instruction signals as received from any of the banks;

an input-output processor having a plurality of storage means for storing manifestations of memory locations, a storage means of the plurality associated with a device controller of the plurality, the memory locations holding control information and defining sources or destinations of data;

a second plurality of connecting lines including address lines and data lines connecting each of the memory banks in parallel to the input-output processor for the transfer of addresses to all banks and for transfer of data and control information between an addressed bank of the memory and the input-output processor, independent from any concurring transfer of information between a different memory bank and the central processing unit through the lines of the first plurality;

first means in the input-output processor connected to the addressing lines of the second plurality for providing thereto addressing signals to be effective on all banks of the memory, and for providing memory access request signals through one of the lines of the second plurality to be effective in the bank holding the location as defined by the addressing signals, to obtain transfer of control information or data between the memory location as accessed by the addressing signals and the input-output processor via said data lines;

connecting means connecting the device controllers to the processor, the connecting means including signal lines effective in parallel on all controllers to supply or to receive data, further including control lines also effective on all device controllers and operating in accordance with a particular priority ranking;

means in each device controller to provide control signals including service call and device controller identification signals to the processor via the control and signal lines if a device on the device controller, requires data transfer service, the processor being responsive to the identification and service call of the device controller having highest priority among those sending service calls, to select the associated one of the plurality of storage means;

second means in the input-output processor responsive to the control signals from the device controller and connected for coupling the selected one of the storage means to the first means for respectively supplying thereto manifestations of one of the memory locations to serve as memory addressing signals for a memory access step;

third means in the input-output processor for selectively, arithmetically modifying the manifestations for the memory locations independently from the central processing unit for controlling progression of data transfer, in steps of memory access steps, between device controllers and memory;

buffer means in the input-output processor for holding data to be sequentially distributed to or to be sequentially provided by the selected device controller, the data in the buffer taken from or to be set into the one memory location; and control means, operating upon completion of data transfer as between the device controller and the one memory location in either direction, to terminate operative connection between processor and device controller, so as to require the device controller to issue another service call for the next transfer step, the processor upon the termination responding immediately to another, then pending service call from a different device controller.

36. In a general purpose digital computer, having a central processing unit performing arithmetic operations on data in accordance with instruction, manifestations of which and of the data are stored as information in a memory having a plurality of individually addressable memory locations, the computer further having a plurality of device controllers and peripheral devices, controlled by the controllers for input-output operations of information to be fed to the memory and/or to be withdrawn therefrom, the improvement comprising:

the memory including at least two individually and independently addressable memory banks, each bank having a plurality of different, individually addressable storage locations, the pluralities of addresses differing for the banks of the plurality;

address transforming means on each of the two banks, operating so that two locations having sequential addresses are in two different banks;

a first plurality of lines connected to the central processing unit and to each of the banks of the plurality in parallel for receiving addressing and data signals from the central processing unit to be applied to all of the banks, and for providing to the central processing unit data signals and instruction signals as received from any of the banks;

an input-output processor having a plurality of storage means for storing manifestations of memory locations, a storage means of the plurality associated with a device controller of the plurality, the memory locations holding control information and defining sources or destinations of data;

a second plurality of connecting lines including address lines and data lines connecting each of the memory banks in parallel to the input-output processor for the transfer of addresses to all banks and for transfer of data and control information between an addressed bank of the memory and the input-output processor, independent from any concurring transfer of information between a different memory bank and the central processing unit through the lines of the first plurality;

first means in the input-output processor connected to the addressing lines of the second plurality for providing thereto addressing signals to be effective on all banks of the memory, and for providing memory access request signals through one of the lines of the second plurality to be effective in the bank holding the location as defined by the addressing signals, to obtain transfer of control information or data between the memory location as accessed by the addressing signals and the input-output processor via said data lines;

a third plurality of connecting lines connecting the device controllers to the processor, and including data lines effective in parallel on all controllers to supply or to receive data;

means in each device controller to provide control signals including device controller identification signals to the processor via connecting lines of the plurality if a device on the device controller requires data transfer service, the processor being responsive to the identification to select the associated one of the plurality of storage means;

means in the device controllers interconnected for providing selection from among the device controllers which one to provide identification signals and to receive or to supply such data;

second means in the input-output processor responsive to the control signals from the device controller and connected for coupling the selected one of the storage means to the first means for respectively supplying thereto manifestations of one of the memory locations to serve as memory addressing signals; and means in the processor connected to the data lines of the second plurality and to the data lines included in the third plurality for temporarily storing data as transferred between the device and one of the second memory location, via the processor.

* * * * *